United States Patent [19]

Jenkins et al.

[11] 3,817,978

[45] June 18, 1974

[54] 4-FLUORO NUCLEOSIDES AND SUGAR INTERMEDIATES, AND METHODS OF PREPARING

[75] Inventors: Ian Jenkins, Mountain View; John G. Moffatt; Julien P. Verheyden, both of Los Altos, all of Calif.

[73] Assignee: Syntex (U.S.A.) Inc., Palo Alto, Calif.

[22] Filed: June 16, 1971

[21] Appl. No.: 153,817

[52] U.S. Cl. ......... 260/210 R, 204/158, 260/209 R, 260/211.5 R, 424/180
[51] Int. Cl. ............................................ C07c 47/18
[58] Field of Search ................. 260/211.5 R, 210 R

[56] References Cited
UNITED STATES PATENTS

| | | | |
|---|---|---|---|
| 3,282,921 | 11/1966 | Verheyden et al. | 260/211.5 R |
| 3,328,389 | 6/1967 | Shimizu et al. | 260/211.5 R |
| 3,352,849 | 11/1967 | Shen et al. | 260/211.5 R |
| 3,475,408 | 10/1969 | Kuhn et al. | 260/211.5 R |
| 3,562,250 | 2/1971 | Langen et al. | 260/211.5 R |
| 3,575,959 | 4/1971 | Shen et al. | 260/211.5 R |
| 3,585,189 | 6/1971 | Verheyden et al. | 260/211.5 R |
| 3,658,787 | 4/1972 | Russell et al. | 260/211.5 R |

OTHER PUBLICATIONS

Wolfrom et al., "Advances in Carbohydrate Chemistry and Biochemistry" Vol. 24, 1969, Academic Press, New York, pp. 250–251.

*Primary Examiner*—Johnnie R. Brown
*Attorney, Agent, or Firm*—Lawrence S. Squires; Gerard A. Blaufarb; William B. Walker

[57] ABSTRACT

4'-Fluoronucleosides and furanose derivatives and method of preparing such compounds and Nucleosidin via both a nucleoside route and a sugar-nucleoside route. The generic process for both the nucleoside and sugar route is characterized by the steps of: (a) treating a 4,5-unsaturated ribofuranoside derivative with iodine monofluoride to yield the corresponding 5-deoxy-4-fluoro-5-iodo furanoside, (b) converting the 5-iodo function to a 5-hydroxy function, (c) treating the 4-fluoro-5-hydroxy product to yield the corresponding 4-fluoro-5-O-acyl-1-O-acyl or 1-halo derivative and (d) condensing the 1-O-acyl or 1-halo derivative with a suitably activated purine or pyrimidine base to yield the corresponding 4'-fluoro nucleoside.

The 4'-fluoro nucleosides exhibit general antimetabolite activity and are intermediates for compounds exhibiting such activities. The furanose compounds are intermediates for the 4'-fluoro-nucleo-sides and also for Nucleosidin.

36 Claims, No Drawings

4-FLUORO NUCLEOSIDES AND SUGAR INTERMEDIATES, AND METHODS OF PREPARING

BACKGROUND OF THE INVENTION

1. Field of the Invention

This invention relates to 4'-fluoro nucleosides and to methods of preparing such compounds. In a further aspect, this invention relates to sugar intermediates for the preparation of 4'-fluoro nucleosides and to methods of preparing such intermediates. In still a further aspect, this invention relates to a generic synthetic method for preparing 4'-fluoro nucleosides via a sugar route. In still another aspect, this invention relates to methods of preparing 4'-fluoro-purine-nucleosides via a nucleoside route. This invention also relates to synthetic 4'-fluoro nucleoside analogs of the naturally occurring anti-trypanosomal agent Nucleocidin and to methods of preparing such nucleosides.

2. The Prior Art

Since the isolation of Nucleocidin and the discovery of its antibiotic activity and particularly of its anti-trypanosomal activity (note Hewitt et al., *Antibiotics, Annual*, p. 722 (1956-1957)) and determination of its nucleoside structure (Morten et al., J.A.C.S v. 91 1535 (1969)) considerable interest has developed with respect to the possible synthesis of other nucleosides having antibiotic activity. However, unfortunately, because of the complexities involved and the general unstable character of nucleosides, very little progress has been made in the quest. We have now invented novel 4'-fluoro nucleosides and analogs of Nucleocidin, having antibiotic activity, as well as general antimetabolic activity and also novel 4'-fluoro sugars having utility as intermediates for such nucleosides. In addition, we have discovered new synthetic routes for preparing 4'-fluoro nucleosides, including processes utilizing a sugar route, which avoids many of the stability problems inherent to nucleoside processes.

SUMMARY

In summary the compounds of our invention include sugar compounds which can, for purposes of brevity, be generally represented by the formulas

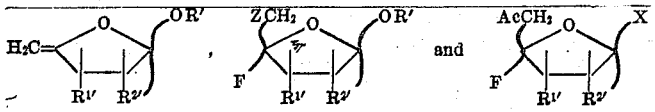

wherein R' is alkyl having from two through six carbon atoms or 2-halo lower alkyl having from one through six carbon atoms wherein halo is fluoro, chloro or bromo;

Ac is acyloxy having from two through 12 carbon atoms; $R^{1'}$ and $R^{2'}$ are independently hydroxy or suitable protecting group; X is chloro, bromo, or acyloxy having from two through 12 carbon atoms; Z is iodo or acyloxy group, preferably benzoyloxy, and the wavy line indicates both isomers with respect to that position (i.e., α-D and β-D-ribo and α-L and β-L-lyxo) and 4'-fluoro-nucleosides which can be generally represented by the formula

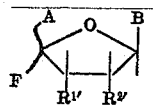

wherein $R^{1'}$ and $R^{2'}$ are as defined above, A is selected from the group having the formulas —CH$_2$OH, —CH$_2$I, —CH$_3$, —CH$_2$NH$_2$,

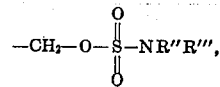

and —CH$_2$OPO(OH)$_2$ wherein R'' and R''' are independently H or lower alkyl; B is a purine base or a pyrimidine base as defined hereinbelow; and the wavy line indicates both the ribo and lyxo orientations.

In summary the process of our invention for preparing 4'-fluoro purine nucleosides via a nucleoside route comprises treating the corresponding 4',5'-unsaturated purine nucleoside with iodine monofluoride to form the corresponding 5'-deoxy-4'-fluoro-5'-iodo purine nucleoside and then converting this product to the corresponding 5'-azido-5'-deoxy-4'-fluoro purine nucleoside by nucleophilic displacement. Various derivatives of our invention are then prepared from the 5'-iodo and 5'-azido purine nucleosides according to procedures which are described herein below.

In summary the generic process of our invention for preparing the sugar compounds and generally both the purine and pyrimidine 4'-fluoro nucleosides of our invention via a sugar route comprises the steps of: (a) treating a 4,5-unsaturated ribofuranoside derivative with iodine monofluoride to yield the corresponding 5-deoxy-4-fluoro-5-iodo furanoside, (b) converting the 5-iodo function to a 5-hydroxy function, (c) treating the 4-fluoro-5-hydroxy product to yield the corresponding 4-fluoro-5-O-acyl-1-O-acyl or 1-halo derivative and (d) condensing the 1-O-acyl or 1-halo derivative with a suitably activated purine or pyrimidine base to yield the corresponding 4'-fluoro nucleoside. Various derivatives of our invention can in turn be prepared from this product via procedures which will be described herein below.

The compounds and processes of our invention, will be more thoroughly described herein below.

DETAILED DESCRIPTION OF THE INVENTION AND PREFERRED EMBODIMENTS

The sugar compounds of our invention can be represented by the following sub-generic formulas:

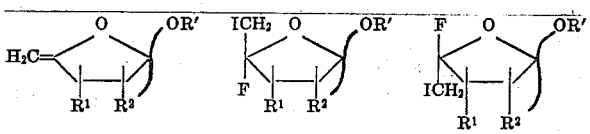

I    D-ribo (II)    L-lyxo (II)

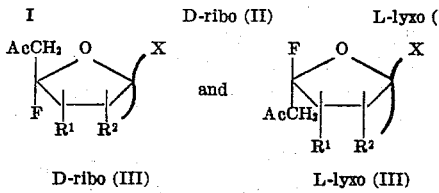

D-ribo (III)    L-lyxo (III)

wherein $R^1$ and $R^2$ are independently hydroxy or acyloxy having from two through 12 carbon atoms, or $R^1$ and $R^2$ together form the group

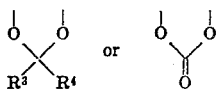

wherein $R^3$ and $R^4$ are independently hydrogen, lower alkyl, aryl or together with the carbon atom to which they are joined form a cycloalkyl group having from five through seven ring carbon atoms;
R' is alkyl having from two through six carbon atoms or 2-halo lower alkyl having from one through six carbon atoms wherein halo is fluoro, chloro or bromo; Ac is acyloxy having two through 12 carbon atoms;
X is chloro, bromo or acyloxy having from two through 12 carbon atoms; and the wavy line at the 1-position indicates two alternative orientations —i.e. with respect to formulas II (ribo) and III (ribo) the α-D-ribo and β-D-ribo configurations and with respect to formulas II (lyxo) and III (lyxo) the α-L-lyxo and β-L-lyxo configurations.

The nucleoside compounds of our invention can be represented by the following formulas:

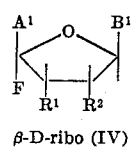 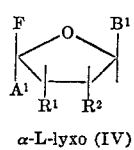

β-D-ribo (IV)     α-L-lyxo (IV)

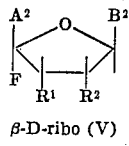 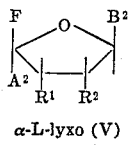

β-D-ribo (V)     α-L-lyxo (V)

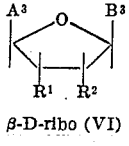 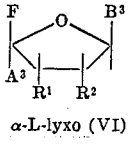

β-D-ribo (VI)     α-L-lyxo (VI)

wherein $R^1$ and $R^2$ are as defined herein above; $A^1$ is selected from the group having the formulas: —CH$_2$OH, —CH$_2$I or —CH$_2$OPO(OH)$_2$; and $B^1$ is a purine base selected from the group: 6-chloropurine; 2-acetamido-6-chloropurine; 2,6-dichloropurine; 6-mercaptopurine; 6-lower alkylthiopurine; 2-amino-6-lower alkylthiopurine; 6-methylaminopurine; 6-dimethylaminopurine; 2-amino-6-methylaminopurine; 2-amino-6-dimethylaminopurine; 6-(1-adamantylamino)purine; 6-hydrazinopurine; hypoxanthine; xanthine; guanine; 8-azaguanine; 7-deazaguanine; adenine; 2-fluoroadenine; 2-chloroadenine; 2-azadenine; N$^6$-methyladenine; 8-aza-9-deazadenine; 7-deaza-7-cyanoadenine; 8-azaadenine; N-methyl-N-(1-hydroxy-1-phenyl-2-propyl)aminopurine; and 6-(1-methyl-4-nitro-5-imidazoyl)thiopurine or $B^1$ is a pyrimidine base selected from the group cytosine, 5-fluorocytosine, 5-chlorocytosine, 5-bromocytosine, 5-iodocytosine, 5-lower alkyl cytosine, 5-trifluoromethylcytosine, 5-hydroxymethylcytosine, 5-nitrocytosine, 5-azacytosine, 6-azacytosine, 5-methyl-6-azacytosine, 2-thiocytosine, uracil, 5-fluorouracil, 5-chlorouracil, 5-bromouracil, 5-iodouracil, 5-lower alkyluracil, 5-trifluorouracil, 5-hydroxymethyluracil, 5-nitrouracil, 5-azauracil, 6-azauracil, 5-methyl-6-azauracil, 2-thiouracil, 4-thiouracil, 2,4-dithiouracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one; 4-hydroxylamino-5-bromo-pyrimidin-2-one; 4-hydroxylamino-5-chloro-pyrimidin-2-one; 4-hydroxylamino-5-iodo-pyrimidin-2-one; 4-hydroxylamino-5-lower alkylpyrimidin-2-one; 4-hydroxylamino-5-trifluoromethyl-pyrimidin-2-one; 4-hydroxylamino-5-hydroxymethyl-pyrimidin-2-one; 4-hydroxylamino-5-nitro-pyrimidin-2-one; 4-hydroxylamino-5-aza-pyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; and 4-hydroxylaminopyrimidine-2-thione;

$A^2$ is selected from the group having the formulas: —CH$_3$ and —CH$_2$NH$_2$; and $B^2$ is a purine base selected from the group: 6-chloropurine; 2-acetamido-6-chloropurine; 2,6-dichloropurine; 6-methylaminopurine; 6-dimethylaminopurine; 2-amino-6-methylaminopurine; 2-amino-6-dimethylaminopurine; 6-(1-adamantylamino)purine; 6-hydrazinopurine; hypoxanthine; xanthine; guanine; 8-azaguanine; 7-deazaguanine; adenine; 2-fluoroadenine; 2-chloroadenine; 2-azaadenine; N$^6$-methyladenine; 8-aza-9-deazaadenine; 7-deaza-7-cyanoadenine; 8-azaadenine; N$^6$-methyl-N$^6$-(1-hydroxy-1-phenyl-2-propyl)aminopurine; or $B^2$ is a pyrimidine base selected from the group: cytosine, 5-fluorocytosine, 5-chlorocytosine, 5-lower alkyl cytosine, 5-trifluoromethylcytosine, 5-hydroxymethylcytosine, 5-azacytosine, 6-azacytosine, 5-methyl-6-azacytosine, uracil, 5-fluorouracil, 5-chlorouracil, 5-lower alkyluracil, 5-trifluorouracil, 5-hydroxymethyluracil, 5-azauracil, 6-azauracil, 5-methyl-6-azauracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one; 4-hydroxylamino-5-chloro-pyrimidin-2-one; 4-hydroxylamino-5-lower-alkylpyrimidin-2-one; 4-hydroxylamino-5-trifluoromethyl-pyrimidin-2-one; 4-hydroxylamino-5-hydroxymethyl-pyrimidin-2-one; 4-hydroxylamino-5-aza-pyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; $A^3$ is selected from the group having the formula

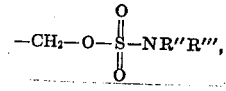

wherein R'' and R''' are independently hydrogen or lower alkyl; and $B^3$ is a purine base selected from the group: 6-chloropurine; 2-acetamido-6-chloropurine; 2,6-dichloropurine; 6-mercaptopurine; 6-lower alkylthiopurine; 2-amino-6-lower alkylthiopurine; 6- methylaminopurine; 6-dimethylaminopurine; 2-amino-6-methylaminopurine; 2-amino-6-dimethylaminopurine; 6-(1-adamantylamino)purine; 6-hydrazinopurine; xanthine; guanine; 8-azaguanine; 7-deazaguanine; 2-fluoroadenine; 2-chloroadenine; 2-azaadenine; $N^6$-methyladenine; 8-aza-9-deazaadenine; 7-deaza-7-cyanoadenine; 8-azaadenine; N-methyl-N-(1-hydroxy-1-phenyl-2-propyl)aminopurine; and 6-(1-methyl-4-nitro-5-imidazoyl)thiopurine or $B^3$ is a pyrimidine base selected from the group of pyrimidine bases as defined hereinabove with respect to $B^1$.

The above definitions will be retained throughout and will not be repeated. Further as used hereinabove and below the following terms have the following meanings. The term acyloxy refers to acyloxy groups having from two through 12 carbon atoms typical acyloxy group, expressed as the ester include, for example, acetate, propionate, butyrate, valerate, caproate, enanthate, benzoate, toluylate and the like and simple substituted aryloxy groups such as p-chlorobenzoyloxy; p-nitrobenzoyloxy and the like. The term lower alkyl refers to alkyl groups having from one through six carbon atoms and includes both branched and straight chained groups. The term alkoxy refers to straight and branched chain alkoxy groups having from one through six carbon atoms. The term aryl refers to aryl groups having from six through 12 carbon atoms. Typical aryl groups include, for example, phenyl, tolyl, naphthyl and the like. The term 2-halo lower alkyl groups refers to groups having from one through six carbon atoms and having one or more halo substituents at the 2-position, and halo is fluoro, chloro, or bromo. Typical 2-halo lower alkyl groups include, for example, trichloroethyl, trifluoroethyl, 2,2-dichloropropyl, 2,2'-dibromobutyl and the like.

Also encompassed within the compounds of our invention are pharmaceutically acceptable salts of the compounds of formulas IV, V and VI. Typically, the cation salts are replacement salts of one or more of the protonic hydrogens of the phosphate groups, of the compounds of formula IV, with the desired pharmaceutically acceptable cation or cations. The term pharmaceutically acceptable cations refers to pharmaceutically acceptable cations conventionally used in the pharmaceutical art such as, for example, sodium, potassium, triethylammonium, cyclohexylammonium, tributylammonium and the like. The anion salts are typically salts of neutralization of the free amino groups. The term pharmaceutically acceptable anion refers to pharmaceutically acceptable anions conventionally used in the art such as, for example, derived from inorganic acids such as, for example, hydrochloric, hydrobromic, hydroiodic, sulfuric, phosphoric, trifluoroacetic acids and the like. The preferred anion is chloride.

Typical examples of the compounds of formula I can, for example, be had hereinbelow by reference to Example 10. The preferred compounds of formula I are those wherein $R^1$ and $R^2$ are benzoyloxy or together form a carbonate and R' is 2-haloethyl and particularly where R' is 2,2,2-trichloroethyl.

Typical examples of the compounds of formula II can, for example, be had hereinbelow by reference to Example 11. The preferred compounds of formula II are those wherein $R^1$ and $R^2$ are benzoyloxy or together form a carbonate and R' is 2-haloethyl and particularly wherein R is 2',2',2'-trichloroethyl.

Typical examples of the compounds of formula III can, for example, be had hereinbelow by reference to Examples 15 and 16. The preferred compounds of formula III are those wherein $R^1$, $R^2$ and Ac are each benzoyloxy and X is chloro, bromo, or acetyloxy.

Typical examples of the compounds of Formula IV wherein $A^1$ is the group —$CH_2OH$ can, for example, be had by reference to Examples 17, 17a, 19–22a, 24, 25, 25b, 31 and 31a.

Typical examples of the compounds of Formula IV wherein $A^1$ is the group —$CH_2I$ can, for example, be had by reference to Examples 4 and 28 hereinbelow.

Typical examples of the compounds of formula IV wherein $A^1$ is the group —$CH_2OPO(OH)_2$ can, for example, be had by reference to EXamples 33 and 33a hereinbelow.

The preferred compounds of formula IV are those wherein $R^1$ and $R^2$ are independently hydroxy or benzoyloxy or together form an isopropylidene group, and $B^1$ is selected from the group: 6-chloropurine; 2,6-dichloropurine; 6-(1-adamantylamino)purine; adenine; 2-fluoroadenine; 8-aza-9-deazaadenine; 7-deaza-7-cyanoadenine; 8-azaadenine; cytosine, 5-fluorocytosine, 5-iodocytosine, 5-lower alkyl cytosine, 5-trifluoromethylcytosine; 5-hydroxymethylcytosine; 5-azacytosine; 6-azacytosine; 2-thiocytosine; uracil; 5-fluorouracil; 5-iodouracil; 5-lower alkyluracil; 5-azauracil; 6-azauracil; 4-hydroxylamino-5-fluoro-pyrimidin-2-one; 4-hydroxylamino-5-lower alkyl-pyrimidin-2-one; 4-hydroxylamino-5-trifluoromethyl-pyrimidin-2-one; 4-hydroxylamino-5-aza-pyrimidin-2-one; 4-hydroxylamino-6-aza-pyrimidine-2-one; 4-hydroxylamino-pyrimidin-2-one; 4-hydroxylamino-pyrimidin-2-thione; 6-mercaptopurine and 6-lower alkylthiopurine.

Typical examples of the compounds of formula V wherein $A^2$ is —$CH_3$ can, for example, be had by reference to Example 28 hereinbelow.

Typical examples of the compounds of formula V wherein $A^2$ is —$CH_2NH_2$ can, for example, be had by reference to Example 30 hereinbelow.

The preferred compounds of formula V are those wherein $R^1$ and $R^2$ are independently hydroxy or benzoyloxy or together form an isopropylidene group, and $B^2$ is selected from the group: 6-chloropurine; 2,6-dichloropurine; 6-(1-adamantylamino)purine; adenine; 2-fluoroadenine; 8-aza-9-deazaadenine; 7-deaza-7-cyanoadenine; 8-azaadenine; cytosine, 5-fluorocytosine, 5-chlorocytosine, 5-lower alkyl cytosine; 5-trifluoromethylcytosine; 5-hydroxymethylcytosine; 5-azacytosine, 6-azacytosine; uracil, 5-fluorouracil; 5-chlorouracil; 5-lower alkyluracil; 5-azauracil, 6-azauracil; 4-hydroxylamino-5-fluoro-pyrimidin-2-one; 4-hydroxyamino-5-lower alkyl-pyrimidin-2-one; 4-hydroxylamino-5-trifluoromethyl-pyrimidin-2-one; 4-hydroxylamino-5-aza-pyrimidin-2-one; 4-hydroxylamino-6-aza-pyrimidin-2-one; and 4-hydroxylaminopyrimidin-2-one.

Typical examples of the compounds of formula VI wherein $A^3$ is the group

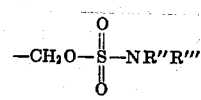

can, for example, be had by reference to Examples 32, and 32a hereinbelow. The preferred compounds of formula VI are those wherein $R^1$ and $R^2$ are independently hydroxy or benzoyloxy or together form an isopropylidene group, R" and R''' are independently hydrogen or methyl and $B^3$ is selected from the group: 6-chloropurine; 2,6-dichloropurine; 6-(1-adamantylamino)purine; 6-mercaptopurine and 6-lower alkylthiopurine; 2-fluoroadenine; 8-aza-9-deazaadenine; 7-deaza-7-cyanoadenine; 8-azaadenine; cytosine; 5-fluorocytosine; 5-iodocytosine; 5-lower alkylcytosine; 5-trifluoromethylcytosine; 5-hydroxymethylcytosine; 5-azacytosine; 6-azacytosine; 2-thiocytosine; uracil; 5-fluorouracil; 5-iodouracil; 5-lower alkyluracil; 5-azauracil; 6-azauracil; 4-hydroxylamino-5-fluoro-pyrimidin-2-one; 4-hydroxylamino-5-lower alkylpyrimidin-2-one; 4-hydroxylamino-5-trifluoromethylpyrimidin-2-one; 4-hydroxylamino-5-aza-pyrimidin-2-one; 4-hydroxylamino-6-aza-pyrimidin-2-one; 4-hydroxylamino-pyrimidin-2-one; and 4-hydroxylamino-pyrimidin-2-thione.

The purine nucleosides of our invention can also be prepared, according to our invention, by a nucleoside route which can be schematically represented by the following overall reaction equations:

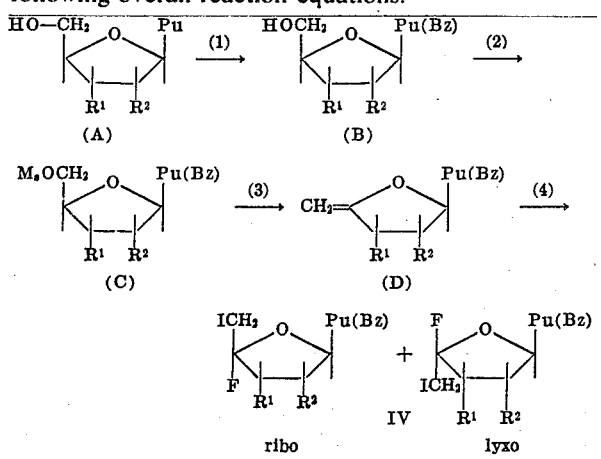

wherein Ms is a mesyl radical $$\left(\text{i.e., } -\overset{O}{\underset{O}{\overset{\|}{\underset{\|}{S}}}}-CH_3\right)$$

and Bz is benzoyl.

In Step 1 of the reaction sequence, the free amino group is the purine base moiety is protected. This can be conveniently effected by treating the nucleosides of formula A with benzoyl chloride in a suitable inert organic solvent and in a suitable base. Typically the treatment is conducted at temperatures in the range of about from 0° to 35°C for about from 24 to 6 hours. Preferably the reaction is conducted in the absence of light, or at least under diminished lighting, and preferably a 50 to 200% stoichiometric excess of benzoyl chloride is used. Suitable inert organic solvent and base mixtures which can be used include, for example; pyridine and dimethylformamide; 1,5-diazabicyclo[4.3.0]non-5-ene and dimethylformamide; diisopropylethylamine and dimethylformamide; triethylamine and dimethylformamide and the like. Also pyridine can be used alone serving as both the solvent and base and we have further found that typically best results are obtained by using pyridine alone. Also, although best results are typically obtained with benzoyl chloride, the following compounds can also be used, toluyl chloride, acetic anhydride, benzoic anhydride, and the like, to yield the corresponding acyl protecting group. The compounds of formula A are known compounds or can be prepared from the corresponding 2',3'-unprotected nucleosides by known procedures. Also, we have found that best results are obtained by using 2',3'-O-alkylidene (preferably 2',3'-O-isopropylidene) protected nucleosides. The 2',3'-O-isopropylidene nucleosides of formula A can, for example, be conveniently prepared from the corresponding unprotected compounds by the procedures described by Hampton in *Jour. Am. Chem. Soc.*, v. 83, 3640 (1961).

Step 2, mesylation of the 5'-hydroxy group, can be conveniently effected by treating the nucleoside of formula (B) with methanesulfonyl chloride in a suitable inert organic solvent base. Typically this treatment is conducted at temperatures in the range of about from 0° to 35°C for about from 6 to 24 hours. Preferably a slight excess of methanesulfonyl chloride is used. Suitable solvent base mixtures which can be used include, for example, pyridine and dimethylformamide, 1,5-diazabicyclo[4.3.0]non-5-ene and dimethylacetamide, dimethylacetamide and diisopropylethylamine, and the like and pyridine alone. Again best results are typically obtained using pyridine alone. Also in place of the preferred methanesulfonyl chloride, the following reagents can also be used; p-toluenesulfonyl chloride, benzenesulfonyl chloride, p-bromobenzenesulfonyl chloride and the like.

Step 3, is effected, according to our invention, by treating the 5'-O-mesyl nucleosides of formula C with postassium t-butoxide in a suitable inert organic solvent. Typically this treatment is conducted at temperatures in the range of about from −10° to 25°C for about from one-half to 2 hours. Preferably an excess of potassium t-butoxide is used. This step of the treatment should be conducted under anhydrous conditions and with vigorous agitation. The mixture is then treated with a buffered acid solution such as, for example, an aqueous solution of sodium acetate and acetic acid, typically at temperatures in the range of about from 0° to 5° for about from one-half to 1 hour. Preferably, the reaction mixture is also vigorously agitated during this step of the treatment. Suitable inert organic solvents which can be used for the potassium t-butoxide step of the treatment include, for example, tetrahydrofuran, dimethylformamide, dimethyl sulfoxide, and dimethylacetamide.

Step 4, the preparation of the 4'-fluoro-5'-iodo purine nucleosides of formula IV of our invention can be prepared by treating the corresponding compounds of formula D with silver monofluoride and iodine in an inert organic solvent. Typically this treatment is conducted at temperatures in the range of about from −80° to 35°, for about from 2 to 1 hour. Typically mole ratios in the range of about from 5 to 20 moles of silver monofluoride and about from 5 to 20 moles of iodine are used, per mole of nucleoside starting material (formula D). The reaction mixture should be agitated during the treatment and preferably vigorously. Suitable inert organic solvents which can be used include, for example, benzene, dichloromethane, tetrahydrofuran, dioxane, acetonitrile, nitromethane and the like. Typically best results are obtained using benzene as the solvent.

The process of our invention of using a sugar route has generic applicability for the preparation of both the 4'-fluoro purine and 4'-fluoro pyrimidine nucleosides of our invention, as well as the various furanose intermediates of our invention. The process further has the advantage that nucleosides, which typically are easily degraded and thus require careful monitoring and control to preven degradation, are not prepared until the latter stages of the process.

The sugar route process, of our invention, can be schematically represented by the following overall schematic reaction equations (omitting byproducts):

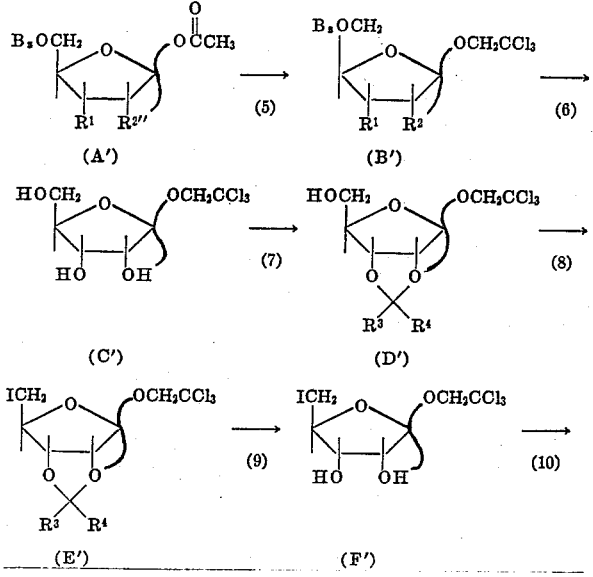

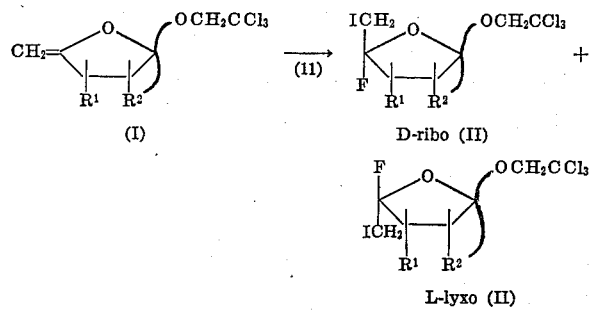

(For simplicity, the remaining steps are shown with respect to D-ribo isomer.)

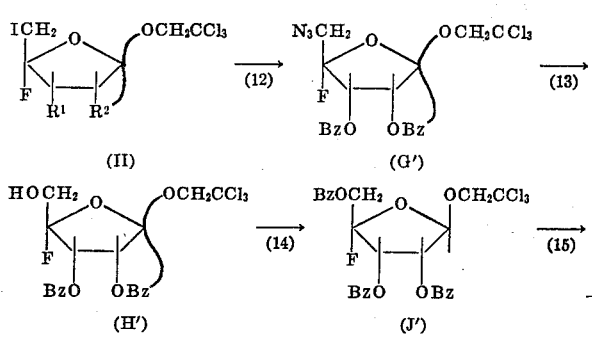

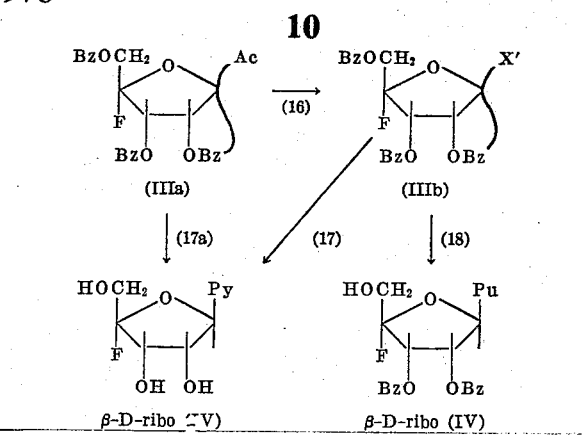

wherein $B_z$ is benzoyl; $R^1$ and $R^2$ are as defined herein above; $X'$ is chloro or bromo; and Pu and Py are respectively purine (Pu) and pyrimidine (Py), as defined herein above.

For purposes of simplicity, with respect to the above equations and the detailed discussion herein below, $R'$ has been shown as the preferred 2-halo lower alkyl group — i.e., 2,2,2-trichloroethyl, and Ac has been defined as benzoyloxy. Since we have found that typically best results are obtained using each of these group; however, it should be remembered that other $R'$ as defined herein above, and, of course, other Ac (acyloxy) groups, where BzO is shown, as defined herein above could also be used.

Considering the process in greater detail, the first step (i.e., step 5), replacement of the 1-O-acety (acyl) group with a 1-O-trichloroethyl (trihaloethyl) group can be effected, according to our invention, by treating the corresponding ribofuranosides of formula A' with 2,2,2-trichloroethanol and boron trifluoride etherate in a suitable inert liquid organic reaction media. Typically this treatment is conducted at temperatures in the range of about from 0° to 30°C and preferably 20° to 25°C, for about from 6 to 1 hours and preferably 1 to 2 hours. Typically a reactant mole ratio in the range of about from 3 to 4 moles of 2,2,2-trichloroethanol and about from 1 to 2 part of borontrifluoride, per part of ribofuranoside starting material (formula A'). However, temperatures, reaction times, and mole ratios both above and below these can also be used. The treatment should be conducted under anhydrous conditions. Suitable reaction media which can be used include, for example, ethyl ether, dioxane, tetrahydrofuran, and the like.

The compounds of formula A' are known compounds and can be obtained from known sources or prepared according to known procedures such as, for example, described in Methods in Carbohydrate Chemistry, Edit Whistler et al, Vol. I and II, Academic Press (1963), and by obvious modifications of such procedures. The starting materials can be a mixture of -β-D-and -α-D- anomers, or preferably the respective anomers are resolved and then treated individually as this greatly facilitates subsequence separation procedures. Similarly, for purposes of simplicity whrere formulas are referred to which are shown as a mixture of isomers, it should be remembered that unless expressly stated to the contrary that preferably the isomers are treated individually. Similarly treatment of the individual isomer yields the corresponding isomer derivative as the main product.

The resulting product of formula B' can then be separated and isolated according to any suitable separation procedures; e.g., extraction, evaporation, chromatography.

We have further found that particularly good results are obtained in this instance by using a crude form of the product as starting material for the next step of our process. Preferably, however, any residual traces of 2,2,2-trichloroethanol should be removed, for example, by vacuum evaporation.

The resulting product of formula B' is then treated according to step 6, of our process, to remove the 2, 3 - and 5'-O-benzoyl protecting groups. This can be effected by any suitable procedure for removing such group, e.g., hydrolysis. This can be conveniently effected by treating the compound of formula B', in a suitable organic solvent, methanol, ethanol with sodium methylate. Typically this treatment is conducted at temperatures in the range of about 15° to 25°C for about from 18 to 48 hours but preferably 24 hours. The reaction mixture is then treated with an ion exchange resin H+) in order to remove the sodium ions.

In the next step of our process (i.e., step 7) the 2, 3 -O-positions are preferably protected with an alkylidene protecting group, preferably isopropylidene. This can be conveniently effected by treating the compound of formula C' with a suitable dialkoxyalkane, preferably 2,2-dimethoxypropane and perchloric acid in acetone. Typically the treatment is conducted at temperatures in the range of about from 15° to 25° for about from one-fourth to 1 hour. However, temperatures and reaction times both above and below these ranges can also be used. Further, because of the relative costs of the ribofuranose of formula C' and the dialkoxyalkane, an excess of the latter is typically used. Suitable dialkoxyalkanes which can be used include, for example, 2,2-dimethoxypropane, 2,2-ethoxypropane, and the like.

The resulting product of formula D' is then treated according to step (8) of our invention to yield the respective product of formula E'. The treatment of step (8) can be effected by treating the compound of formula D' with methyl triphenoxyphosphonium iodide in a suitable inert organic solvent. Typically this treatment is conducted at temperatures in the range of about 15° to 80°C, and preferably about from 20° to 25°C for about from 1 to 48 hours, and preferably about from 18 to 24 hours. Typically the mole ratio of methyl triphenoxyphosphonium iodide to ribofuranoside of formula D', in the range of about from 1 to 2 is used. However, temperatures, reaction times and mole ratios both above and below these ranges can also be used. Suitable inert organic solvents which can be used include, for example, dimethylformamide, dimethylacetamide, pyridine, and the like. Also, although best results are obtained by using methyl triphenoxyphosphonium iodide, the combination of triphenoxyphosphine carbon tetraiodine in dimethylacetamide can also be used.

Step 9 of our process, the removal of the 2',3'-O-alkylidene protecting group can be effected by any suitable procedure for removing such protecting groups, e.g., acid hydrolysis. This step can be conveniently effected by treating the compound of formula E with a suitable organic acid. Typically, this treatment is conducted at temperatures in the range of about from 10° to 37° and preferably about from 20° to 25° for about from 18 to 48 hours and preferably about from 20 to 24 hours. Typically, an excess of acid is used, however, the pH of the solution should be maintained within the range of about from 1 to 2.5. However, temperatures, reaction times and pH ranges both above and below these ranges can also be used but generally poorer results are obtained. Suitable organic acids which can be used include, for example, formic, trifluoroacetic, acetic acids and the like. Suitable inorganic acids which can be used include, for example, hydrochloric and sulfuric acids, and the like.

Step 10 of our invention can be effected by treating the compound of formula F' with 1,5-diazabicyclo[4.3.0]non-5-ene in a suitable inert organic solvent. Typically this treatment is conducted at temperatures in the range of about from 15° to 80° and preferably about from 18 to 24 hours using mole ratios of about from 4 to 8 moles of 1,5-diazabicyclo[4.3.0]non-5-ene per mole of furanoside starting material (formula F'). However, temperatures, reaction times, and mole ratios both above and below these can also be used. Suitable inert organic solvents which can be used include, for example, dimethylformamide, dimethylacetamide, benzene, toluene and the like. Suitable reagents which can be used in place of 1,-5-diazabicyclo[4.3.0]non-5-ene include, for example, 1,4-diazabicyclo[2.2.2]octane, potassium t-butoxide and the like. Also as a subsidary aspect of this step, the 2,3-positions are typically protected with a benzoyl group by adding benzoyl chloride to the reaction mixture after the initial reaction with 1,5-dibenzocyclo[4.3.0]non-5-ene has gone to completion. Alternatively, the 2,3-position could be benzoylated by other procedures, or by any of the conventional procedures used to add such protecting groups. The addition of the 2,3-O-benzoyl groups by the addition of benzoyl chloride directly to the reaction solutions, subsequent to the initial reaction affords the advantages of eliminating a separation procedure and at the same time is easily accomplished.

This reaction is typically conducted in the ranges of about from 0° to 25°C for about from 4 to 48 hours using a slight excess of benzoyl chloride.

The next step of our process, i.e., step 11, is the keystone step of introducing the 4-fluoro group into the sugar moiety. This step can be effected by treating the compounds of formula I with iodine fluoride prepared in situ from silver fluoride and iodine, in an inert organic solvent. Typically, this treatment is conducted at temperatures in the range of about from −80° to 25°C and preferably about from 20° to 25°C using reaction times in the range of about from 4 to one-half, preferably about from 1 to 2 hours and using mole ratios in the range of about from 2 to 20 moles of silver monofluoride, and about from 5 to 20 moles of iodine per mole of 4-enofuranoside starting material. However, temperatures, reaction times and mole ratios both above and below these can also be used. Preferably the treatment is conducted by first dissolving the 4-enofuranosyl starting material in a suitable inert organic solvent and then adding the silver monofluoride reagent, continually agitating the mixture to maintain the silver monofluoride in suspension, and then slowly adding iodine either as a powder or as a solution in a suitable inert organic solvent. Also, preferably the silver monofluoride should be freshly ground before being used in order to provide fresh surfaces for reaction. Suitable inert organic solvents which can be used include, for example, benzene, dichloromethane, tetrahydrofuran, dioxane, acetonitrile, nitromethane, and the like. We have found best results are typically obtained using benzene as the solvent.

The resulting isomeric mixture of products (formula (II) can be used as starting material for the next step of our process, or the respective isomers can be separated and then the individual isomers treated separately according to the further steps of our invention. It is generally desirable to effect the resolution at this stage and then treat the respective isomers individually in order to avoid compounding of byproducts and to facilitate easy separation and purification of the desired ultimate products. This resolution can be effected by any suitable procedure and is conveniently effected by chromatography. Further, since the β-D-ribofuranoside nucleosides of our invention typically have greater activity than the α-L-lyxofuranoside nucleosides of our invention, the remaining steps will be described with respect to the β-D-isomers, though it should be remembered that the process can be also applied with respect to the epimeric mixture or with respect to the individual α-L-lxyo isomers.

The next step of our process, step 12, the preparation of 5-azido-4-fluoro compounds of formula G', can be conveniently effected by treating the corresponding compounds of formula IIa, of our invention, with lithium azide, in a suitable inert organic solvent. This treatment is typically conducted at temperatures in the range of about from 80° to 150°, preferably about from 100° to 120°, for about from 9 to 96 hours and preferably about from 24 to 48 hours using mole ratios in the range of about from 4 to 10 moles of lithium azide per mole of furanoside starting material. However, temperatures, reaction times, and mole ratios both above and below these ranges can be used. Suitable inert organic solvents which can be used include, for example, dimethylformamide, dimethylacetamide, hexamethylphosphoramide, and the like. Further, although best results are obtained using lithium azide, other reagents which could be used include, for example, sodium azide, potassium azide, tetraethylammonium azide, and the like.

The 5'-azido-substituent is then replaced with a hydroxy substituent, according to the next step of our process (i.e., step 13) by irradiating the compound of formula G' in a pyrex vessel with ultra violet light having a wave length in the range of about from 290 to 310 mμ. in a suitable inert organic solvent. Typically, this treatment is conducted at temperatures in the range of about from 15° to 35° and preferably from 20° to 95°, until no starting material is left. However, temperatures, reaction times both above and below these ranges can also be used. Irradiation can be effected by any suitable use of ultra violet light source and wave lengths shorter than 290 mμ. can be conveniently removed by use of a pyrex filter. We have further found that because of the variable extrinsic factors involved in irradiation with ultra violet light (e.g., particular light source used, density and configuration of the flask containing the reaction mixture, etc.) that is preferable that the reaction mixture be periodically, or continually, monitored and analyzed during the irradiation step to determine the degree of reaction which has occurred and then discontinuing irradiation after the desired reaction has occurred. After irradiation is complete, the reaction mixture is treated with either a dilute acid solution or with ion exchange resin in the H$^+$ form in order to hydrolyze the resulting imine to the aldehyde. Suitable inert organic solvents which can be used in the irradiation step include, for example, benzene, ethanol, methanol, and the like. Suitable dilute acid solutions which can be used include, for example, dilute aqueous solutions of hydrochloric acid, formic acid, trifluoroacetic acid, acetic acid and the like. Also, in place of an acid solution, an acidic ion exchange resin could be used. After the mixture has been neutralized, the mixture is treated with an alkali metal borohydride, preferably sodium borohydride, to reduce the aldehyde to the alcohol. This latter treatment is typically conducted at temperatures in the range of about from 15° to 35° and preferably about from 20° to 25°, for about from one-fourth to 1 hour and preferably about from one-half to three-fourths hour; typically using a stoichiometric excess of alkali metal borohydride. Excess borohydride can be destroyed by addition of a weak acid, preferably acetic acid, or H$^+$ form ion exchange resin. Where an acid is used, the acid (and also borate complexes) can, for example, be removed by evaporation followed by repeated coevaporations with, for example, toluene and then methanol.

Alternatively, replacement of the 5-azido group with a hydroxy group can be effected without the use of ultra violet light by application of the general procedure for reacting azides with nitrosonium salts described by Doyle et al in J.A.C.S. v. 92, 4999 (1970) by treating the compound of formula G' with nitrosonium tetrafluoroborate (NO$^+$BF$_4^-$), in a suitable inert organic solvent. Typically, this treatment is conducted at temperatures in the range of about from 0° to 20° and preferably about from 0° to 5° for about from one-fourth to 6 hours and preferably about from one-half to 2 hours using mole ratios of about from 1 to 2 moles of nitrosonium tetrafluoroborate per mole of furanoside starting material of formula G'. Suitable inert organic solvents which can be used include, for example, acetonitrile, and the like. Further although best results obtained using nitrosonium tetrafluoroborate, the following compounds could also be used, nitrosonium hexofluorophosphate (NO$^+$PF$_6^-$); nitrosonium hexafluoroantimonate (NO$^+$SbF$_6^-$) and the like. Preferably after the reaction has gone to completion, excess nitrosonium tetrafluoroborate, or equivalent reagent, is destroyed by the addition of sodium bicarbonate, potassium bicarbonate, ammonium bicarbonate, or the like.

The next step of our process, step 14, the 5'-position is protected with a benzoyl group. This can be effected by any suitable benzoylation procedure and is conveniently effected by treating the compound of formula H' with benzoyl chloride in a suitable inert organic solvent and base. This treatment is typically conducted at temperatures in the range of about from 0° to 35° and preferably about from 20° to 25° for about from 12 to 48 hours and preferably about from 18 to 24 hours, typically using a slight excess of benzoyl chloride. We have further found that best results are typically obtained by using pyridine as both the inert organic solvent and base, however, other inert organic solvent-base mixtures which can be used include, for example, dimethylformamide and pyridine, 1,5-diazabicyclo[4.3.0]non-5-ene and dimethylacetamide, diisopropylethylamine and dimethylformamide, and the like.

In the next step of our process (step 15), the 1-O-trichloroethyl group is replaced with an acyl group, preferably, and typically, acetyl. This step can be effected by treating the compound of formula J' with a mixture of acetic anhydride, powdered zinc, acetic acid, acetyl choride, and a small amount of water. Typically, this treatment is conducted by dissolving the compound of formula J' in acetic anhydride and then adding this solution to a suspension of powdered zinc in a mixture of acetic acid, acetyl chloride, and a small amount of water. Typically, this treatment is conducted at temperatures in the range of about from 15° to 35° and preferably about from 20° to 25° for about from 12 to 48 hours and preferably about from 16 to 18 hours. Also, preferably the mixture is agitated during the treatment in order to keep the powdered zinc in suspension. The resulting 1-O-acetyl product of formula IIIa will remain in solution and can be conveniently recovered by filtration followed by evaporation of the filtrate affording product residue which can be further purified according to any suitable procedure; typically chromatography.

The next step of our process (step 16), the 1-O-acetyl group is replaced with a 1-chloro or 1-bromo group. This treatment can be effected by treating the compound of formula IIIa with anhydrous hydrogen chloride or hydrogen bromide, depending upon whether the 1-chloro or 1-bromo compound is desired, in an inert organic solvent. Typically, this step is conducted by dissolving the compound of formula IIIa in a suitable inert organic solvent and then passing anhydrous gaseous hydrogen chloride or hydrogen bromide through the mixture. Typically for hydrogen bromide this treatment is conducted at temperatures in the range of about from 0° to 25° and preferably about from 0° to 5° for about from 1 to 5 hours and preferably about from 3 to 4 hours. Typically where hydrogen chloride is used, longer reaction times on this order of about from one to two days are used. The solvent can be removed by any suitable procedure and is conveniently removed by evaporation affording a crude 1-chloro or 1-bromo product which is sufficiently pure for use as starting material in subsequent steps. Also, preferably the crude product is used as starting material for the subsequent steps of our process, without any further purification since the product is easily degraded and thus, further purification could result in degradation of a substantial portion of the product.

The unprotected pyrimidine nucleoside of formula IV, where A is —CH$_2$OH, of our invention, can be prepared according to step 17 of our process, by condensing the compounds of formula IIIb with the desired pyrimidine base. We have discovered this can be conveniently effected via the condensation process described by E. Wittenburg, in Chemische Berichte, v. 101, 1095 (1968), by treating the compounds of formula IIIb with a bis or tris(trimethylsilyl)pyrimidine and mercuric bromide and mercuric oxide, in a suitable inert organic solvent. Typically this treatment is conducted by first dissolving crude product of step 16 (i.e., formula IIIb) in a suitable inert organic solvent (e.g., benzene) and then adding mercuric bromide and mercuric oxide. The reagents are preferably azeotropically distilled to remove any water. The desired bis or tris(trimethylsilyl)uracil is then added to the reaction mixture. The treatment should be conducted under anhydrous conditions. Typically, this treatment is conducted at temperatures in the range of about from 60° to 100° and preferably about from 80° to 90° for about from 3 to 8 hours and preferably about from 4 to 5 hours. Typically ratios in the range of about from 1 to 2 moles of mercuric bromide, 1 to 2 moles of mercuric oxide about from 1 to 2 moles of bis or tris(trimethylsilyl)pyrimidine, per mole of furanoside starting material of formula IVa are used. The resulting product of formula IIc after removal of protecting groups has utility as an antimetabolite agent and further as an intermediate in the production of further compounds of our invention which will be subsequently described.

Alternatively the pyrmidine nucleosides of formula IV where A is —CH$_2$OH, of our invention, can be prepared directly from the furanoside compounds of formula IIIa, according to step 17a, by applying the procedure of Niedballa and Vorbruggenn described in Angew. Chem. Internat., Ed. Vol. 9, 461 (1970). This procedure affords very good yields. Examples of pyrimidine nucleosides, of formula IIc of our invention, which can be prepared by this procedure are described hereinbelow in Example 17a and for purposes of brevity will not be repeated here. Accordingly, this step can be effected by dissolving the compound of formula IIIa and the appropriate bis or tris(trimethylsilyl)pyrimidine in 1,2-dichloroethane and then adding tin tetrachloride. Typically, this portion of the treatment is conducted at temperatures in the range of about from 20° to 80° and preferably about from 20° to 25° for about from 2 to 18 hours and preferably about from 4 to 6 hours using about from 2 to 5 moles of tin tetrachloride per mole of furanose starting material. As a subsidary step to this treatment, the 2', 3', 5'-tri-O-benzoyl protecting groups can be removed by treating the product of the aforementioned treatment with methanol and concentrated aqueous ammonia hydroxide. This hydrolysis treatment is typically conducted at temperatures in the range of about from 15° to 35°C and preferably about from 20° to 25°C for about from 12 to 48 hours, preferably 18 to 24 hours, using 30 parts (by wt.) of concentrated ammonium hydroxide and 30 parts (by wt.) of methanol per part (by wt.) of nucleoside.

A number of the purine nucleosides of formula IV wherein A$^1$ is —CH$_2$OH (or the protected alcohol group — i.e., —CH$_2$OAc, e.g., 5'-benzoyloxy) can be prepared by condensation of the corresponding furanoside of formula III (X is chloro or bromo) with the desired purine base. The resulting purine nucleosides can in turn be used as intermediates for the preparation of additional purine derivatives of formulas IV, V and VI of our invention. The initial condensation step, and subsequent removal of protecting groups (if desired), can be schematically represented by the following overall reaction equations:

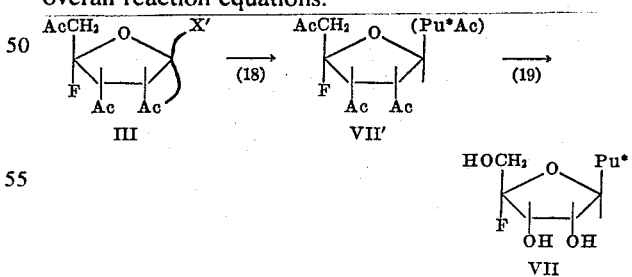

where X' is chloro or bromo; Pu* is a purine base selected from the group: 6-chloropurine; 2-acetamido-6-chloropurine; 2,6-dichloropurine; 6-hydrazinopurine; hypoxanthine; xanthine; guanine; 8-azaguanine; 7-deazaguanine; adenine; 2-fluoroadenine; 2-chloroadenine; 2-azaadenine; N$^6$-methyladenine; 8-aza-9-deazaadenine; 7-deaza-7-cyanoadenine; 8-azaadenine; and (Pu*Ac) is selected from the same group of purine bases as P* but wherein the free amino group of the purine base (e.g., $N^6$ in adenines and $N^2$ in guanines) is protected with an acyl group.

Step 18, of the above process, can be effected by treating the furanosides of formula III wherein X is chloro or bromo and $R^1$ and $R^2$ are acyloxy with a suitable chloromercuri purine base (wherein the free amino groups protected with an acyl protecting group such as, for example, anisoyl, acetyl, benzoyl), in a suitable inert organic solvent. This treatment is typically conducted at temperatures in the range of about from 60° to 120°C, and preferably about from 80° to 90°C for about from one-fourth to 2 hours, and preferably about from one-half to 1 hour using amole ratio of about from 1 to 2 moles of chloromercuric purine per mole of 4-fluoro-ribofuranoside of formula IVa. The treatment is conducted under anhydrous conditions and best results are obtained at the reflux temperature of the system. Suitable inert organic solvents which can be used include, for example, benzene, toluene, xylene, and the like. Also, typically best results are obtained by using furanoside starting materials where both the 2 and 3 positions have benzoyl protecting groups (i.e., Ac is benzoyloxy). Similarly best results are obtained where the chloromercuri purine free amino groups are protected with benzoyl at $N^6$ or acetyl at $N^2$ groups. Suitable chloromercuric purines which can be used include, for example, $N^6$-benzoyl-chloromercuriadenine; $N^6$-benzoyl-chloromercuri-2-fluoroadenine; $N^6$-benzoyl-chloromercuri-2-chloroadenine; $N^6$-benzoyl-chloromercuri-2-azaadenine; $N^6$-benzoyl-chloromercuri-7-deazaadenine; $N^6$-benzoyl-chloromercuri-7-cyano-7-deazaadenine; $N^6$-benzoyl-chloromercuri-8-azzaadenine; $N^6$-benzoyl-$N^6$-methyl-chloromercuri-adenine; chloromercuri-hypoxanthine; chloromercuri-xanthine; $N^2$-acetylchloromercuri-guanine; $N^2$-acetyl-chloromercuri-8-azaguanine; $N^2$-acetyl-chloromercuri-7-deazaguanine; 6-chloro-chloromercuripurine; 2-acetamido-6-chloromercuri-purine; and 2,6-dichlorochloromercuri-purine.

The 2', 3', 5'-benzoyl and N-acyl protecting groups can be removed according to step 19 of our process by any suitable procedure such as, for example, base hydrolysis. This can be conveniently effected by treating the compounds of formula IIu with concentrated aqueous ammonium hydroxide in a suitable inert organic solvent. Typically, this treatment is conducted by dissolving the benzoylated product of step 18 (formula VII') in a mixture of the suitable inert organic solvent and concentrated aqueous ammonium hydroxide. Typically, this treatment is conducted at temperatures in the range of about from 15° to 35°C and preferably about from 20° to 25°C for about from 6 to 36 hours and preferably about from 12 to 24 hours. Typically about a 5% (wt.) solution of the benzoylated nucleoside in a 1:1 (vol.) mixture of methanol and concentrated ammonium hydroxide is used.

The 6-mercaptopurine and 2-amino-6-mercaptopurine nucleosides of formula IV ($A^1$ is —$CH_2OH$) and the 6-lower alkylthiopurine and 2-amino-6-lower alkylthiopurine nucleosides of formula IV ($A^1$ is —$CH_2OH$) are prepared via steps 20 and 21, respectively. These steps can be represented by the following schematic overall reaction equations:

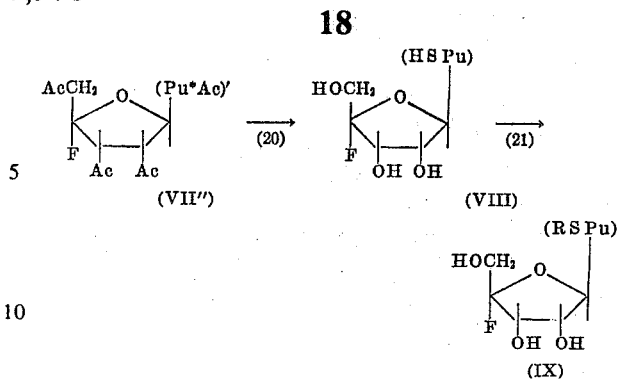

wherein (Pu*Ac)' is 6-chloropurine or 2-acetamido-6-chloropurine;
(HSPu) is 6-mercaptopurine or 2-amino-6-mercaptopurine; and
(RSPu) is 6-lower alkylthiopurine or 2-amino-6-lower alkylthiopurine.

Step 20 can be effected by treating the corresponding 6-chloropurine or 2-acetamido-6-chloropurine nucleosides of formula VII'' with thiourea in a suitable inert organic solvent such as, for example, methanol or ethanol. Typically, this treatment is conducted at temperatures in the range of about from 80° to 120°C, and preferably about from 90° to 110°C, for about from 2 to 6 hours and preferably about from 2 to 3 hours, using a slight excess of thiourea. Preferably, this treatment is conducted at the reflux temperature of a system and preferably conducted using a reaction solution of pH of about from 5.5 to 6.5, and preferably about 6. The pH can be maintained within this range by the addition of any suitable alkaline solution, for example, sodium hydroxide dissolved in the same inert organic solvent as used for the initial reaction mixture or other compatible inert organic solvents. Preferably the treatment is conducted under anhydrous conditions and again we have found that typically best results are obtained using nucleoside starting materials (formula VII'') having benzoyl protecting groups at the 2',3', and 5' positions (i.e., wherein Ac is benzoyloxy).

Further as a subsidary step to step 20, the 2',3',5'-benzoyl, or other acyloxy, protecting groups can be conveniently removed, after the mercapto reaction has gone to completion, by adding ammonium hydroxide to the reaction mixture and allowing the mixture to stand at ambient temperature (about 20°C) for about 20 to 30 hours. Alternatively the protecting groups can be removed via treatment with sodium methoxide at ambient temperatures for about from 2 to 5 hours, typically about 3 hours.

Step 21, can be effected by treating the corresponding 6-mercaptopurine or 2-amino-6-mercaptopurine nucleoside product of step 20 (formula VIII) with a suitable lower alkyl halide in a suitable inert organic reaction media. Typically, this treatment is conducted at temperatures in the range of about from 20° to 100°C and preferably about from 4 to 24 hours using mole ratios in the range of about from 1 to 2 moles of lower alkyl halide per mole of nucleoside starting material. Preferably this treatment is conducted under slightly alkaline conditions, and best results are obtained when the pH is in the range of from 10 to 13 is used by addition of e.g., $K_2CO_3$ or sodium hydroxide. Suitable inert reaction media, which can be used include, for example, methanol, dimethylformamide, and the like. Suitable lower alkyl halide reagents, which can be used include, for example, methyl iodide, ethyl iodide, propyl iodide, t-butyl iodide, and the like.

The 6-lower alkylamino-, and 6-di(lower alkyl)aminopurine nucleosides of formula IV ($A^1$ is —$CH_2OH$) are prepared according to step 22 and the 6-substituted amino-, and 2-amino-6-substituted amino-, nucleosides of formula IV ($A^1$ is —$CH_2OH$) are prepared according to step 22a. These steps can be schematically represented by the following overall reaction equations:

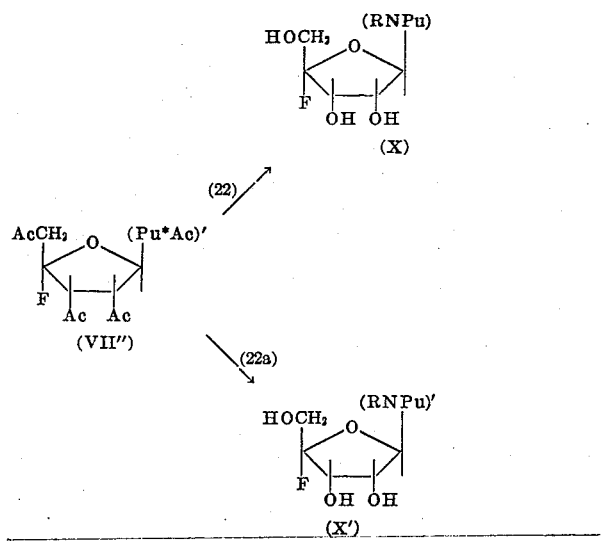

wherein (Pu*Ac)' is 6-chloropurine or 2-acetamido-6-chloropurine;
(RNPu) is 6-lower alkylaminopurine; 6-di(lower alkyl)aminopurine; 2-amino-6-lower alkylaminopurine; 2-amino-6-di(lower alkyl)aminopurine;
(RNPu)' is a purine base selected from the group 6-hydrazinopurine; 6-hydroxylaminopurine; 6-(γ,γ-dimethylallylamino)purine; 6-arylamino; 6-(hydroxyethylamino)purine; 6-(1-adamantylamino)purine; 6-(4-hydroxy-3-methyl-2-butenylamino)purine; 6-[N-methyl-N-(1-hydroxy-1-phenyl-2-propyl)amino]-purine; and the corresponding 2-amino derivatives of each of the above purine bases (for example, 2-amino-6-hydrazino-purine).

Step 22 can be effected by treating the corresponding 6-chloropurine and 2-acetamido-6-chloropurine compounds, of formula VII'', respectively, with either a lower alkylamine or di(lower alkyl)amine, depending upon whether the corresponding 6-lower alkylamino purine nucleoside or 6-di(lower alkyl)aminopurine nucleoside is desired, in a suitable inert organic solvent. Preferably this condition is treated under anhydrous conditions and is typically conducted under temperatures in the range of about from 80° to 140°C and preferably about from 90° to 110°C, for about from 2 to 8 hours and preferably about from 4 to 5 hours. Suitable inert organic solvents which can be used include, for example, methanol, ethanol, t-butanol, propanol, butanol, and the like. Suitable lower alkylamines and di(-lower alkyl)amines which can be used include, for example, methylamine, dimethylamine, ethylamine, diethylamine, t-butylamine, neopentylamine and the like. Also again best results are obtained by using nucleoside starting materials protected at the 2',3' and 5'positions with benzoyl groups (i.e., wherein Ac is formula VII'' is benzoyloxy).

The corresponding 6-substituted amino-purine nucleosides, of formula X', of our invention, can be prepared, according to step 22a, by treating the corresponding 6-chloropurine or 2-acetamido-6-chloropurine nucleosides of formula VII'' with the desired suitable substituted amine in an inert organic solvent. Preferably this treatment is conducted with the reflux temperature of this system and is typically conducted at temperatures in the range of about from 80° to 140°C. Suitable substituted amines, which can be used include, for example, 2-aminoethanol; neopentylamine; t-butylamine; hydrazine; hydroxylamine; γ,γ-dimethylallylamine; 4-hydroxy-3-methyl-2-butenylamine; benzylamine; bis(2-hydroxyethyl)amine; 1-adamantylamine, 6-(N-methyl-N-(1-hydroxy-1-phenyl-2-propyl)aminopurine, and the like. Suitable inert organic solvents which can be used include, for example, isopropanol, ethanol, t-butanol, propanol, butanol and the like. Best results are again typically obtained by using nucleoside starting materials protected at the 2', 3', and 5'-positions with benzoyl groups (i.e., wherein Ac in formula VII'' is benzoyloxy).

The 2-chloroadenine nucleosides of formula IV ($A^1$ is —$CH_2OH$), of our invention, and the corresponding 2-lower alkylthioadenine nucleosides of formula IV ($A^1$ is —$CH_2OH$) are prepared via steps 23 and 24, respectively. These steps can be schematically represented by the following overall reaction equations:

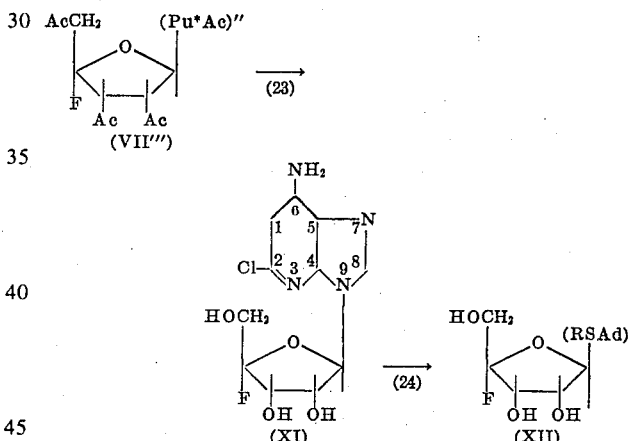

wherein (Pu*Ac)'' is 2,6-dichloropurine; and (RSAd) is 2-lower alkylthioadenosine.

The 4'-fluoro-2-chloroadenosine of formula XI can be conveniently prepared (step 23) by treating the 2,6-dichloropurine nucleoside of formula VII''' with ammonia in a suitable inert organic solvent such as, for example, methanol. This treatment is typically conducted at temperatures in the range of about from 10° to 50°C for about from 2 to 5 hours. Again best results are obtained using nucleoside starting materials protected at the 2', 3' and 5'-positions with benzoyl groups (i.e., wherein Ac in formula VII''' is benzoyloxy). Also as can be seen from the above reaction equation, the protecting groups are split off during the course of the treatment.

Step 24 can be effected by treating 4'-fluoro-2-chloroadenosine (formula XI) with a suitable alkali metal lower alkylmercaptide in a suitable inert organic solvent such as, for example, dimethylformamide. Typically this treatment is conducted at temperatures in the range of about from 50° to 100°C for about from 4 to 8 hours. Suitable alkali metal lower alkylmercaptides which can be used include, for example, sodium methylmercaptide; sodium ethylmercaptide; sodium n- propylmercaptide; sodium butylmercaptide; potassium methylmercaptide; potassium ethylmercaptide; potassium n-propylmercaptide; potassium butylmercaptide.

The 5-lower alkylamino- and 5-di(lower alkyl)aminopyrimidine nucleosides of formula IV ($A^1$ is —$CH_2OH$) can be prepared according to step 25. This step can be schematically represented by the following overall reaction equation:

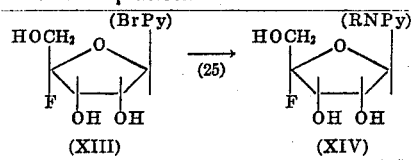

wherein (BrPy) is 5-bromocytosine or 5-bromouracil; (RNPy) is 5-lower alkylaminocytodine; 5-lower alkylaminouracil; 5-di(lower alkyl)-aminocytosine; or 5-di-(lower alkyl)-aminouracil.

This step is conveniently effected by treating the corresponding 5-bromocytosine or 5-bromouracil compound of formula XIII with a suitable lower alkylamine, or di(lower alkyl)-amine depending on whether the corresponding 5-lower alkyl amino or 5-di(lower alkyl) amino nucleoside. Typically, this treatment is conducted at temperatures in the range of about from 60° to 120°C for about from 12 to 48 hours, and is preferably conducted under anhydrous conditions. Suitable lower alkylamines and di(lower alkyl)amines which can be used include, for example, methylamine, dimethylamine, ethylamine, diethylamine, butylamine, dibutylamine, and the like.

The 5-amino-4'-fluorouridine and 5-amino-4'-fluorocytidine nucleosides of formula IV, $A^1$ is —$CH_2OH$, of our invention, can be prepared from the corresponding 5-nitrouridine or 5- nitrocytidine, respectively, nucleosides of formula IV ($A^1$ is —$CH_2OH$), of our invention, according to step 25a of our process. This step is conveniently effected by treating the 5-nitrouridine or 5-nitrocytidine compounds of formula IV ($A^1$ is —$CH_2OH$) and preferably $R^1$ and $R^2$ are each hydroxy) with gaseous hydrogen in the presence of a suitable hydrogenation catalyst — such as, for example, palladium impregnated charcoal — in a suitable inert organic solvent. Typically, this treatment is conducted by first dissolving the corresponding 5-nitrouridine or 5-nitrocytidine nucleoside, of our invention, in a suitable solvent containing a suspension of the hydrogenation catalyst and then keeping the suspension under a layer of gaseous hydrogen with vigorous stirring. Typically, this treatment is conducted at temperatures in the range of about from 15° to 35°C and preferably about from 20° to 25°C for about from 2 to 24 hours and preferably about from 3 to 6 hours.

The pyrimidin-2-one nucleoside derivatives of formula IV wherein $A^1$ is —$CH_2OH$, of our invention, can be prepared according to step 25b, of our process, by treating the corresponding cytosine, and substituted cytosine, nucleosides of formula IV ($A^1$ is —$CH_2OH$ and preferably $R^1$ and $R^2$ are hydroxy) with an aqueous solution of hydroxylamine·hydrochloride ($NH_2OH·HCl$). Typically this treatment is conducted at temperatures in the range of about from 15° to 35°C, and preferably about from 20° to 25°C, for about from 1 to 60 days and preferably about from 3 to 20 days. Typically about a 18 to 25% by weight hydroxylamine·hydrochloride aqueous solution will be used. Sufficient solution to provide a mole ratio of about 2 to 5 moles of $NH_2OH·HCl$ per mole of nucleoside starting material is used. Also in place of water, solvents such as dimethylformamide, dimethyl sulfoxide or hexamethylphosphoramide and the like could be used.

The 5'-deoxy-4'-fluoro-5'-iodo purine and pyrimidine nucleosides, of our invention (formula IV; $A^1$ is $CH_2I$), can be prepared from the corresponding nucleosides of formula IV, wherein $A^1$ is —$CH_2OH$ via the following overall schematic reaction equations:

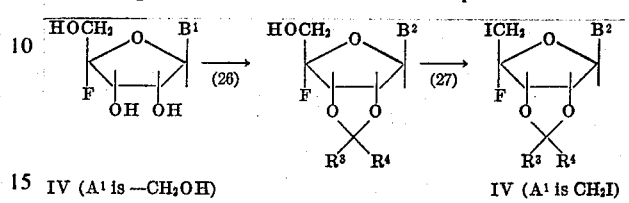

wherein $R^3$ and $R^4$, and $B^2$ are as defined herein above.

As indicated in the above equations, the 2',3'-position of the 4'-fluoro nucleosides is preferably first protected, according to step 26, with a suitable alkylidene protecting group — preferably and typically isopropylidene. This can be effected by any suitable procedure for adding such protecting groups and can be conveniently effected according to the procedures described by A. Hampton in the Journal of the Americal Chemical Society vol. 83, 3640 (1961). This step can, for example, be conveniently effected by treating the compounds of formula XIV with 2,2-dimethoxypropane and acetone in the presence of a suitable acid such as, for example, perchloric acid or in the presence of di-para-nitrophenyl phosphate.

The 2',3'-protected nucleosides can then be converted to the corresponding 2',3'-protected-5'-deoxy-4'-fluoro-5'-iodo nucleosides of formula V ($A^2$ is $CH_2I$) of our invention, via step 27 of our process. This can be conveniently effected according to the procedure described in U.S. Pat. No. 3,282,921 for the general preparation of 5'-deoxy-5'-iodo nucleosides. We have found that best results can be obtained, according to this procedure, with respect to step 27, by treating the 2',3'-protected-4'-fluoro nucleosides of formula XIV', with methyltriphenoxyphosphonium iodide in a suitable inert organic solvent, preferably dimethylformamide, at temperatures in the range of about from 15° to 35°C preferably about 20 to 25, using a slight stoichiometric excess of methyltriphenoxyphosphonium iodide. Further, details concerning this treatment such as, for example, alternative reagents and solvents can be had by reference to the aforementioned U.S. patent.

The 5'-deoxy nucleosides of formula V ($A^2$ is —$CH_3$), of our invention, are prepared according to steps 28 and 28a from the corresponding nucleosides of formula IV (wherein $A^1$ is —$CH_2I$). This can be represented by the following overall schematic reaction equations:

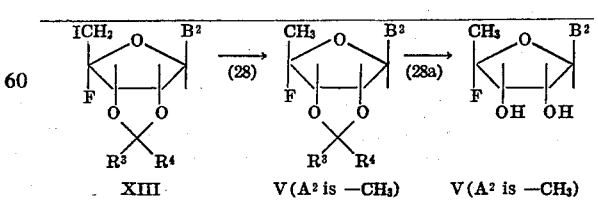

wherein $B^2$, $R^3$ and $R^4$ are as defined hereinabove, and preferably with respect to the purine bases wherein the free amino groups of the starting materials are protected with acyl groups having from 2 through 12 carbon atoms and preferably benzoyl.

The 5'-deoxy-4'-fluoro nucleosides, of our invention, are prepared according to step 28 by the reduction of the corresponding 5'-deoxy-4'-fluoro-5'-iodo nucleosides of our invention. This reduction can be effected by treating the 5'-iodo nucleosides with gaseous hydrogen in the presence of a suitable catalyst in a suitable inert organic solvent. This treatment is typically conducted by first dissolving the 5'-iodo-nucleosides starting material in a suitable solvent containing a suitable particulate catalyst in suspension, and then vigorously stirring this suspension under a gaseous hydrogen atmosphere. Typically, this treatment is conducted at temperatures in the range of about from 15° to 35° for about from 1 to 24 hours and then preferably conducted under pressures in the range of about from 1 to 10 atmospheres. We have further found that exceptionally good results are obtained by using a particulate palladium impregnated barium sulfate catalyst, however, other catalysts which can be used include, for example, palladium impregnated charcoal and the like. Suitable solvents which can be used include, for example, ethyl acetate, methanol, ethanol and the like.

The 2',3'-O-alkylidene protecting group can be removed by acid hydrolysis (step 28a). This can be conveniently effected by treating the resulting product of the above step with aqueous formic acid at temperatures in the range of about from 15° to 37°C for about from 4 to 24 hours. Where purine nucleosides having the free amino groups in the purine moieties protected with benzoyl groups, such benzoyl protecting groups can be removed by base hydrolysis. This can be conveniently effected by treating the above product with a mixture of ammonium hydroxide and methanol, or other suitable inert organic solvents, at temperatures in the range of about from 15° to 40°C for about from 12 to 36 hours.

The 5'-amino nucleosides of formula V ($A^2$ is $-CH_2NH_2$), of our invention, can be prepared via a 5'-azido nucleoside intermediate. This intermediate can be prepared from the corresponding 5'-iodo nucleosides of formula IV ($A^1$ is $-CH_2I$), of our invention, via step 29. Step 29 can be represented by the following overall schematic reaction equations:

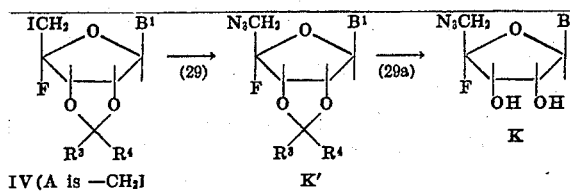

wherein $B^1$ is as defined hereinabove, and preferably with respect to the purine base wherein the free amino groups of the starting materials are protected with acyl groups having from two through 12 carbon atoms, and preferably benzoyl.

Step 29 can be effected by treating the corresponding 2',3'-O-alkylidene protected 5'-iodo compounds of formula IV ($A^1$ is $-CH_2I$), with lithium azide in a suitable inert organic solvent. This treatment is typically conducted at temperatures in the range of about from 80° to 150°C and preferably about from 100° to 120°C for about from 12 to 36 hours and preferably about from 18 to 24 hours, using a mole ratio of about from 4 to 10 moles of lithium azide per mole of nucleoside starting material. Suitable inert organic solvent which can be used include, for example, dimethylformamide, dimethylacetamide, hexamethylphosphoramide and the like. Also, although best results are obtained using lithium azide, the following azide compounds could also be used, sodium azide, tetramethylammonium azide and the like. If desired, the 2',3'-O-alkylidene protecting group can be removed by acid hydrolysis (step 29a) using the same procedures as described hereinabove, with respect to the 5'-deoxy nucleosides. Again, where purine nucleoside starting materials having benzoyl protecting groups protecting the free amino groups and purine base moiety, such benzoyl groups can be removed by alkaline hydrolysis. This can again be effected by treating the product with a mixture of concentrated ammonium hydroxide and methanol under the same conditions as described above.

The preparation of the 5'-amino nucleosides of formula V, of our invention, can be represented by the following schematic overall reaction equations:

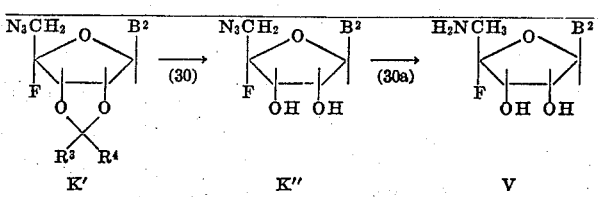

wherein $B^2$ is as defined hereinabove, and preferably with respect to the purine base wherein the free amino groups of the starting materials are protected with acyl groups having from two through 12 carbon atoms, and preferably benzoyl.

Step 30, removal of the 2',3'-O-alkylidene protecting group, can be effected by any suitable procedure for removing such group such as, for example, by acid hydrolysis. Removal of the protecting group by acid hydrolysis can be conveniently effected by treating the nucleoside of formula K' with concentrated aqueous trifluoroacetic acid at temperatures in the range of about from 0° to 25°C for about from 1 to 10 hours.

Step 30(a) can be effected by treating the unprotected nucleoside of formula K" with gaseous hydrogen in the presence of a suitable catalyst in a suitable inert organic solvent. This treatment can be conveniently effected by dissolving the resulting 2',3'-unprotected-5'-azido product in a suitable inert organic solvent such as, for example, ethyl acetate, preferably containing a suitable catalyst such as, for example, palladium impregnated barium sulfate, in suspension and then stirring this suspension under an atmosphere of hydrogen.

The nucleosides of formula IV (wherein $A^1$ is $-CH_2OH$), with the exception of the 4-thiouridine and 2,4-dithiouridine nucleosides can also be prepared from the corresponding 5'-azido nucleosides of formula K (i.e. $K_1$ below). This preparation can be represented by the following schematic overall reaction equations.

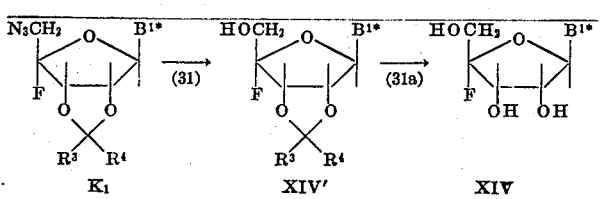

where $B^{1*}$ is selected from the same group of purine and pyrimidine bases as $B^1$ with the exception of 4-thiouridine, and 2,4-dithiouridine, and preferably with respect to the purine base wherein the free amino groups of the starting materials are protected with acyl groups having from two through 12 carbon atoms, and preferably benzoyl.

Step 31 can be effected by irradiating the corresponding 5'-azido nucleoside of formula $K_1$, in a suitable inert organic solvent, with ultra violet light having a wave length in the range of about from 290 to 310 m$\mu$. Irradiation can be effected by use of any suitable ultra violet light source and wave lengths shorter than 290 m$\mu$. can be conveniently removed by use of a pyrex filter. Typically this treatment is conducted at temperatures in the range of about from 0° to 35°C and preferably about from 20° to 25°C. Also, because of the wide variation in the factors controlling the effective intensity of the ultra violet light applied to the reaction mixture, it is preferred that the reaction mixture be actually monitored, and irradiation continued until the desired degree of reaction has occurred, until a representative treatment duration can be obtained. This yields the corresponding 5'-aldehyde nucleosides which can then be reduced to the corresponding 5'-alcohol ($A^1$ is —$CH_2OH$) by any suitable reduction procedure. This reduction can, for example, be conveniently effected by treatment with sodium borohydride in a suitable inert organic solvent (e.g., ethanol) at temperatures in the range of about from 15° to 25°C for about from 10 to 30 minutes.

The 2',3'-O-alkylidene protecting group can be removed by acid hydrolysis (step 31a). This can be conveniently effected via treatment with aqueous formic acid via the procedure described hereinabove with respect to the removal of such protecting group. Similarly, benzoyloxy protecting groups on the free amino group of the purine moiety of purin nucleosides can be removed by alkaline hydrolysis, for example, by treatment with a mixture of concentrated ammonium hydroxide and methanol.

Alternatively, the nucleosides of formula XIV' can be prepared directly from the 5'-iodo nucleosides of our invention, by treating the corresponding 5'-iodo nucleoside of formula IV with a suitable divalent silver ($Ag''$) compound such as, for example, silver oxide (AgO), in a suitable solvent such as, for example, aqueous acetic acid. This treatment is typically conducted at temperatures in the range of about from 15 to 25°C, conveniently 20°C, for about from 12 to 24 hours. This treatment affords the corresponding 4'-aldehyde nucleosides which can then be reduced to the corresponding 5'-alcohol ($A^1$ is —$CH_2OH$) nucleosides.

The 4'-fluoro-5'-sulfamoyl nucleosides of formula VI of our invention, and also the corresponding 4'-fluoro-5'-sulfamoyl-adenine and hypoxanthine nucleosides, can be prepared from the corresponding 4'-fluoro nucleosides of our invention. The process of preparing these compounds can be represented by the following schematic overall reaction equations:

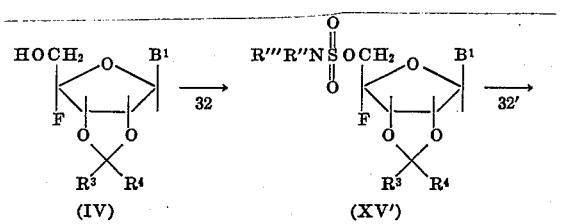

(IV)    (XV')

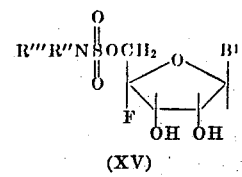

(XV)

wherein $B^1$ is as defined herein above, and preferably with respect to the purine base wherein the free amino groups of the starting materials are protected with acyl groups having from two through 12 carbon atoms, and preferably benzoyl. Step 32 can be effected by treating the corresponding 2',3'-O-protected nucleosides of formula IV ($A^1$ is —$CH_2CH$) with sulfamoyl chloride

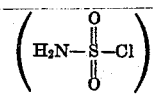

or the desired R", R'" substituted sulfamoyl chloride

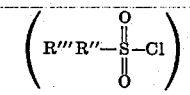

in a suitable inert organic solvent and suitable mixture bases. This treatment is typically conducted at temperatures in the range of about from 0° to 35°C, and preferably about from one-half to 10 hours, and preferably about from 1 to 2 hours, using a mole ratio of about from 1 to 5 moles of sulfamoyl chloride or substituted chloride per mole of 4'-fluoro nucleoside starting material. Suitable inert organic solvent and base mixtures which can be used include, for example, pyridine and dimethylformamide; pyridine and dimethylacetamide; 1,5-diazabicyclo-[4.3.0]non-5-ene and dimethylacetamide; and the like. Also pyridine can be used alone, serving as both the solvent and base, and typically best results are obtained by using pyridine alone. Suitable substituted sulfamoyl chlorides which can be used include, for example, N-methylsulfamoyl chloride; N,N-dimethylsulfamoyl chloride; N-butylsulfamoyl chloride; N,N-dibutylsulfamoyl chloride and the like.

The 2',3'-O-alkylidene protecting groups can be removed by acid hydrolysis (step 32') according to the same procedures described herein above such as, for example, by treatment with aqueous formic acid. Similarly acyl protecting groups on the purine free amino groups can be removed in the same manner as described herein above.

Step 32 can also be effected by first treating the corresponding nucleosides of formula IV ($A^1$ is —$CH_2OH$) with dibutyltin oxide in a suitable inert organic liquid media and then adding sulfamoyl chloride, or the desired substituted sulfamoyl chloride, dissolved in a suitable inert organic solvent such as, for example, dioxane. The dibutyltin oxide treatment is typically conducted at the reflux temperature of the system with continuous azeotropic removal of the water byproduct formed by the treatment. This treatment is typically continued for a duration of about from 1 to 3 hours. Suitable inert organic liquid media which can be used include, for example, benzene, toluene, xylene and the like. The treatment with sulfamoyl chloride is typically conducted after completion of the dibutyltin oxide treatment, by dissolving the sulfamoyl chloride, or substituted sulfamoyl chloride, in a suitable inert organic solvent such as, for example, dioxane, and then adding this solution directly to the dibutyltin oxide reaction mixture. This treatment is typically conducted at temperatures in the range of about from 0° to 20°C for about from 30 to 90 minutes. Suitable substituted sulfamoyl chlorides which can be used include, for example N-methylsulfamoyl chloride; N,N-dimethylsulfamoyl chloride; N-butylsulfamoyl chloride; N,N-dibutylsulfamoyl chloride and the like.

Alternatively, we have found that a number of the 4'-fluoro-5'-O-sulfamoyl nucleosides of formula XV' can be prepared by a slightly more complex two-step process (step 30b) which affords higher yields than step 30. In the first step of this alternative procedure, the corresponding 4'-fluoro-2',3'-O-alkylidene-nucleosides of formula IV ($A^1$ is $-CH_2OH$) of our invention, is treated with sodium hydride, in a suitable inert organic solvent. This step is typically conducted at temperatures in the range of about from 0° to 20°C for about from 1 to 4 hours. After this step has been completed, sulfamoyl chloride is added to the reaction mixture. This second step, typically conducted at temperatures in the range of about from −10° to 30°C and preferably about from 0° to 5°C for about from 2 to 48 hours and preferably about from 18 to 24 hours using a mole ratio of about from 1 to 5 moles of sulfamoyl chloride per mole of nucleoside starting material.

The 5'-phosphate of formula IV ($A^1$ is $-CH_2OPO(OH)_2$), of our invention, can be prepared from the corresponding nucleosides of formula IV ($A^1$ is $-CH_2OH$) of our invention. The process of preparing these compounds can be represented by the following overall reaction equations:

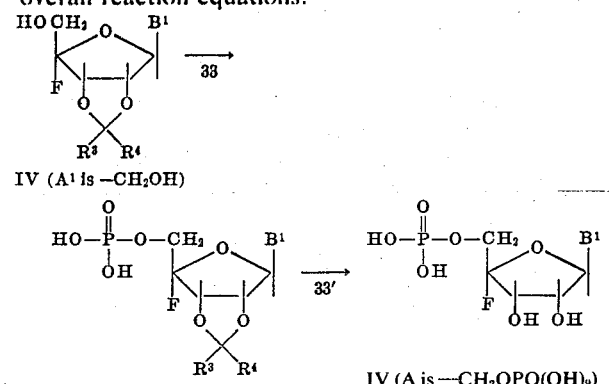

wherein $B^1$ is as defined above and with respect to the purine bases, the free amino groups of the starting materials can be protected with acyl groups having from two through 12 carbon atoms and preferably benzoyl or acetyl.

Step 33 can be effected by any suitable procedure for phosphorylating nucleosides having 5'—OH groups such as, for example, via treatment with cyanoethyl phosphate and dicyclohexylcarbodiimide in anhydrous pyridine, followed by treatment with sodium hydroxide — according to the general procedure described by Tener in J.A.C.S. 83, 159 (1961). Step 33 can also be conveniently effected according to the general procedure described by Yoshikawa et al in Bull. Chem. Soc. Japan, 42, 3505 (1969) (step 33) via treatment with phosphoryl chloride or pyrophosphoryl chloride ($P_2O_3Cl_4$) in a suitable solvent such as, for example, trimethyl phosphate or phenol. This treatment is typically conducted at temperatures in the range of about −3° to 5°C for about from 1 to 4 hours. After this treatment is completed, the P—Cl bonds and alkylidene function can be hydrolyzed, for example, by the simple addition of water.

Although the above overall reaction equations have been shown, for purposes of simplicity, with respect to the β-D-ribo isomers, it is again stress that the processes are also applicable with respect to the α-L-lyxo isomers and to epimer mixtures of the β-D-ribo and α-L-lyxo isomers. Also, the 5'-iodo-β-D-ribo nucleoside isomers of formula IV can be converted to the corresponding α-L-lyxo isomers, and vice-versa via treatment with boron trifluoride in a suitable inert organic solvent such as, for example, dioxane or tetrahydrofuran, followed by the addition of a suitable fluoride ion source such as, for example, silver fluoride or tetraethylammonium fluoride. This treatment is typically conducted at temperatures in the range of about from 10° to 30°C, for about from 2 to 6 hours.

Also with the exception of the products of step 16, which as noted above is preferably used in the crude form, it is preferred that each of the respective intermediates and products formed by the above reaction steps is isolated prior to its use as starting materials for the next succeeding steps. Separation and isolation of the intermediates and products can be effected by any suitable separation or purification procedure such as, for example, crystallization, chromatography, thin-layer chromatography, etc. Specific illustrations of typical separation and isolation procedures can be had by reference to the examples described hereinbelow. However, other equivalent separation or isolation procedures could, of course, also be used.

Other pharmaceutically acceptable salts of the 5'-phosphate nucleosides of formula IV can, for example, be conveniently prepared from the disodium phosphate salts (note Example 33) via cation exchange with a suitable ion exchange resin in the desired cation form. Pharmaceutically acceptable salts of the free amino groups can be prepared via neutralization of the free amino group with the desired acid.

The compounds of formulas Iv, V and VI exhibit general antimetabolite activity in mammals and are also intermediates, as shown in the above processes, for other compounds of our invention and also for Nucleocidin. The compounds are thus useful for producing metabolic deficiencies in undesired biogoical systems, or for inhibiting such systems. The compounds can also be used to sterilize medical and laboratory instruments where more conventional sterilization agents have proved ineffective.

In addition, nucleosides of formula VI are analogs of the known antibiotic nucleoside Nucleocidin (note Merck Index Eighth Ed., Edit. Stecher, p. 752 (1968) and U.S. Pat. No. 2,914,525) and exhibit strong tripanocidal and antibacterial activity and are further useful as inhibitors of protein synthesis in mammals.

5'-Deoxy compounds of formula V($A^2$ is $-CH_3$) have further utility in the control and examination of enzymatic systems. Purine compounds of formula V ($A^2$ is $-CH_2NH_2$) also exhibit antiviral activity. Compounds of formula X', of formula IV wherein $A^1$ is $-CH_2OH$, also exhibit cardiovascular and lipidlowering activities as well as showing cytokinin behavior. Compounds of formula IV ($A^1$ is $-CH_2OPO(OH)_2$) also exhibit pharmacological effects with respect to the blood of mammals — such as, for example, inhibiting platelet aggregation.

The primary utility of the compounds of formulas I, II, and III is as intermediates for the compounds of formulas IV, V and VI, of our invention, for Nucleocidin.

A further understanding of the invention can be had from the following nonlimiting examples. Also, where necessary, examples are repeated to provide sufficient starting materials for subsequent examples. Also, all temperatures and temperature ranges, hereinabove and below, refer to degrees Centigrade.

EXAMPLE 1

This example illustrates methods of protecting free amino groups in the purine base moiety of the 2',3'-O-isopropylidene purine nucleoside starting materials. In this example, 6 mmoles of 2',3'-O-isopropylideneadenosine is dissolved in 25 ml. of pyridine and 30 mmoles of benzoylchloride is then added. The reaction mixture is then stirred in the absence of light for 2 hours, and then poured over ice resulting in a precipitate which is extracted with chloroform. The chloroform extract is then washed with an aqueous saturated solution of sodium bicarbonate, then water, and then dried over sodium sulfate and evaporated to dryness under vacuum. The resulting residue is thoroughly dried, dissolved in 80 ml. of pyridine, and 80 ml. of 1 Normal aqueous sodium hydroxide is then added. The resulting mixture is then cooled to 5°C, then stirred for 10 minutes and neutralized by the addition of 8 ml. of glacial acetic acid. The neutralized mixture is then evaporated under vacuum and the resulting residue partitioned between water and chloroform. The chloroform phase is washed with saturated aqueous sodium bicarbonate, then water, and then dried and evaporated under vacuum, affording a residual syrup which is purified by crystallization using acetone and hexane, yielding pure 2',3'-O-isopropylidene-$N^1$, $N^6$-dibenzoyl adenosine. By following the same procedure as above using the corresponding 2',3'-O-isopropylidene purine nucleoside as starting materials, the following compounds are respectively prepared:

2',3'-O-isopropylidene-$N^1$,$N^6$-dibenzoyl-2-fluoroadenosine;
2',3'-O-isopropylidene-$N^1$,$N^6$-dibenzoyl-2-chloroadenosine;
2',3'-O-isopropylidene-$N^1$,$N^6$-dibenzoyl-2-azaadenosine;
2',3'-isopropylidene-$N^1$,$N^6$-dibenzoyl-8-azaadenosine;
2',3'-O-isopropylidene-$N^1$,$N^6$-dibenzoyl-$N^6$-methyladenosine;
2',3'-O-isopropylidene-$N^1$,$N^6$-dibenzoyl-8-aza-9-deazaadenosine;
2',3'-O-isopropylidene-$N^1$,$N^6$-dibenzoyl-7-deazaadenosine;
2',3'-O-isopropylidene-$N^1$,$N^6$-dibenzoyl-7-deaza-7-cyanoadenosine;
2',3'-O-isopropylidene-$N^1$,$N^6$-dibenzoyl-8-azaadenosine;
2',3'-O-isopropylidene-$N^1$-benzoylinosine;
2',3'-O-isopropylidene-$N^1$-benzoylxanthosine;
2',3'-O-isopropylidene-$N^1$,$N^2$-dibenzoyl-guanosine;
2',3'-O-isopropylidene-$N^1$,$N^2$-dibenzoyl-8-azaguanosine; and
2',3'-O-isopropylidene-$N^1$,$N^2$-dibenzoyl-7-deazaguanosine.

EXAMPLE 2

This example illustrates methods of preparing 5'-O-methanesulfonylpurine nucleosides from the corresponding 5'-unprotected purine nucleosides. In this example, 25 mmoles of 2',3'-O-isopropylidene-$N^1$, $N^6$-dibenzoyladenosine is dissolved in 100 ml. of pyridine and 31 mmoles of methane sulfonyl chloride are then added. The resulting reaction mixture is then maintained at 0° to 5°C for 2 hours, after which time sufficient ice is added to destroy excess methanesulfonyl chloride. The reaction mixture is then evaporated to dryness and the resulting residue dissolved in 100 ml. of chloroform. The resulting chloroform solution is washed with a saturated aqueous solution of sodium bicarbonate, then water, dried and evaporated to dryness under vacuum. This affords a crude foam of 5'-O-mesyl-2',3'-O-isopropylidene-$N^1$,$N^6$-dibenzoyladenosine which is dried under high vacuum at 20°C. The resulting dried crude foam is of sufficient purity for use in subsequent examples.

By following the same procedure as above using the corresponding products of Example 1 as starting materials, the following compounds are respectively prepared:

2',3'-O-isopropylidene-5'-O-mesyl-$N^1$,$N^6$-dibenzoyl-2-fluoroadenosine;
2',3'-O-isopropylidene-5'-O-mesyl-$N^1$,$N^6$-dibenzoyl-2-chloroadenosine;
2',3'-O-isopropylidene-5'-O-mesyl-$N^1$,$N^6$-dibenzoyl-2-azaadenosine;
2',3'-O-isopropylidene-5'-O-mesyl-$N^1$,$N^6$-dibenzoyl-$N^6$-methyladenosine;
2',3'-O-isopropylidene-5'-O-mesyl-$N^1$,$N^6$-dibenzoyl-8-aza-9-deazaadenosine;
2',3'-O-isopropylidene-5'-O-mesyl-$N^1$,$N^6$-dibenzoyl-7-deazaadenosine;
2',3'-O-isopropylidene-5'-O-mesyl-$N^1$,$N^6$-dibenzoyl-7-deaza-7-cyanoadenosine;
2',3'-O-isopropylidene-5'-O-mesyl-$N^1$,$N^6$-dibenzoyl-8-azaadenosine;
2',3'-O-isopropylidene-5'-O-mesyl-$N^1$-benzoylinosine;
2',3'-O-isopropylidene-5'-O-mesyl-$N^1$-benzoylxanthosine;
2',3'-O-isopropylidene-5'-O-mesyl-$N^1$,$N^2$-dibenzoylguanosine;
2',3'-O-isopropylidene-5'-O-mesyl-$N^1$,$N^2$-dibenzoyl-8-azaguanosine; and
2',3'-O-isopropylidene-5'-O-mesyl-$N^1$,$N^2$-dibenzoyl-7-deazaguanosine.

EXAMPLE 3

This example illustrates methods of preparing 4',5'-unsaturated purine nucleosides. In this example, 25 m-moles of crude 5'-O-mesyl-2',3'-O-isopropylidene-$N^1$,$N^6$-dibenzoyladenosine, prepared according to Example 2, is dissolved in 150 ml. of anhydrous tetrahydrofuran. The resulting mixture is then filtered and the resulting filtrate is recovered and cooled to 0°C and a solution of 75 mmoles of potassium t-butoxide in 75 ml. of tetrahydrofuran is slowly added to the filtrate over a period of 15 minutes. The temperature of the reaction mixture is maintained at about 0°C during this addition. The mixture is then agitated and shaken for about 25 minutes and the temperature allowed to rise to about 25°C. The resulting suspension is then poured into 400 ml. of aqueous 10% wt. sodium acetate-3% wt. acetic acid maintained at 0°C. The mixture is vigorously stirred resulting in the formation of a precipitate which is then recovered by filtration and dried. The dried precipitate is then further purified by chromatography over silica gel, affording $N^1,N^6$-dibenzoyl-9-(2,3-O-isopropylidene-5-deoxy-$\beta$-D-erythro-pent-4-enofuranosyl) adenine.

By following the same procedure as above using the corresponding crude products of Example 2 as starting materials, the following compounds are respectively prepared:

$N^1,N^6$-dibenzoyl-9-(2,3-O-isopropylidene-5-deoxy-$\beta$-D-erythro-pent-4-enofuranosyl)-2-fluoroadenine;

$N^1,N^6$-dibenzoyl-9-(2,3-O-isopropylidene-5-deoxy-$\beta$-D-erythro-pent-4-enofuranosyl)-2-chloroadenine;

$N^1,N^6$-dibenzoyl-9-(2,3-O-isopropylidene-5-deoxy-$\beta$-D-erythro-pent-4-enofuranosyl)-2-azaadenine;

$N^1,N^6$-dibenzoyl-$N^6$-methyl-9-(2,3-O-isopropylidene-5-deoxy-$\beta$-D-erythro-pent-4-enofuranosyl)-adenine;

$N^1,N^6$-dibenzoyl-9-(2,3-O-isopropylidene-5-deoxy-$\beta$-D-erythro-pent-4-enofuranosyl)-8-aza-9-deazaadenine;

$N^1,N^6$-dibenzoyl-9-(2,3-O-isopropylidene-5-deoxy-$\beta$-D-erythro-pent-4-enofuranosyl)-7-deazaadenine;

$N^1,N^6$-dibenzoyl-9-(2,3-O-isopropylidene-5-deoxy-$\beta$-D-erythro-pent-4-enofuranosyl)-7-deaza-7-cyanoadenine;

$N^1,N^6$-dibenzoyl-9-(2,3-O-isopropylidene-5-deoxy-$\beta$-D-erythro-pent-4-enofuranosyl)-8-azaadenine;

$N^1$-benzoyl-9-(2,3-O-isopropylidene-5-deoxy-$\beta$-D-erythro-pent-4-enofuranosyl)-hypoxanthine;

$N^1$-benzoyl-9-(2,3-O-isopropylidene-5-deoxy-$\beta$-D-erythro-pent-4-enofuranosyl)-xanthine;

$N^1,N^2$-benzoyl-9-(2,3-O-isopropylidene-5-deoxy-$\beta$-D-erythro-pent-4-enofuranosyl)-guanine;

$N^1,N^2$-dibenzoyl-9-(2,3-O-isopropylidene-5-deoxy-$\beta$-D-erythro-pent-4-enofuranosyl)-8-azaguanine; and $N^1,N^2$-dibenzoyl-9-(2,3-O-isopropylidene-5-deoxy-$\beta$-D-erythro-pent-4-enofuranosyl)-7-deazaguanine.

EXAMPLE 4

In this example, 6 mmoles of freshly ground silver monofluoride is added to a solution containing 1 mmole of $N^1,N^6$-dibenzoyl-9-(2,3-O-isopropylidene-5-deoxy-$\beta$-D-erythro-pent-4-enofuranosyl)-adenine in 60 ml. of benzene at 20°C. The resulting suspension is vigorously stirred and 5 mmoles of iodine is slowly added to the suspension at room temperature, over a period of 1 hour. The reaction mixture is maintained at room temperature for one hour and then 10 ml. of concentrated aqueous sodium chloride solution is added, resulting in the formation of a two phase system. Both phases of the reaction mixture are filtered through diatomaceous earth (Celite). The organic phase is then recovered and washed with an aqueous solution of thiosulfate, then aqueous sodium bicarbonate solution and finally water. The washed organic phase is dried over magnesium sulfate and then filtered and evaporated to dryness. The resulting residue is an epimeric mixture of $N^1,N^6$-dibenzoyl-9-(5-deoxy-4-fluoro-5-iodo-2,3-O-isopropylidene-$\beta$-D-ribofuranosyl)-adenine and $N^1,N^6$-dibenzoyl-9-(5-deoxy-4-fluoro-5-iodo-2,3-O-isopropylidene-$\alpha$-L-lyxofuranosyl)-adenine. The respective isomers are then resolved by preparative thin-layer chromatography on silica gel eluting with a mixture of chloroform and acetone. The respective U.V. bands corresponding to the ribo and lyxo isomers are then respectively eluted affording the respective isomers. Alternatively, the compound can be separated by chromatography on a column of silic acid.

By following the same procedure as above using the corresponding products of Example 3 as starting materials, the corresponding $\beta$-D-ribo and $\alpha$-L-lyxo epimer mixtures are prepared and separated by chromatography as above, affording the following respective compounds:

$N^1,N^6$-dibenzoyl-9-(5-deoxy-4-fluoro-5-iodo-2,3-O-isopropylidene-$\beta$-D-ribofuranosyl)-2-fluoroadenine;

$N^1,N^6$-dibenzoyl-9-(5-deoxy-4-fluoro-5-iodo-2,3-O-isopropylidene-$\beta$-D-ribofuranosyl)-2-chloroadenine;

$N^1,N^6$-dibenzoyl-9-(5-deoxy-4-fluoro-5-iodo-2,3-O-isopropylidene-$\beta$-D-ribofuranosyl)-2-azaadenine;

$N^1,N^6$-dibenzoyl-$N^6$-methyl-9-(5-deoxy-4-fluoro-5-iodo-2,3-O-isopropylidene-$\beta$-D-ribofuranosyl)-adenine;

$N^1,N^6$-dibenzoyl-9-(5-deoxy-4-fluoro-5-iodo-2,3-O-isopropylidene-$\beta$-D-ribofuranosyl)-8-aza-9-deazaadenine;

$N^1,N^6$-dibenzoyl-9-(5-deoxy-4-fluoro-5-iodo-2,3-O-isopropylidene-$\beta$-D-ribofuranosyl)-7-deazaadenine;

$N^1,N^6$-dibenzoyl-9-(5-deoxy-4-fluoro-5-iodo-2,3-O-isopropylidene-$\beta$-D-ribofuranosyl)-7-deaza-7-cyanoadenine;

$N^1,N^6$-dibenzoyl-9-(5-deoxy-4-fluoro-5-iodo-2,3-O-isopropylidene-$\beta$-D-ribofuranosyl)-8-azaadenine;

$N^1$-benzoyl-9-(5-deoxy-4-fluoro-5-iodo-2,3-O-isopropylidene-$\beta$-D-ribofuranosyl)-hypoxanthine;

$N^1$-benzoyl-9-(5-deoxy-4-fluoro-5-iodo-2,3-O-isopropylidene-$\beta$-D-ribofuranosyl)-xanthine;

$N^1,N^2$-dibenzoyl-9-(5-deoxy-4-fluoro-5-iodo-2,3-O-isopropylidene-$\beta$-D-ribofuranosyl)-guanosine;

$N^1,N^2$-dibenzoyl-9-(5-deoxy-4-fluoro-5-iodo-2,3-O-isopropylidene-$\beta$-D-ribofuranosyl)-8-azaguanine;

$N^1,N^2$-dibenzoyl-9-(5-deoxy-4-fluoro-5-iodo-2,3-O-isopropylidene-$\beta$-D-ribofuranosyl)-7-deazaguanine;

$N^1,N^6$-dibenzoyl-9-(5-deoxy-4-fluoro-5-iodo-2,3-O-isopropylidene-$\alpha$-L-lyxofuranosyl)-2-fluoroadenine;

$N^1,N^6$-dibenzoyl-9-(5-deoxy-4-fluoro-5-iodo-2,3-O-isopropylidene-$\alpha$-L-lyxofuranosyl)-2-chloroadenine;

$N^1,N^6$-dibenzoyl-9-(5-deoxy-4-fluoro-5-iodo-2,3-O-isopropylidene-$\alpha$-L-lyxofuranosyl)-2-azaadenine;

$N^1,N^6$-dibenzoyl-$N^6$-methyl-9-(5-deoxy-4-fluoro-5-iodo-2,3-O isopropylene-$\alpha$-L-lyxofuranosyl)-adenine;

$N^1,N^6$-dibenzoyl-9-(5-deoxy-4-fluoro-5-iodo-2,3-O-isopropylidene-$\alpha$-L-lyxofuranosyl)-8-aza-9-deazaadenine;

$N^1,N^6$-dibenzoyl-9-(5-deoxy-4-fluoro-5-iodo-2,3-O-isopropylidene-$\alpha$-L-lyxofuranosyl)-7-deazaadenine;

$N^1,N^6$-dibenzoyl-9-(5-deoxy-4-fluoro-5-iodo-2,3-O-isopropylidene-$\alpha$-L-lyxofuranosyl)-7-deaza-7-cyanoadenine;

$N^1,N^6$-dibenzoyl-9-(5-deoxy-4-fluoro-5-iodo-2,3-O-isopropylidene-$\alpha$-L-lyxofuranosyl)-8-azaadenine;

$N^1$-benzoyl-9-(5-deoxy-4-fluoro-5-iodo-2,3-O-isopropylidene-$\alpha$-L-lyxofuranosyl)-hypoxanthine;

$N^1$-benzoyl-9-(5-deoxy-4-fluoro-5-iodo-2,3-O-isopropylidene-$\alpha$-L-lyxofuranosyl)-xanthine;

$N^1,N^2$-dibenzoyl-9-(5-deoxy-4-fluoro-5-iodo-2,3-O-isopropylidene-$\alpha$-L-lyxofuranosyl)-guanosine;

$N^1,N^2$-dibenzoyl-9-(5-deoxy-4-fluoro-5-iodo-2,3-O-isopropylidene-α-L-lyxofuranosyl)-8-azaguanine; and
$N^1,N^2$-dibenzoyl-9-(5-deoxy-4-fluoro-5-iodo-2,3-O-isopropylidene-α-L-lyxofuranosyl)-7-deazaguanine.

EXAMPLE 5

This example illustrates the first step in the sugar route process of our invention — i.e., the preparation of trichloroethyl-D-ribofuranosides. In this example, 0.1 mole of 1-O-acetyl-2,3,5-tri-O-benzoylribofuranose is suspended in 50 ml. of anhydrous ether at 20°C. To this suspension are added successively, 30 ml. of 2,2,2-trichloroethanol and 46 ml. of boron trifluoride etherate. The resulting reaction mixture is stirred for 60 minutes at 20°C and then poured into 2 l. of ice and water containing 14 g. of sodium bicarbonate. The resulting mixture is vigorously stirred and additional solid sodium bicarbonate is added until the pH of the solution rises above 7. The ice is allowed to melt and the suspension is then extracted with 1 liter of benzene. Sodium chloride is then added to the remaining aqueous phase and the resulting sodium chloride solution is then extracted twice with 100 ml. of benzene. All of the benzene extracts are then combined and then washed twice with 50 ml. of water and dried over magnesium sulfate, filtered, and then evaporated to dryness under vacuum affording a crude anomeric mixture of trichloroethyl 2,3,5-tri-O-benzoyl-α-D-ribofuranoside and trichloroethyl 2,3,5-tri-O-benzoyl-β-D-ribofuranoside. The crude syrup is sufficiently pure for use as starting materials in subsequent examples, however, for analytical purposes, a portion of the respective anomers are isolated and further purified by subjecting a small aliquot of the crude syrup to chromatography on silica gel eluting with a 995:5 (by vol.) mixture of benzene-ethyl acetate.

EXAMPLE 6

This example illustrates the second step of the sugar route process of our invention. In this example, 59 g. of the crude anomeric mixture of trichloroethyl 2,3,5-tri-O-benzolyl-D-ribofuranosides prepared according to Example 5, is dissolved in 750 ml. of methanol at 20°C, and 15 ml. of a 0.5 solution of sodium methylate in methanol is then added. The reaction mixture is stirred for 18 hours at 20°C and then 100 ml. of cation exchange resin (sold under the trademark Amberite IRC–50) in the H+ form is added and the resultant suspension then stirred for 10 minutes. The ion exchange resin is then removed by filtration, and washed with 30 ml. of methanol. The methanol washings and the filtrates are combined and then evaporated to dryness under vacuum. The resulting residue is coevaporated 5 times with 250 ml. of 1:1 (by volume) mixture of ethanol and water, in order to remove the methyl benzoate byproduct which is formed during the reaction. The residue is then dissolved in ethyl acetate and filtered over diatomaceous earth (sold under the trademark Celite). The resulting filtrate is evaporated to dryness affording a residue which is thoroughly dried under high vacuum yielding an anomer mixture of trichloroethyl-D-ribofuranosides. For analytical purposes, a small aliquot of the product mixture is recrystallized from acetone-hexane giving the pure β-anomer. The mother liquors are then chromatographed and the pure α-anomer is so isolated.

EXAMPLE 7

This example illustrates methods of protecting the 2,3-positions of the sugar group with an isopropylidene group. In this example 23.4 g. of trichloroethyl D-ribofuranosides, prepared according to Example 6 is dissolved in a mixture of 200 ml. of acetone and 100 ml. of 2,2-dimethoxypropane at 20°C. Perchloric acid (200 μl.) is then added and the resulting reaction mixture is allowed to stand for 15 minutes at 20°C. The reaction mixture is then neutralized with 250 μl. of concentrated aqueous ammonium hydroxide and then evaporated to dryness under vacuum. The resulting residue is dissolved in a mixture of 100 ml. of methanol, 40 ml. of acetic acid and 20 ml. of water and allowed to stand at 20°C for 1 hour. The mixture is then evaporated to dryness under vacuum and the residual traces of acetic acid then removed by coevaporation with toluene. The resulting residue is an anomeric mixture of trichloroethyl 2,3-O-isopropylidene-D-ribofuranosides which is sufficiently pure for use in subsequent examples. For analytical purposes a small aliquot of the residue is purified by chromatography and the α- and β-anomers so separated are further purified by distillation under high vacuum.

EXAMPLE 8

This example illustrates methods, according to our invention, of preparing trichloroethyl 2,3-O-alkylidene-5-deoxy-5-iodo-D-ribofuranosides. In this example, 30 g. of the product residue prepared according to the previous example (i.e., Example 7) is dissolved in 240 ml. of dimethylformamide at 20°C, and then 52 g. of methyltriphenoxyphosphonium iodide is added. The reaction mixture is allowed to stand for 18 hours at 20°C and then 10 ml. of methanol is added to quench the reaction. The reaction mixture is then evaporated under vacuum and the resulting crude residue coevaporated twoce with 250 ml. portions of benzene. The resulting residue is then dissolved in 250 ml. of benzene and chromatographed on two kg. of alumina. Elution with benzene affords three product fractions. One fraction affording pure trichloroethyl 2,3-O-isopropylidene-5-deoxy-5-iodo-β-D-ribofuranoside; a second fraction affording a mixture of the α and β anomers of the aforementioned furanoside and a third fraction affording pure trichloroethyl 2,3-O-isopropylidene-5-deoxy-5-iodo-α-D-ribofuranoside. For analytical purposes, small portions of the first and third fractions are further purified by distillation under high vacuum ($10^{-3}$ mm.Hg., 50°C).

EXAMPLE 9

This example illustrates methods of preparing trichloroethyl 5-deoxy-5-iodo-D-ribofuranosides according to the process of our invention. In this example, 300 ml. of 80% aqueous formic acid is added to 25 g. of an α and β anomer mixture of trichloroethyl 2,3-O-isopropylidene-5-deoxy-5-iodo-D-ribofuranoside prepared according to Example 8. The resulting reaction mixture is allowed to stand for 21 hours at 20°C and then evaporated to dryness and the resulting residue coevaporated three times with toluene and once with methanol. The resulting residue is then chromatographed, over 3 kg. of silica gel eluting with 9:1 (by vol.) mixture of benzene:ethyl acetate, affording a mixture of α and β anomers of trichloroethyl 5-deoxy-5- iodo-D-ribofuranoside and also as a separate fraction, the pure β-anomer (i.e., trichloroethyl 5-deoxy-5iodo-β-D-ribofuranoside). For analytical purposes a small portion of the β-anomer is further purified by recrystallization from chloroform and hexane.

EXAMPLE 10

This example illustrates methods, according to our invention, of preparing trichloroethyl 2,3-di-O-benzoyl-5-deoxy-β-D-erythro-pent-4-enofuranoside. In this example, 14 g. of crystalline trichloroethyl 5-deoxy-5-iodo-β-D-ribofuranoside, prepared according to Example 9, is dissolved in 250 ml. of dimethylformamide and 22 g. of 1,5-diazabicyclo-[4.3.0]non-5-ene is added, at 20°C. The reaction mixture is allowed to stand at 20°C for 18 hours and then 10 ml. of benzoyl chloride is added and the reaction mixture allowed to stand for another 24 hours at 20°C. The reaction mixture is then evaporated to dryness and the resulting residue is dissolved in a mixture of benzene and ethyl acetate (995:5 by vol.). The resulting mixture is purified by chromatography over 2 kg. of silica gel yielding a syrup of trichloroethyl 2,3-di-O-benzoyl-5-deoxy-β-D-erythro-pent-4-enofuranoside, which is sufficiently pure for use in subsequent examples. For analytical purposes a small aliquot of the product was further purified by preparative thin-layer chromatography eluting with a benzene: ethyl acetate mixture (99:1 by vol.).

Similarly, by following the same procedure using the corresponding α-D-isomer starting material, the corresponding α-D-isomer of the above product is prepared.

EXAMPLE 11

This example illustrates methods of preparing trichloroethyl 2,3-di-O-benzoyl-5-deoxy-4-fluoro-5-iodo-D-ribofuranosides and trichloroethyl 2,3-di-O-benzoyl-5-deoxy-4-fluoro-5-iodo-L-lyxofuranosides, according to the process of our invention. In this example, 1 mmole of trichloroethyl 2,3-di-O-benzoyl-5-deoxy-β-D-erythro-pent-4-enofuranoside, prepared according to Example 10, is dissolved in 50 ml. of benzene, at room temperature and 6 mmole of freshly ground silver monofluoride is added. The resulting suspension is stirred and 5 mmoles of iodine is slowly added over a period of about 2 hours, with continuous stirring at 20°C. Then 10 ml. of an aqueous solution of sodium chloride and sodium bicarbonate is added to destroy any excess silver fluoride by precipitation of silver chloride. This results in a two phase solution which is then filtered through diatomaceous earth. The organic phase is then washed with an aqueous solution of sodium thiosulfate, and with water. The washed organic phase is then dried over magnesium sulfate and evaporated to dryness, under vacuum, affording a mixture of trichloroethyl 2,3-di-O-benzoyl-5-deoxy-4-fluoro-5-iodo-β-D-ribofuranoside and trichloroethyl 2,3-di-O-benzoyl-5-deoxy-4-fluoro-5-iodo-α-L-lyxofuranoside. The mixture is then chromatographed on silica gel eluting with a mixture of benzene and ethyl acetate yielding a partial separation between the ribo and lyxo isomers. Each of the major β-D-riboside and α-L-lyxoside fractions are then further purified by preparative thin-layer chromatography affording the respective pure ribo and lyxo isomers.

The corresponding α-D-riboside and β-L-lyxoside isomers of the above product are prepared by following the above procedure but using trichloroethyl 2,3-di-O-benzoyl-5-deoxy-α-D-erythro-pent-4-enofuranoside as the starting material.

EXAMPLE 12

This example illustrates methods, according to our invention, of preparing trichloroethyl 5-azido-5-deoxy-4-fluoro-D-ribofuranosides. In this example, 1 mmole of trichloroethyl 2,3-di-O-benzyl-5-deoxy-4-fluoro-5-iodo-β-D-ribofuranoside, prepared according to Example 11, is dissolved in 10 ml. of dimethylformamide containing 4 mmoles of lithium azide. The reaction mixture is maintained at 100°C for 20 hours and then evaporated under vacuum. The resulting residue is partitioned between chloroform and water and the resulting organic phase is then dried over magnesium sulfate, filtered, and evaporated to dryness. Further purification of the resulting residue by chromatography, over silica gel eluting with a mixture of benzene and ethyl acetate, yields pure trichloroethyl 5-azido-2,3-di-O-benzoyl-5-deoxy-4-fluoro-β-D-ribofuranoside.

Similarly, trichloroethyl 5-azido-2,3-di-O-benzoyl-5-deoxy-4-fluoro-α-L-lyxofuranoside and α-D-ribofuranoside are respectively prepared by following the above procedure, but in this instance respectively using the corresponding α or β-L-lyxofuranoside and α-D-ribofuranoside starting materials.

EXAMPLE 13

This example illustrates methods, according to our invention, of preparing trichloroethyl 2,3-O-dibenzoyl-4-fluoro-D-ribofuranosides. In this example, 1 mmole of trichloroethyl 5-azido-2,3-di-O-benzoyl-5-deoxy-4-fluoro-β-D-ribofuranoside, prepared according to Example 12, is dissolved in 300 ml. of benzene and then is irradiated in a pyrex vessel with a high pressure ultraviolet source. The progress of the reaction is monitored by thin-layer chromatography and irradiation is discontinued when the starting material has disappeared. The benzene solvent is then evaporated and the resulting residue dissolved in 10 ml. of dioxane, and 1 g. of wet cation exchange resin in the hydrogen form (sold under the trademark Dowex 50) is added. The resulting mixture is then heated for 2 minutes at 100°C and then filtered to remove the ion exchange resin. Five mmoles of sodium borohydride is added to the filtrate and the resulting mixture is stirred at 20°C for 15 minutes. Excess sodium borohydrate is then destroyed by adding 1 ml. of acetic acid. The reaction mixture is then evaporated to dryness and the resulting residue is co-evaporated with toluene and methanol to remove residual traces of acetic acid and boric acid. The residue is then further purified by chromatography on silica gel eluting with mixture of benzene and ethyl acetate yielding pure trichloroethyl 2,3-di-O-dibenzoyl-4-fluoro-β-D-ribofuranoside.

Similarly, trichloroethyl 2,3-di-O-dibenzoyl-4-fluoro-α(and β)-L-lyxofuranoside and α-O-ribofuranoside are respectively prepared by following the same procedure but using the corresponding α(and β)-L-lyxofuranoside and α-D-riboside starting materials, respectively.

EXAMPLE 13a

This example illustrates an alternative procedure, according to our invention, for preparing trichloroethyl 2,3-di-O-benzoyl-4-fluoro-D-ribofuranosides. In this example, 1 mmole of trichloroethyl 5-azido-2,3-di-O- benzoyl-5-deoxy-4-fluoro-β-D-ribofuranoside, prepared according to Example 12, is dissolved in 10 ml. of acetonitrile, and cooled to 0°C. 1.1 Mmoles of nitrosonium tetrafluoroborate, dissolved in 5 ml. of acetonitrile, is then added over a 30 minute period. After this time, 5 ml. of an aqueous saturated solution of sodium bicarbonate is added to destroy any excess nitrosonium tetrafluoroborate. The mixture is evaporated to dryness and the resulting residue partitioned between water and chloroform. The organic phase is dried over magnesium sulfate, filtered and evaporated to dryness. The residue is further purified by chromatography over silica gel eluting with a mixture of benzene-ethyl acetate, affording pure trichloroethyl 2,3-di-O-dibenzoyl-4-fluoro-β-D-ribofuranoside.

Similarly, trichloroethyl 2,3-di-O-dibenzoyl-4-fluoro-α(and b)-L-lyxofuranoside and α-D-ribofuranoside are respectively prepared by following the same procedure as above but using the corresponding 5-azido-α(and β)-L-lyxofuranoside and α-D-ribofuranoside starting materials, respectively.

EXAMPLE 14

This example illustrates methods, according to our invention, of preparing trichloroethyl 2,3,5-tri-O-benzoyl-4-fluoro-D-ribofuranoside and L-lyxofuranosides. In this example, 1 mmole of trichloroethyl 2,3-di-O-benzoyl-4-fluoro-β-D-ribofuranoside, prepared according to Example 13, is dissolved in 10 ml. of pyridine, at 20°C, and 1.1 mmoles of benzoyl chloride is then added. The resulting mixture is allowed to stand at 20°C for 18 hours and then evaporated to dryness. The resulting residue is partitioned between chloroform and water and the chloroform phase is then dried over magnesium sulfate, filtered, and the resulting filtrate evaporated to dryness. This residue is then further purified by chromatography over silica gel eluting with a mixture of benzeneethyl acetate, yielding pure trichloroethyl 2,3,5-tri-O-benzoyl-4-fluoro-β-ribofuranoside.

Similarly, trichloroethyl 2,3,5-tri-O-benzoyl-4-fluoro-α(and b)-L-lyxofuranoside and α-D-ribofuranoside are respectively prepared by the same procedure but using the corresponding α(and b)-L-lyxofuranoside and α-D-ribofuranoside starting materials respectively.

EXAMPLE 15

This example illustrates methods, according to our invention, of preparing 1-O-acetyl-2,3,5-tri-O-benzoyl-4-fluoro-D-ribofuranose and 1-O-acetyl-2,3,5-tri-O-benzoyl-4-fluoro-L-lyxofuranose. In this example, 10 mmoles of powdered zinc is added to a mixture containing 2.5 ml. of acetic acid, 0.5 ml. of acetyl chloride and 0.25 ml. of water. The resulting suspension is shaken for 2 minutes at room termperature and then a solution containing 1 mmole of trichloroethyl 2,3,5-tri-O-benzoyl-4-fluoro-D-ribofuranoside, prepared according to Example 14, dissolved in 5 ml. of acetic anhydride is added. The reaction mixture is then stirred for 18 hours at 20°C and then filtered over diatomaceous earth. The filtrate is then evaporated to dryness resulting in a residue which is then partitioned between chloroform and a saturated aqueous solution of sodium bicarbonate. The organic (chloroform) phase is washed with water, dried over magnesium sulfate, filtered, and then evaporated to dryness. The residue is further purified on silica gel eluting with a mixture of benzene and ethyl acetate yielding pure 1-O-acetyl-2,3,5-tri-O-benzoyl-4-fluoro-D-ribofuranose.

Similarly, 1-O-acetyl-2,3,5-tri-O-benzyl-4-fluoro-L-lyxofuranose is prepared following the same procedure but using the corresponding β-L-lyxofuranoside starting material.

EXAMPLE 16

This example illustrates methods, according to our invention, of preparing the 1-chloro-2,3,5-tri-O-benzoyl-4-fluoro-D-ribofuranose and L-lyxofuranose and 1-bromo-2,3,5-tri-O-benzoyl-4-fluoro-D-ribofuranose and L-lyxofuranose compounds of our invention. In this example, 1 mmole of 1-O-acetyl-2,3,5-tri-O-benzoyl-4-fluoro-D-ribofuranose, prepared according to Example 15, is dissolved in 20 ml. of ether. The mixture is then saturated with dry hydrogen chloride at 0°C and maintained for 18 hours at 0°C. The solution is then evaporated to dryness under vacuum and the resulting residue is then coevaporated twice with 20 ml. portions of benzene, affording 1-chloro-2,3,5-tri-O-benzoyl-4-fluoro-D-ribofuranose, which is sufficiently pure for use in subsequent examples.

By following the same procedure as above but using hydrogen bromide in place of chloride, 1-bromo-2,3,5-tri-O-benzoyl-4-fluoro-D-ribofuranose is also prepared. In this case the reaction time can be reduced to 2 hours.

Similarly, 1-chloro-2,3,5-tri-O-benzoyl-4-fluoro-L-lyxofuranose and 1-bromo-2,3,5-tri-O-benzoyl-4-fluoro-L-lyxofuranose are also respectively prepared by following the above procedure but using the corresponding α-L-lyxofuranose starting material.

EXAMPLE 17

In this example, 1 mmole of crude 1-chloro-2,3,5-tri-O-benzoyl-4-fluoro-D-ribofuranose, prepared according to Example 16, is dissolved in 20 ml. of absolute benzene at 20°C and 1 mmole of mercuric bromide and 1 mmole of mercuric oxide are then added. The mixture is then dried by azeotropic distillation and 1 mmole of bis(trimethylsilyl)uracil is added. The mixture is then stirred under reflux for 4 hours and then evaporated to dryness. The residue is then dissolved in chloroform and the chloroform solution is washed with saturated aqueous sodium bicarbonate solution, then saturated aqueous potassium iodide solution, then 5% aqueous sodium thiosulfate solution and then water. The organic phase is then dried over magnesium sulfate, filtered, and evaporated to dryness under vacuum. The resulting residue is then treated with 20 ml. of 1:1 (by vol.) mixture of methanol and concentrated ammonium hydroxide, for 18 hours at 20°C. This mixture is then in turn evaporated to dryness and the resulting residue purified by preparative thin-layer chromatography over silica gel using a mixture of methanol in chloroform. The appropriate U.V. band is eluted with methanol and evaporated affording 4'-fluorouridine.

Similarly, by following the same procedure as above but using the corresponding bis or tris(trimethylsilyl)-pyrimidines listed below in Column A, the corresponding nucleosides, listed below in Column B, are respectively prepared:

COLUMN A bis(trimethylsilyl)-5-fluorouracil;

bis(trimethylsilyl)-5-chlorouracil;
bis(trimethylsilyl)-5-bromouracil;
bis(trimethylsilyl)-5-iodouracil;
bis(trimethylsilyl)-5-methyluracil;
bis(trimethylsilyl)-5-butyluracil;
bis(trimethylsilyl)-5-isopropyluracil;
bis(trimethylsilyl)-5-trifluoromethyluracil;
tris(trimethylsilyl)-5-hydroxymethyluracil;
bis(trimethylsilyl)-5-nitrouracil;
bis(trimethylsilyl)-5-azauracil;
bis(trimethylsilyl)-6-azauracil;
bis(trimethylsilyl)-5-methyl-6-azauracil;
bis(trimethylsilyl)-2-thiouracil;
bis(trimethylsilyl)-4-thiouracil;
bis(trimethylsilyl)-2,4-dithiouracil;
bis(trimethylsilyl)-cytosine;
bis(trimethylsilyl)-5-fluorocytosine;
bis(trimethylsilyl)-5-chlorocytosine;
bis(trimethylsilyl)-5-bromocytosine;
bis(trimethylsilyl)-5-iodocytosine;
bis(trimethylsilyl)-5-methylcytosine;
bis(trimethylsilyl)-5-butylcytosine;
bis(trimethylsilyl)-5-isopropylcytosine;
bis(trimethylsilyl)-5-trifluoromethylcytosine;
tris(trimethylsilyl)-5-hydroxymethyl;
bis(trimethylsilyl)-5-nitrouracil;
bis(trimethylsilyl)-5-azauracil;
bis(trimethylsilyl)-6-azacytosine;
bis(trimethylsilyl)-5-methyl-6-azacytosine; and
bis(trimethylsilyl)-2-thiocytosine.

COLUMN B

4'-fluoro-5-fluorouridine;
4'-fluoro-5-bromouridine;
4'-fluoro-5-chlorouridine;
4'-fluoro-5-iodouridine;
4'-fluoro-5-methyluridine;
4'-fluoro-5-butyluridine;
4'-fluoro-5-isopropyluridine;
4'-fluoro-5-trifluoromethyluridine;
4'-fluoro-5-hydroxymethyluridine;
4'-fluoro-5-nitrouridine;
4'-fluoro-5-azauridine;
4'-fluoro-6-azauridine;
4'-fluoro-5-methyl-6-azauridine;
4'-fluoro-2-thiouridine;
4'-fluoro-4-thiouridine;
4'-fluoro-2,4-dithiouridine;
4'-fluoro-cytidine;
4'-fluoro-5-fluorocytidine;
4'-fluoro-5-chlorocytidine;
4'-fluoro-5-bromocytidine;
4'-fluoro-5-iodocytidine;
4'-fluoro-5-methylcytidine;
4'-fluoro-5-butylcytidine;
4'-fluoro-5-isopropylcytidine;
4'-fluoro-5-trifluoromethylcytidine;
4'-fluoro-5-hydroxymethylcytidine;
4'-fluoro-5-nitrocytidine;
4'-fluoro-5-azacytidine;
4'-fluoro-6-azacytidine;
4'-fluoro-5-methyl-6-azacytidine; and
4'-fluoro-2-thiocytidine.

Similarly, by following the same procedure as above but using 1-chloro-2,3,5-tri-O-benzoyl-4-fluoro-L-lyxofuranose in place of the D-ribofuranose starting material and using the corresponding bis(trimethylsilyl)uracil and compounds listed in Column A above, the following compounds are respectively prepared:

1-(4-fluoro-α-L-lyxofuranosyl)uracil;
1-(4-fluoro-α-L-lyxofuranosyl)-5-fluorouracil;
1-(4-fluoro-α-L-lyxofuranosyl)-5-bromouracil;
1-(4-fluoro-α-L-lyxofuranosyl)-5-chlorouracil;
1-(4-fluoro-α-L-lyxofuranosyl)-5-iodouracil;
1-(4-fluoro-α-L-lyxofuranosyl)-5-methyluracil;
1-(4-fluoro-α-L-lyxofuranosyl-5-butyluracil;
1-(4-fluoro-α-L-lyxofuranosyl)-5-trifluoromethyluracil;
1-(4-fluoro-α-L-lyxofuranosyl)-5-hydroxymethyluracil;
1-(4-fluoro-α-L-lyxofuranosyl)-5-nitrouracil;
1-(4-fluoro-α-L-lyxofuranosyl)-5-azauracil;
1-(4-fluoro-α-L-lyxofuranosyl)-6-azauracil;
1-(4-fluoro-α-L-lyxofuranosyl)-5-methyl-6-azauracil;
1-(4-fluoro-α-L-lyxofuranosyl)-2-thiouracil;
1-(4-fluoro-α-L-lxyofuranosyl)-4-thiouracil;
1-(4-fluoro-α-L-lyxofuranosyl)-2,4-dithiouracil;
1-(4-fluoro-α-L-lyxofuranosyl)-cytosine;
1-(4-fluoro-α-L-lyxofuranosyl)-5-fluorocytosine;
1-(4-fluoro-α-L-lyxofuranosyl)-5-chlorocytosine;
1-(4-fluoro-α-L-lyxofuranosyl)-5-bromocytosine;
1-(4-fluoro-α-L-lyxofuranosyl)-5-iodocytosine;
1-(4-fluoro-α-L-lyxofuranosyl)-5-methylcytosine;
1-(4-fluoro-α-L-lyxofuranosyl)-5-butylcytosine;
1-(4-fluoro-α-L-lyxofuranosyl)-5-isopropylcytosine;
1-(4-fluoro-α-L-lyxofuranosyl)-5-trifluoromethylcytosine;
1-(4-fluoro-α-L-lyxofuranosyl)-5-hydroxymethyl;
1-(4-fluoro-α-L-lyxofuranosyl)-5-nitrocytosine;
1-(4-fluoro-α-L-lyxofuranosyl)-5-azacytosine;
1-(4-fluoro-α-L-lyxofuranosyl)-6-azacytosine;
1-(4-fluoro-α-L-lyxofuranosyl-5-methyl-6-azacytosine; and
1-(4-fluoro-α-L-lyxofuranosyl)-2-thiocytosine.

Similarly, by following the same procedure as above, the above products are also respectively prepared using the corresponding 1-bromo-2,3,5-tri-O-benzoyl)-4-fluoro-D-ribofuranose, or 1-bromo-2,3,5-tri-O-benzoyl-4-fluoro-L-lyxofuranose starting materials.

EXAMPLE 17a

In this example 5 mmoles of 1-O-acetyl-2,3,5-tri-O-benzoyl-4-fluoro-D-ribofuranose and 5.5 moles of bis(-trimethylsilyl)uracil are dissolved in 100 ml. of 1,2-dichloroethane at 20°C and 3.36 mmoles of stannic chloride is then added. The resulting mixture is then stirred for 4 hours at 20°C and then 50 ml. of saturated aqueous sodium bicarbonate solution is added resulting in a two-phase liquid mixture. The organic phase is decanted and then filtered over diatomaceous earth (sold under the trademark Celite), dried over magnesium sulfate and then evaporated to dryness under vacuum. The residue is treated with a 100 ml. 1:1 (by vol.) mixture of methanol and concentrated ammonium hydroxide, for 18 hours at 20°C. This mixture is in turn evaporated to dryness and the resulting residue then further purified by preparative thin-layer chromatography over silica gel. The appropriate U.V. band is eluted with methanol-chloroform mixtures and then evaporated affording 4'-fluoro uridine identical to that from Example 17.

By following the same procedure as above using the corresponding C-ribofuranose or L-lyxofuranose starting materials and the corresponding compounds listed in Column A of Example 17, the 4'-fluoro pyrimidine nucleoside products enumerated in Example 17 are also respectively prepared.

EXAMPLE 18

This example illustrates methods, according to our invention, of preparing benzoyl protected 4'-fluoro-purine nucleosides of our invention. In this example 1 mmole of crude 1-chloro-2,3,5-tri-O-benzoyl-4-fluoro-D-ribofuranose, prepared according to Example 16, is dissolved in 50 ml. of benzene and then 1 mmole of anhydrous $N^6$-benzoyl-chloro mercuri-adenine is added to the solution, at 20°C, with constant stirring. One gram of diatomaceous earth, sold under the trademark Celite, is then added and the mixture is refluxed for 30 minutes. The hot mixture is then filtered and the resulting filtrate concentrated to half its original volume by vacuum evaporation. Addition of 4 volumes of hexane results in the formation of a precipitate which is then recovered by filtration, dried and then dissolved in 25 ml. of chloroform. The resulting chloroform solution is then successively washed with saturated aqueous potassium iodide, then with water, dried over magnesium sulfate, filtered, and evaporated to dryness. The resulting residue is then purified by chromatography over silica gel yielding pure $N^6$-benzoyl-2',3',5'-tri-O-benzoyl-4'-fluoro-adenosine. By following the same procedure as above but using the corresponding reagents enumerated in Column C hereinbelow in place of $N^6$-benzoyl chloromercuri adenine, the corresponding compounds enumerated hereinbelow in Column D are respectively prepared:

COLUMN C $N^6$-benzoyl-chloromercuri-2-fluoroadenine;
$N^6$-benzoyl-chloromercuri-2-azaadenine;
$N^6$-benzoyl-chloromercuri-7-deazaadenine;
$N^6$-benzoyl-chloromercuri-7-cyano-7-deazaadenine;
$N^6$-benzoyl-chloromercuri-8-azaadenine;
$N^6$-benzoyl-$N^6$-methyl-chloromercuri-adenine;
$N^6$-benzoyl-chloromercuri-hypoxanthine;
chloromercuri-xanthine;
$N^2$-acetyl-chloromercuri-guanine;
$N^2$-acetyl-chloromercuri-8-azaguanine;
$N^2$-acetyl-chloromercuri-7-deazaguanine;
6-chloro-chloromercuri-purine;
2-acetamido-6-chloro-chloromercuri-purine; and
2,6-dichloro-chloromercuri-purine.

COLUMN D $N^6$-benzoyl-2',3',5'-tri-O-benzoyl-4'-fluoroadenosine;
$N^6$-benzoyl-2',3',5'-tri-O-benzoyl-4'-fluoro-2-adenosine;
$N^6$-2',3',5'-tri-O-benzoyl-4'-fluoro-2-azaadenosine;
$N^6$-benzoyl-2',3',5'-tri-O-benzoyl-4'-fluoro-7-deazaadenosine;
$N^6$-benzoyl-2',3',5'-tri-O-benzoyl-4'-fluoro-7-cyano-7-deazaadenosine;
$N^6$-benzoyl-2',3',5'-tri-O-benzoyl-4'-fluoro-8-azaadenosine;
$N^6$-methyl-$N^6$-benzoyl-2',3',5'-tri-O-benzoyl-4'-fluoroadenosine;
2',3',5'-tri-O-benzoyl-4'-fluoro-inosine;
2',3',5'-tri-O-benzoyl-4'-fluoro-xanthosine;
$N^2$-acetyl-2',3',5'-tri-O-benzoyl-4'-fluoro-guanosine;
$N^2$-acetyl-2',3',5'-tri-O-benzoyl-4'-fluoro-8-azaguanosine;
$N^2$-acetyl-2',3',5'-tri-O-benzoyl-4'-fluoro-7-deazaguanosine;
6-chloro-9-(2,3,5-tri-O-benzoyl-4-fluoro-$\beta$-D-ribofuranosyl)purine;
2-acetamido-6-chloro-9-(2,3,5-tri-O-benzoyl-4-fluoro-$\beta$-D-ribofuranosyl)purine; and
2,6-dichloro-9-(2,3,5-tri-O-benzoyl-4-fluoro-$\beta$-D-ribofuranosyl)purine.

Similarly, by following the same procedure as above, the above compounds are also prepared using 1-bromo-2,3,5-tri-O-benzoyl-4-fluoro-D-ribofuranose in place of the 1-chloro-D-ribofuranose starting materials.

Similarly, by following the same procedure as above, but using 1-chloro-2,3,5-tri-O-benzoyl-4-fluoro-L-lyxofuranose in place of the -D-ribofuranose starting materials and respectfully using the above chloromercuric purine reagents, the following compounds are also respectively prepared:

$N^6$-benzoyl-9-(2,3,5-tri-O-benzoyl-4-fluoro-$\alpha$-L-lyxofuranosyl)adenine;
$N^6$-benzoyl-9-(2,3,5-tri-O-benzoyl-4-fluoro-$\alpha$-L-lyxofuranosyl)-2-fluoroadenine;
$N^6$-benzoyl-9-(2,3,5-tri-O-benzoyl-4-fluoro-$\alpha$-L-lyxofuranosyl)-2-azaadenine;
$N^6$-benzoyl-9-(2,3,5-tri-O-benzoyl-4-fluoro-$\alpha$-L-lyxofuranosyl)-7-deazaadenine;
$N^6$-benzoyl-9-(2,3,5-tri-O-benzoyl-4-fluoro-$\alpha$-L-lyxofuranosyl)-7-cyano-7-deazaadenine;
$N^6$-benzoyl-9-(2,3,5-tri-O-benzoyl-4-fluoro-$\alpha$-L-lyxofuranosyl)-8-azaadenine;
$N^6$-methyl-$N^6$-benzoyl-9-(2,3,5-tri-O-benzoyl-4-fluoro-$\alpha$-L-lyxofuranosyl)adenine;
9-(2,3,5-tri-O-benzoyl-4-fluoro-$\alpha$-L-lyxofuranosyl)-hypoxanthine;
9-(2,3,5-tri-O-benzoyl-4-fluoro-$\alpha$-L-lyxofuranosyl)xanthine;
$N^2$-acetyl-9-(2,3,5-tri-O-benzoyl-4-fluoro-$\alpha$-L-lyxofuranosyl)guanine;
$N^2$-acetyl-9-(2,3,5-tri-O-benzoyl-4-fluoro-$\alpha$-L-lyxofuranosyl)-8-azaguanine;
$N^2$-acetyl-9-(2,3,5-tri-O-benzoyl-4-fluoro-$\alpha$-L-lyxofuranosyl)-7-deazaguanine;
6-chloro-9-(2,3,5-tri-O-benzoyl-4-fluoro-$\alpha$-L-lyxofuranosyl)purine;
2-acetamido-6-chloro-9-(2,3,5-tri-O-benzoyl-4-fluoro-$\alpha$-L-lyxofuranosyl)purine; and
2,6-dichloro-9-(2,3,5-tri-O-benzoyl-4-fluoro-$\alpha$-L-lyxofuranosyl)purine.

Similarly, the above compounds are also respectively prepared using 1-bromo-2,3,5-tri-O-benzoyl-4-fluoro-L-lyxofuranose as a sugar starting material.

EXAMPLE 19

This example illustrates methods of removing benzoyl-protecting groups from the 4'-fluoro-purine nucleosides of our invention. In this example 1 mmole of $N^6$-benzoyl-2',3',5'-tri-O-benzoyl-4'-fluoroadenosine is dissolved in 10 ml. of a (1:1 by vol.) mixture of methanol and concentrated ammonium hydroxide and stirred for 18 hours at 20°C. The reaction mixture is then evaporated to dryness and the resulting residue is further purified by preparative thin-layer chromatography over silica gel, yielding 4'-fluoroadenosine. By following the same procedure as above using the corresponding benzoyl protected nucleoside products enumerated in Example 18, the following compounds are respectively prepared:

4'-fluoro-2-fluoroadenosine;
4'-fluoro-2-azaadenosine;
4'-fluoro-7-deazaadenosine; 4'-fluoro-7-cyano-7-deazaadenosine;
4'-fluoro-8-azaadenosine;
$N^6$-methyl-4'-fluoroadenosine;
4'-fluoro-inosine;
4'-fluoro-xanthosine;
4'-fluoroguanosine;
4'-fluoro-8-azaguanosine;
4'-fluoro-7-deazaguanosine;
9-(4-fluoro-α-L-lyxofuranosyl)adenine;
9-(4-fluoro-α-L-lyxofuranosyl)-2-fluoroadenine;
9-(4-fluoro-α-L-lyxofuranosyl)-2-azaadenine;
9-(4-fluoro-α-L-lyxofuranosyl)-7-deazaadenine;
9-(4-fluoro-α-L-lyxofuranosyl)-7-cyano-7-deazaadenine;
9-(4-fluoro-α-L-lyxofuranosyl)-8-azaadenine;
$N^6$-methyl-9-(4-fluoro-α-L-lyxofuranosyl)adenine;
9-(4-fluoro-α-L-lyxofuranosyl)hypoxanthine;
9-(4-fluoro-α-L-lyxofuranosyl)xanthine;
9-(4-fluoro-α-L-lyxofuranosyl)guanine;
9-(4-fluoro-α-L-lyxofuranosyl)-8-azaguanine; and
9-(4-fluoro-α-L-lyxofuranosyl)-7-deazaguanine.

EXAMPLE 20

This example illustrates methods, according to our invention, of preparing the 6-mercapto-4'-fluoropurine nucleosides of our invention. In this example 1 mmole of 6-chloro-9-(2,3,5-tri-O-benzoyl-4-fluoro-β-D-ribofuranosyl)purine, prepared according to Example 18, is added to 10 ml. of propanol containing 2.2 mmoles of thiourea and the resulting mixture then refluxed for 2 hours. The pH of the solution is monitored and maintained at about 6 by the addition of a dilute solution of sodium hydroxide in propanol as required. The reaction mixture is then cooled and diluted with 5 ml. of concentrated ammonium hydroxide, and the reaction mixture then stirred for 24 hours at 20°C. The reaction mixture is then evaporated to dryness under vacuum and purified by chromatography on silica gel eluting with mixtures of methanol and chloroform yielding pure 6-mercapto-9-(4-fluoro-β-D-ribofuranosyl)purine.

Similarly, by following the same procedure as above but using 2-acetamido-6-chloro-9-(2,3,5-tri-O-benzoyl-4-fluoro-β-D-ribofuranosyl)purine as starting material, 2-amino-6-mercapto-9-(4-fluoro-β-D-ribofuranosyl)purine is also prepared.

EXAMPLE 21

This example illustrates methods, according to our invention of preparing the 6-lower alkylthio-4'-fluoropurine nucleosides of our invention. In this example 1.2 mmoles of methyl iodide is added dropwise to a mixture containing 1 mmole of 6-mercapto-9-(4-fluoro-β-D-ribofuranosyl)purine in 10 ml. of 0.1 Normal aqueous sodium hydroxide solution, with vigorous stirring, at 20°C. The mixture is vigorously stirred at 20°C for 4 hours and then cooled to 0°C and neutralized to a pH of 7 with glacial acetic acid and then evaporated to dryness. The residue is dissolved in hot ethanol and then filtered and the resulting filtrate further purified by chromatography yielding pure 6-methylthio-9-(4-fluoro-β-D-ribofuranosyl)purine.

By following the same procedure but respectively using ethyl iodide; propyl iodide; and butyl iodide, the following compounds are respectively prepared:

6-ethylthio-9-(4-fluoro-β-D-ribofuranosyl)purine;
6-propylthio-9-(4-fluoro-β-D-ribofuranosyl)purine; and
6-butylthio-9-(4-fluoro-β-D-ribofuranosyl)purine.

Similarly, by following the same procedure but using 2-amino-6-mercapto-9-(4-fluoro-β-D-ribofuranosyl)purine in place of 6-mercapto-9-(4-fluoro-β-D-ribofuranosyl)purine, the following compounds are respectively prepared:

2-amino-6-methylthio-9-(4-fluoro-β-D-ribofuranosyl)purine;
2-amino-6-ethylthio-9-(4-fluoro-β-D-ribofuranosyl)purine;
2-amino-6-propylthio-9-(4-fluoro-β-D-ribofuranosyl)purine; and
2-amino-6-butylthio-9-(4-fluoro-β-D-ribofuranosyl)purine.

EXAMPLE 22

This example illustrates methods, according to our invention, of preparing 6-alkylamino-4'-fluoro-purine nucleosides of our invention. In this example 1 mmole of 6-chloro-9-(2,3,5-tri-O-benzoyl-4-fluoro-β-D-ribofuranosyl)purine is dissolved in 20 ml of ethanol and then 10 ml. of anhydrous methylamine is added. The resulting mixture is heated in a sealed tube for 4 hours at 100°C. The reaction mixture is then evaporated to dryness and the resulting residue purified by chromatography on silicic acid yielding pure 6-methylamino-9-(4-fluoro-β-D-ribofuranosyl)purine.

Similarly, 6-dimethylamino-9-(4-fluoro-β-D-ribofuranosyl)purine is prepared by following the above procedure but using dimethylamine in place of methylamine.

Similarly, by following the same procedure as above but using 2-acetamido-6-chloro-9-(2,3,5-tri-O-benzoyl-4-fluoro-β-D-ribofuranosyl)purine in place of 6-chloro-9-(2,3,5-tri-O-benzoyl-4-fluoro-β-D-ribofuranosyl)purine, the following compounds are respectively prepared:

2-amino-6-methylamino-9-(4-fluoro-β-D-ribofuranosyl)purine; and
2-amino-6-dimethylamino-9-(4-fluoro-β-D-ribofuranosyl)purine.

EXAMPLE 22a

This example illustrates additional methods for preparing 6-substituted amino-4'-fluoro-purine nucleosides of our invention. In this example 10 ml. of 2-aminoethanol is added to a solution containing 1 mmole of 6-chloro-9-(2,3,5-tri-O-benzoyl-4-fluoro-β-D-ribofuranosyl)purine in 20 ml. of 5-butanol. The mixture is then refluxed for 4 hours and then evaporated to dryness. The resulting residue is then further purified by chromatography on silica gel using a gradient of methanol in chloroform yielding pure 6-(2-hydroxyethylamino)-9-(4-fluoro-β-D-ribofuranosyl)purine.

Similarly, by following the same procedure as above but respectively using the compounds listed hereinbelow in Column E in place of 2 aminoethanol, the corresponding compounds listed in Column F are respectively prepared:

COLUMN E t-butylamine;
neopentylamine;
t-amylamine;
hydrazine;
hydroxylamine;
γ,γ-dimethylallylamine;
benzylamine;
bis(2-hydroxyethyl)amine;
1-adamantylamine;
4-hydroxy-3-methyl2-butenylamine; and
2-methylamino-1-phenyl-1-propanol.

COLUMN F 6-t-butylamino-9-(4-fluoro-β-D-ribofuranosyl)-purine;
6-t-amylamino-9-(4-fluoro-β-D-ribofuranosyl)-purine;
6-neopentylamino-9-(4-fluoro-β-D-ribofuranosyl)-purine;
6-hydrazine-9-(4-fluoro-β-D-ribofuranosyl)-purine;
6-hydroxylamino-9-(4fluoro-β-D-ribofuranosyl)-purine;
6-(γ,γ-dimethylallylamino)-9-(4-fluoro-β-D-ribofuranosyl)-purine;
6-benzylamino-9-(4-fluoro-β-D-ribofuranosyl)-purine;
6-bis(2-hydroxyethyl)amino-9-(4-fluoro-β-D-ribofuranosyl)-purine;
6-(1-adamantylamino)-9-(4-fluoro-β-D-ribofuranosyl)-purine;
6-(4-hydroxy-3-methyl-2-butenylamino)-9-(4-fluoro-β-D-ribofuranosyl)-purine; and
6-[N-methyl-N-(1-hydroxy-1-phenyl-2-propyl)-amino]-9-(4-fluoro-β-D-ribofuranosyl)-purine.

Similarly, by following the same procedures as above but using 2-acetamido-6-chloro-9-(2,3,5-tri-O-benzoyl-4-fluoro-β-D-ribofuranosyl)purine in place of 6-chloro-9-(2,3,5-tri-O-benzoyl-4-fluoro-β-D-ribofuranosyl)-purine, the following compounds are respectively prepared:

2-amino-6-t-butylamino-9-(4-fluoro-β-D-ribofuranosyl)-purine;
2-amino-6-t-amylamino-9-(4-fluoro-β-D-ribofuranosyl)-purine;
2-amino-6-neopentylamino-9-(4-fluoro-β-D-ribofuranosyl)-purine;
2-amino-6-hydrazino-9-(4-fluoro-β-D-ribofuranosyl)-purine;
2-amino-6-(2-hydroxyamino)-9-(4-fluoro-β-D-ribofuranosyl)-purine;
2-amino-6-(γ,γ-dimethylallylamino)-9-(4-fluoro-β-D-ribofuranosyl)-purine;
2-amino-6-benzylamino-9-(4-fluoro-β-D-ribofuranosyl)-purine;
2-amino-6-bis(2-hydroxyethyl)-amino-9-(4-fluoro-β-D-ribofuranosyl)-purine;
2-amino-6-(1-adamantylamino)-9-(4-fluoro-β-D-ribofuranosyl)-purine;
2-amino-6-(4-hydroxy-3-methyl-2-butenylamino)-9-(4-fluoro-β-D-ribofuranosyl)-purine; and
2-amino-6-[N-methyl-N-(1-hydroxy-1-phenyl-2-propyl)-amino]-9-(4-fluoro-β-D-ribofuranosyl)-purine.

EXAMPLE 23

This example illustrates methods, according to our invention, of preparing the 4'-fluoro-2-chloroadenosine compounds of our invention. In this example a mixture containing 2 mmoles of 2,6-dichloro-9-(2,3,5-tri-O-benzoyl-4-fluoro-β-D-ribofuranosyl)-purine in 60 ml. of methanol, in a tube, is saturated with gaseous ammonia at 0°C. The tube is sealed and the reaction mixture allowed to stand for 18 hours at 20°C, and then warmed to 40°C and maintained at this temperature for 3 hours. The tube is then cooled, carefully opened and the reaction mixture is evaporated under vacuum to dryness. The resulting residue is purified by thin-layer chromatography yielding pure 4'-fluoro-2-chloroadenosine.

EXAMPLE 24

In this example 15 mmoles of sodium methylmercaptide and 1 mmole of 2-chloro-4'-fluoroadenosine, prepared according to Example 23, are admixed in 20 ml. of dimethylformamide. The resulting mixture is maintained at 80°C for 6 hours and then cooled, and filtered. The filtrate is evaporated to dryness and the residue extracted three times with 10 ml. portions of ethanol. The extracts are combined, evaporated and the resulting resicue crystallized from water yielding 2-methyl-thio-4'-fluoroadenosine.

By following the same procedure but respectively using sodium ethylmercaptide; sodium n-propylmercaptide and sodium butylmercaptide in place of sodium methylmercaptide, the following compounds are respectively prepared:

2-ethylthio-4'-fluoroadenosine;
2-n-propylthio-4'-fluoroadenosine; and
2-butylthio-4'-fluoroadenosine.

EXAMPLE 25

This example illustrates methods, according to our invention, of preparing the 4'-fluoro-5-alkylamino pyrimidine nucleosides of our invention. In this example 1 mmole of 4'-fluoro-5-bromocytidine is dissolved in 5 ml. of anhydrous methylamine and then heated in a stainless steel bomb at 80°C for 18 hours. The reaction mixture is then evaporated to dryness and the residue is purified by preparative thin-layer chromatography on silica gel, affording pure 4'-fluoro-5-methylaminocytidine.

Similarly, 4'-fluoro-5-dimethylaminocytidine is prepared by following the same procedure but using dimethylamine in place of methylamine.

Similarly, by following the same procedure but using 4'-fluoro-5-bromouridine in place of 4'-fluoro-5-bromocytidine, the following compounds are prepared:

4'-fluoro-5-methylaminouridine; and
4'-fluoro-5-dimethylaminouridine.

EXAMPLE 25a

This example illustrates methods, according to our invention, of preparing the 4'-fluoro-5-amino pyridine nucleosides of our invention. In this example 300 mg. of palladium impregnated charcoal is added to a solution containing 1 mmole of 4'-fluoro-5-nitrouridine, prepared according to Example 17, in 10 ml. of methanol. The reaction mixture is stirred and maintained under one atmosphere of hydrogen pressure for 3 hours at 20°C. The reaction mixture is then filtered and the filtrate is evaporated to dryness. The resulting residue is then purified by preparative thin-layer chromatography yielding 4'-fluoro-5-aminouridine.

Similarly, 4'-fluoro-5-aminocytidine is prepared according to the same procedure but using 4'-fluoro-5-nitrocytidine in place of 4'-fluoro-5-nitrouridine.

EXAMPLE 25b

This example illustrates methods, according to our invention, of preparing the 4'-fluoro-4-hydroxylamino-pyrimidin-2-one nucleosides of our invention. In this example 20 mmoles of 4'-fluoro-cytidine, prepared according to Example 17 is dissolved in 15 ml. of water containing 2.76 g. of $NH_2OH \cdot HCl$. The solution is allowed to stand at 20°C until crystallization is observed to occur. The crystals are then recovered by filtration, washed with methanol, and dried affording 1-(4-fluoro-$\beta$-D-ribofuranosyl)-4-hydroxylamino-pyrimidin-2-one.

Similarly, by following the same procedure as above but using the corresponding 4'-fluoro-cytidine derivatives enumerated in Example 17, the following compounds are respectively prepared:

1-(4-fluoro-$\beta$-D-ribofuranosyl)-4-hydroxylamino-5-fluoro-pyrimidin-2-one;
1-(4-fluoro-$\beta$-D-ribofuranosyl)-4-hydroxylamino-5-chloropyrimidin-2-one;
1-(4-fluoro-$\beta$-D-ribofuranosyl)-4-hydroxylamino-5-bromopyrimidin-2-one;
1-(4-fluoro-$\beta$-D-ribofuranosyl)-4-hydroxylamino-5-iodopyrimidin-2-one;
1-(4-fluoro-$\beta$-D-ribofuranosyl)-4-hydroxylamino-5-ethylpyrimidin-2-one;
1-(4-fluoro-$\beta$-D-ribofuranosyl)-4-hydroxylamino-5-isopropyl-pyrimidin-2-one;
1-(4-fluoro-$\beta$-D-ribofuranosyl)-4-hydroxylamino-5-butylpyrimidin-2-one;
1-(4-fluoro-$\beta$-D-ribofuranosyl)-4-hydroxylamino-5-trifluoromethylpyrimidin-2-one;
1-(4-fluoro-$\beta$-D-ribofuranosyl)-4-hydroxylamino-5-hydroxymethylpyrimidin-2-one;
1-(4-fluoro-$\beta$-D-ribofuranosyl)-4-hydroxylamino-5-nitropyrimidin-2-one;
1-(4-fluoro-$\beta$-D-ribofuranosyl)-4-hydroxylamino-5-azapyrimidin-2-one;
1-(4-fluoro-$\beta$-D-ribofuranosyl)-4-hydroxylamino-6-azapyrimidin-2-one;
1-(4-fluoro-$\beta$-D-ribofuranosyl)-4-hydroxylamino-5-methyl-6-azapyrimidin-2-one; and
1-(4-fluoro-$\beta$-D-ribofuranosyl)-4-hydroxylamino-pyrimidin-2-thione.

Similarly, by following the same procedure as above, the corresponding 4-fluoro-$\alpha$-L-lyxofuranosyl-4-hydroxylaminopyrimidine nucleosides are respectively prepared.

EXAMPLE 26

This example illustrates methods of protecting the 2' and 3'- positions of the 4'-fluoro-nucleoside compounds of our invention, with a 2',3'-O-lower alkylidine group (e.g., 2', 3'-O-isopropylidene). In this example one millimole of 4'-fluorouridine is dissolved in 20 ml. of acetone containing 5 ml. of 2,2-dimethoxypropane. A minimum amount of 70% perchloric acid is then added to effect dissolution. The reaction mixture is left at 20°C for 15 minutes. Concentrated ammonium hydroxide is added in order to neutralize the perchloric acid and the reaction mixture is evaporated to dryness. The residue is purified by chromatography on silicic acid using a gradient of methanol in chloroform affording pure 2',3'-O-isopropylidene-4'-fluorouridine.

Similarly, by following the same procedure as above using the corresponding 4'-fluoro nucleoside products of Examples 17, 17a, 19, 20, 21, 22, 22a, 23, and 25; the following compounds are respectively prepared:

4'-fluoro-2',3'-O-isopropylidene-uridine;
4'-fluoro-2',3'-O-isopropylidene-5-fluorouridine;
4'-fluoro-2',3'-O-isopropylidene-5-chlorouridine;
4'-fluoro-2',3'-O-isopropylidene-5-bromouridine;
4'-fluoro-2',3'-O-isopropylidene-5-iodouridine;
4'-fluoro-2',3'-O-isopropylidene-5-methyluridine;
4'-fluoro-2',3'-O-isopropylidene-5-isopropyluridine;

4'-fluoro-2',3'-O-isopropylidene-5-butyluridine;
4'-fluoro-2',3'-O-isopropylidene-5-trifluoromethyluridine;
4'-fluoro-2',3'-O-isopropylidene-5-nitrouridine;
4'-fluoro-2',3'-O-isopropylidene-5-azauridine;
4'-fluoro-2',3'-O-isopropylidene-6-azauridine;
4'-fluoro-2',3'-O-isopropylidene-6-aza-5-methyluridine;
4'-fluoro-2',3'-O-isopropylidene-6-aza-5-butyluridine;
4'-fluoro-2',3'-O-isopropylidene-2-thiouridine;
4'-fluoro-2',3'-O-isopropylidene-4-thiouridine;
4'-fluoro-2',3'-O-isopropylidene-2,4-dithiouridine;
4'-fluoro-2',3'-O-isopropylidene-cytidine;
4'-fluoro-2',3'-O-isopropylidene-5-fluorocytidine;
4'-fluoro-2',3'-O-isopropylidene-5-chlorocytidine;
4'-fluoro-2',3'-O-isopropylidene-5-bromocytidine;
4'-fluoro-2',3'-O-isopropylidene-5-iodocytidine;
4'-fluoro-2',3'-O-isopropylidene-5-trifluoromethylcytidine;
4'-fluoro-2',3'-O-isopropylidene-5-ethylcytidine;
4'-fluoro-2',3'-O-isopropylidene-5-isopropylcytidene;
4'-fluoro-2',3'-O-isopropylidene-5-butylcytidine;
4'-fluoro-2',3'-O-isopropylidene-5-nitrocytidine;
4'-fluoro-2',3'-O-isopropylidene-5-azacytidine;
4'-fluoro-2',3'-O-isopropylidene-6-azacytidine;
4'-fluoro-2',3'-O-isopropylidene-6-aza-5-methylcytidine;
4'-fluoro-2',3'-O-isopropylidene-6-aza-5-butylcytidine;
4'-fluoro-2',3'-O-isopropylidene-2-thiocytidine;
4'-fluoro-2',3'-O-isopropylidene-5-methylaminouridine;
6-mercapto-9-(4-fluoro-2,3-O-isopropylidene-$\beta$-D-ribofuranosyl) purine;
2-amino-6-mercapto-9-(4-fluoro-2,3-O-isopropylidene-$\beta$-D-ribofuranosyl) purine;
6-methylmercapto-9-(4-fluoro-2,3-O-isopropylidene-$\beta$-D-ribofuranosyl) purine;
2-amino-6-methylmercapto-9-(4-fluoro-2,3-O-isopropylidene-$\beta$-D-ribofuranosyl) purine;
6-methylamino-9-(4-fluoro-2,3-O-isopropylidene-$\beta$-D-ribofuranosyl) purine;
6-dimethylamino-9-(4-fluoro-2,3-O-isopropylidene-$\beta$-D-ribofuranosyl) purine;
6-neopentylamino-9-(4-fluoro-2,3-O-isopropylidene-$\beta$-D-ribofuranosyl) purine;

6-(γ,γ-dimethylallylamino)-9-(4-fluoro-2,3-O-isopropylidene-β-D-ribofuranosyl) purine;

6-t-butylamino-9-(4-fluoro-2,3-O-isopropylidene-β-D-ribofuranosyl) purine;

6-[N-methyl-N-(1-hydroxy-1-phenyl-2-propyl)-amino]-9-(4-fluoro-2,3-O-isopropylidene-β-D-ribofuranosyl) purine;

6-(1-adamantylamino)-9-(4-fluoro-2,3-O-isopropylidene-β-D-ribofuranosyl) purine;

2-chloro-6-amino-9-(4-fluoro-2,3-O-isopropylidene-β-D-ribofuranosyl) purine;

5-methylamino-4'-fluoro-2',3'-O-isopropylidene-uridine;

5-methylamino-4'-fluoro-2',3'-O-isopropylidene-cytidine;

5-dimethylamino-4'-fluoro-2',3'-O-isopropylidene-uridine;

and 5-dimethylamino-4'-fluoro-2',3'-O-isopropylidene-cytidine.

Similarly by following the same procedure as above using the corresponding 4'-fluoro-α-L-lyxofuranosyl nucleoside products of the aforementioned examples, the corresponding 4'-fluoro-2',3'-isopropylidene-α-L-lyxofuranosyl nucleosides are prepared.

EXAMPLE 27

This example illustrates methods, according to our invention, of preparing 4'-fluoro-5'-deoxy-5'-iodonucleosides, of our invention, from the corresponding 4'-fluoronucleosides of our invention. In this example 1 mmole of 4'-fluoro-2',3'-O-isopropylideneuridine, prepared according to Example 26, is dissolved in 10 ml. of dimethylformamide at 20°C. 1.1 Mmoles of methyltriphenoxyphosphonium iodide is added and the resulting reaction mixture is allowed to stand for 18 hours at 20°C, after which time 1 ml. of methanol is added. The solvents are then removed by vacuum evaporation and the residue is dissolved in chloroform, washed with sodium thiosulfate solution and water. The chloroform phase is dried over magnesium sulfate, filtered, and then evaporated to dryness. The resulting residue is further purified by chromatography over silica gel yielding pure 5'-deoxy-4'-fluoro-5'-iodo-2',3'-O-isopropylidene-uridine.

Similarly, by following the same procedure as above but using the corresponding 4'-fluoro nucleoside products of Example 26 as starting materials, the following compounds are respectively prepared:

5'-deoxy-4'-fluoro-5'-iodo-2',3'-O-isopropylidene-5-fluorouridine;

5'-deoxy-4'-fluoro-5'-iodo-2',3'-O-isopropylidene-5-chlorouridine;

5'-deoxy-4'-fluoro-5'-iodo-2',3'-O-isopropylidene-5-bromouridine;

5'-deoxy-4'-fluoro-5'-iodo-2',3'-O-isopropylidene-5-iodouridine;

5'-deoxy-4'-fluoro-5'-iodo-2',3'-O-isopropylidene-5-methyluridine;

5'-deoxy-4'-fluoro-5'-iodo-2',3'-O-isopropylidene-5-isopropyluridine;

5'-deoxy-4'-fluoro-5'-iodo-2',3'-O-isopropylidene-5-butyluridine;

5'-deoxy-4'-fluoro-5'-iodo-2',3'-O-isopropylidene-5-trifluoromethyluridine;

5'-deoxy-4'-fluoro-5'-iodo-2',3'-O-isopropylidene-5-nitrouridine;

5'-deoxy-4'-fluoro-5'-iodo-2',3'-O-isopropylidene-5-azauridine;

5'-deoxy-4'-fluoro-5'-iodo-2',3'-O-isopropylidene-6-azauridine;

5'-deoxy-4'-fluoro-5'-iodo-2',3'-O-isopropylidene-6-aza-5-methyluridine;

5'-deoxy-4'-fluoro-5'-iodo-2',3'-O-isopropylidene-6-aza-5-butyluridine;

5'-deoxy-4'-fluoro-5'-iodo-2',3'-O-isopropylidene-2-thiouridine;

5'-deoxy-4'-fluoro-5'-iodo-2',3'-O-isopropylidene-4-thiouridine:

5'-deoxy-4'-fluoro-5'-iodo-2',3'-O-isopropylidene-2,4-dithiouridine;

5'-deoxy-4'-fluoro-5'-iodo-2',3'-O-isopropylidene-cytidine;

5'-deoxy-4'-fluoro-5'-iodo-2',3'-O-isopropylidene-5-fluorocytidine;

5'-deoxy-4'-fluoro-5'-iodo-2',3'-O-isopropylidene-5-chlorocytidine;

5'-deoxy-4'-fluoro-5'-iodo-2',3'-O-isopropylidene-5-bromocytidine;

5'-deoxy-4'-fluoro-5'-iodo-2',3'-O-isopropylidene-5-iodocytidine;

5'-deoxy-4'-fluoro-5'-iodo-2',3'-O-isopropylidene-5-trifluoromethylcytidine;

5'-deoxy-4'-fluoro-5'-iodo-2',3'-O-isopropylidene-5-ethylcytidine;

5'-deoxy-4'-fluoro-5'-iodo-2',3'-O-isopropylidene-5-isopropylcytidine;

5'-deoxy-4'-fluoro-5'-iodo-2',3'-O-isopropylidene-5-butylcytidine;

5'-deoxy-4'-fluoro-5'-iodo-2',3'-O-isopropylidene-5-nitrocytidine;

5'-deoxy-4'-fluoro-5'-iodo-2',3'-O-isopropylidene-5-azacytidine;

5'-deoxy-4'-fluoro-5'-iodo-2',3'-O-isopropylidene-6-azacytidine;

5'-deoxy-4'-fluoro-5'-iodo-2',3'-O-isopropylidene-6-aza-5-methylcytidine;

5'-deoxy-4'-fluoro-5'-iodo-2',3'-O-isopropylidene-6-aza-5-butylcytidine;

5'-deoxy-4'-fluoro-5'-iodo-2',3'-O-isopropylidene-2-thiocytidine;

5'-deoxy-4'-fluoro-5'-iodo-2',3'-O-isopropylidene-5-methylaminouridine;

5'-deoxy-4'-fluoro-5'-iodo-2',3'-O-isopropylidene-5-methylaminocytidine;

5'-deoxy-4'-fluoro-5'-iodo-2',3'-O-isopropylidene-5-dimethylaminouridine;

5'-deoxy-4'-fluoro-5'-iodo-2',3'-O-isopropylidene-5-dimethylaminocytidine;

6-mercapto-9-(5-deoxy-4-fluoro-5-iodo-2,3-O-isopropylidene-β-D-ribofuranosyl)-purine; and 6-methylmercapto-9-(5-deoxy-4-fluoro-5-iodo-2,3-O-isopropylidene-β-D-ribofuranosyl)-purine.

EXAMPLE 28

This example illustrates methods, according to our invention, of preparing 5'-deoxy-4'-fluoro nucleosides of our invention. In this example 1 mmole of $N^1,N^6$-dibenzoyl-5'-deoxy-4'-fluoro-5'-iodo-2',3'-O-isopropylidene-adenosine, prepared according to Example 4, is dissolved in 50 ml. of ethyl acetate containing 100 mg. of 5% palladium impregnated barium sulfate catalyst in suspension. The suspension is vigorously stirred and maintained under one atmosphere of hydrogen pressure for 24 hours at 20°C. The catalyst is then removed by filtration and the ethyl acetate solvent is evaporated. The residue is then dissolved in 10 ml. of 80% aqueous formic acid and allowed to stand for 24 hours at 20°C in order to hydrolyze the isopropylidene group and then evaporated to dryness. The benzoyl protecting groups on the base moiety of the nucleoside are then removed by dissolving the resulting residue in a 1:1 (by vol.) mixture of methanol and concentrated ammonium hydroxide and allowing the resulting solution to stand for 24 hours at 20°C. This reaction is then in turn evaporated to dryness and the resulting residue further purified by preparative thin-layer chromatography on silicic acid yielding 5'-deoxy-4'-fluoroadenosine.

Similarly, by following the same procedure as above but using the corresponding 4'-fluoronucleoside products of Example 4, as starting materials, the following compounds are respectively prepared:

9-(5-deoxy-4-fluoro-$\beta$-D-ribofuranosyl)-2-fluoroadenine;
9-(5-deoxy-4-fluoro-$\beta$-D-ribofuranosyl)-2-chloroadenine;
9-(5-deoxy-4-fluoro-$\beta$-D-ribofuranosyl)-2-azaadenine;
$N^6$-methyl-9-(5-deoxy-4-fluoro-$\beta$-D-ribofuranosyl)-adenine;
9-(5-deoxy-4-fluoro-$\beta$-D-ribofuranosyl)-8-aza-9-deazaadenine;
9-(5-deoxy-4-fluoro-$\beta$-D-ribofuranosyl)-7-deazaadenine;
9-(5-deoxy-4-fluoro-$\beta$-D-ribofuranosyl)-7-deaza-7-cyanoadenine;
9-(5-deoxy-4-fluoro-$\beta$-D-ribofuranosyl)-8-azaadenine;
9-(5-deoxy-4-fluoro-$\beta$-D-ribofuranosyl)-hypoxanthine;
9-(5-deoxy-4-fluoro-$\beta$-D-ribofuranosyl)-xanthine;
9-(5-deoxy-4-fluoro-$\beta$-D-ribofuranosyl)-guanine;
9-(5-deoxy-4-fluoro-$\beta$-D-ribofuranosyl)-8-azaguanine;
9-(5-deoxy-4-fluoro-$\beta$-D-ribofuranosyl)-7-deazaguanine;
9-(5-deoxy-4-fluoro-$\alpha$-L-lyxofuranosyl)-adenine;
9-(5-deoxy-4-fluoro-$\alpha$-L-lyxofuranosyl)-2-fluoroadenine;
9-(5-deoxy-4-fluoro-$\alpha$-L-lyxofuranosyl)-2-chloroadenine;
9-(5-deoxy-4-fluoro-$\alpha$-L-lyxofuranosyl)-2-azaadenine;
$N^6$-methyl-9-(5-deoxy-4-fluoro-$\alpha$-L-lyxofuranosyl)-adenine;
9-(5deoxy-4-fluoro-$\alpha$-L-lyxofuranosyl)-8-aza-9-deazaadenine;
9-(5-deoxy-4-fluoro-$\alpha$-L-lyxofuranosyl)-7-deazaadenine;
9-(5-deoxy-4-fluoro-$\alpha$-L-lyxofuranosyl)-7-deaza-7-cyanoadenine;
9-(5-deoxy-4-fluoro-$\alpha$-L-lyxofuranosyl)-8-azaadenine;
9-(5-deoxy-4-fluoro-$\alpha$-L-lyxofuranosyl)-hypoxanthine;
9-(5-deoxy-4-fluoro-$\alpha$-L-lyxofuranosyl)-xanthine;
9-(5-deoxy-4-fluoro-5-iodo-$\alpha$-L-lyxofuranosyl)-guanine;
9-(5-deoxy-4-fluoro-$\alpha$-L-lyxofuranosyl)-8-azaguanine; and
9-(5-deoxy-4-fluoro-$\alpha$-L-lyxofuranosyl)-7-deazaguanine.

Similarly, by following the same procedure as above but using the corresponding products of Example 27 as starting materials, and omitting the treatment with methanol and concentrated ammonium hydroxide since the base moiety of the nucleosides of Example 27 do not have benzoyl protecting groups, the following compounds are respectively prepared. Also, in the case of the cytidine derivatives, the reduction is conducted in the presence of a slight molar excess of triethylamine in order to suppress reduction of the pyrimidine ring.

5'-deoxy-4'-fluorouridine;
5'-deoxy-4'-fluoro-5-fluorouridine;
5'-deoxy-4'-fluoro-5-chlorouridine;
5'-deoxy-4'-fluoro-5-methyluridine;
5'-deoxy-4'-fluoro-5-isopropyluridine;
5'-deoxy-4'-fluoro-5-butyluridine;
5'-deoxy-4'-fluoro-5-trifluoromethyluridine;
5'-deoxy-4'-fluoro-5-azauridine;
5'-deoxy-4'-fluoro-6-azauridine;
5'-deoxy-4'-fluoro-6-aza-5-methyluridine;
5'-deoxy-4'-fluoro-cytidine;
5'-deoxy-4'-fluoro-5-fluorocytidine;
5'-deoxy-4'-fluoro-5-chlorocytidine;
5'-deoxy-4'-fluoro-5-trifluoromethylcytidine;
5'-deoxy-4'-fluoro-5-ethylcytidine;
5'-deoxy-4'-fluoro-5-isopropylcytidine;
5'-deoxy-4'-fluoro-5-butylcytidine;
5'-deoxy-4'-fluoro-5-azacytidine;
5'-deoxy-4'-fluoro-6-azacytidine;
5'-deoxy-4'-fluoro-6-aza-5-methylcytidine;
5'-deoxy-4'-fluoro-5-methylaminouridine;
5'-deoxy-4'-fluoro-5-methylaminocytidine;
5'-deoxy-4'-fluoro-5-dimethylaminouridine; and
5'-deoxy-4'-fluoro-5-dimethylaminocytidine.

EXAMPLE 29

This example illustrates methods, according to our invention, of preparing the 5'-azido-4'-fluoronucleosides of our invention. In this example, 1 mmole of $N^1,N^6$-dibenzoyl-9-(5-deoxy-4-fluoro-5-iodo-2,3-O-isopropylidene-$\beta$-D-ribofuranosyl)-adenine is dissolved in 10 ml. of dimethylformamide containing 4 mmoles of lithium azide, at 100°C. The reaction mixture is maintained at 100°C for 20 hours and then the dimethylformamide solvent is removed by vacuum evaporation. The resulting residue is partitioned between chloroform and water and the resulting organic phase is separated and dried over magnesium sulfate, then filtered and evaporated to dryness. The benzoyl protecting groups are removed from the base moiety by dissolving the residue and 10 ml. of a 1:1 (by vol.) mixture of methanol and ammonium hydroxide. The mixture is allowed to stand for 18 hours at 20°C and is then evaporated to dryness and the resulting residue purified by chromatography over silica gel yielding pure 5'-azido-5'-deoxy-4'-fluoro-2',3'-O-isopropylideneadenosine.

Similarly, by following the same procedure as above using the corresponding 4'-fluoro-5'-iodo nucleoside products of Example 26 as starting materials, the following compounds are respectively prepared:

9-(5-azido-5-deoxy-4-fluoro-2,3-O-isopropylidene-$\alpha$-L-lyxofuranosyl)-adenine;
9-(5-azido-5-deoxy-4-fluoro-2,3-O-isopropylidene-$\beta$-D-ribofuranosyl)-2-fluoroadenine;

9-(5-azido-5-deoxy-4-fluoro-2,3-O-isopropylidene-β-D-ribofuranosyl)-2-chloroadenine;
9-(5-azido-5-deoxy-4-fluoro-2,3-O-isopropylidene-β-D-ribofuranosyl)-2-azaadenine;
$N^6$-methyl-9-(5-azido-5-deoxy-4-fluoro-2,3-O-isopropylidene-β-D-ribofuranosyl)-adenine;
9-(5-azido-5-deoxy-4-fluoro-2,3-O-isopropylidene-β-D-ribofuranosyl)-8-aza-9-deazaadenine;
9-(5-azido-5-deoxy-4-fluoro-2,3-O-isopropylidene-β-D-ribofuranosyl)-7-deazaadenine;
9-(5-azido-5-deoxy-4-fluoro-2,3-O-isopropylidene-β-D-ribofuranosyl)-7-deaza-7-cyanoadenine;
9-(5-azido-5-deoxy-4-fluoro-2,3-O-isopropylidene-β-D-ribofuranosyl)-8-azaadenine;
9-(5-azido-5-deoxy-4-fluoro-2,3-O-isopropylidene-β-D-ribofuranosyl)-hypoxanthine;
9-(5-azido-5-deoxy-4-fluoro-2,3-O-isopropylidene-β-D-ribofuranosyl)-xanthine;
9-(5-azido-5-deoxy-4-fluoro-2,3-O-isopropylidene-β-D-ribofuranosyl)-guanosine;
9-(5-azido-5-deoxy-4-fluoro-2,3-O-isopropylidene-β-D-ribofuranosyl)-8-azaguanine;
9-(5-azido-5-deoxy-4-fluoro-2,3-O-isopropylidene-β-D-ribofuranosyl)-7-deazaguanine;
9-(5-azido-5-deoxy-4-fluoro-2,3-O-isopropylidene-α-L-lyxofuranosyl)-2-fluoroadenine;
9-(5-azido-5-deoxy-4-fluoro-2,3-O-isopropylidene-α-L-lyxofuranosyl)-2-chloroadenine;
9-(5-azido-5-deoxy-4-fluoro-2,3-O-isopropylidene-α-L-lyxofuranosyl)-2-azaadenine;
$N^6$-methyl-9-(5-azido-5-deoxy-4-fluoro-2,3-O-isopropylidene-α-L-lyxofuranosyl)-adenine;
9-(5-azido-5-deoxy-4-fluoro-2,3-O-isopropylidene-α-L-lyxofuranosyl)-8-aza-9-deazaadenine;
9-(5-azido-5-deoxy-4-fluoro-2,3-O-isopropylidene-α-L-lyxofuranosyl)-7-deazaadenine;
9-(5-azido-5-deoxy-4-fluoro-2,3-O-isopropylidene-α-L-lyxofuranosyl)-7-deaza-7-cyanoadenine;
9-(5-azido-5-deoxy-4-fluoro-2,3-O-isopropylidene-α-L-lyxofuranosyl)-8-azaadenine;
9-(5-azido-5-deoxy-4-fluoro-2,3-O-isopropylidene-α-L-lyxofuranosyl)-hypoxanthine;
9-(5-azido-5-deoxy-4-fluoro-2,3-O-isopropylidene-α-L-lyxofuranosyl)-xanthine;
9-(5-azido-5-deoxy-4-fluoro-2,3-O-isopropylidene-α-L-lyxofuranosyl)-guanine;
9-(5-azido-5-deoxy-4-fluoro-2,3-O-isopropylidene-α-L-lyxofuranosyl)-8-azaguanine; and
9-(5-azido-5-deoxy-4-fluoro-2,3-O-isopropylidene-α-L-lyxofuranosyl)-7-deazaguinine.

Similarly, by following the same procedure as above but using the corresponding products of Example 27 as starting materials and omitting the treatment with methanol and concentrated ammonium hydroxide, the following compounds are respectively prepared:

5'-azido-5'-deoxy-4'-fluoro-2',3'-O-isopropylideneuridine;
5'-azido-5'-deoxy-4'-fluoro-2',3'-O-isopropylidene-5-fluorouridine;
5'-azido-5'-deoxy-4'-fluoro-2', 3'-O-isopropylidene-5-chlorouridine;
5'-azido-5'-deoxy-4'-fluoro-2',3'-O-isopropylidene-5-bromouridine;
5'-azido-5'-deoxy-4'-fluoro-2',3'-O-isopropylidene-5-iodouridine;
5'-azido-5'-deoxy-4'-fluoro-2',3'-O-isopropylidene-5-methyluridine;
5'-azido-5'-deoxy-4'-fluoro-2',3'-O-isopropylidene-5-isopropyluridine;
5'-azido-5'-deoxy-4'-fluoro-2',3'-O-isopropylidene-5-butyluridine;
5'-azido-5'-deoxy-4'-fluoro-2',3'-O-isopropylidene-5-trifluoromethyluridine;
5'-azido-5'-deoxy-4'-fluoro-2',3'-O-isopropylidene-5-nitrouridine;
5'azido-5'-deoxy-4'-fluoro-2',3'-O-isopropylidene-5-azauridine;
5'-azido-5'-deoxy-4'-fluoro-2',3'-O-isopropylidene-6-azauridine;
5'-azido-5'-deoxy-4'-fluoro-2',3'-O-isopropylidene-6-aza-5-methyluridine;
5'-azido-5'-deoxy-4'-fluoro-2',3'-O-isopropylidene-2-thiouridine;
5'-azido-5'-deoxy-4'-fluoro-2',3'-O-isopropylidene-4-thiouridine;
5'-azido-5'-deoxy-4'-fluoro-2',3'-O-isopropylidene-2,4-dithiouridine;
5'-azido-5'-deoxy-4'-fluoro-2',3'-O-isopropylidenecytidine;
5'-azido-5'-deoxy-4'-fluoro-2',3'-O-isopropylidene-5-fluorocytidine;
5'-azido-5'-deoxy-4'-fluoro-2',3'-O-isopropylidene-5-chlorocytidine;
5'-azido-5'-deoxy-4'-fluoro-2',3'-O-isopropylidene-5-bromocytidine;
5'-azido-5'-deoxy-4'-fluoro-2',3'-O-isopropylidene-5-iodocytidine;
5'-azido-5'-deoxy-4'-fluoro-2',3'-O-isopropylidene-6-trifluoromethylcytidine;
5'-azido-5'-deoxy-4'-fluoro-2',3'-O-isopropylidene-5-ethylcytidine;
5'-azido-5'-deoxy-4'-fluoro-2',3'-O-isopropylidene-5-isopropylcytidine;
5'-azido-5'-deoxy-4'-fluoro-2',3'-O-isopropylidene-5-butylcytidine;
5'-azido-5'-deoxy-4'-fluoro-2',3'-O-isopropylidene-5-nitrocytidine;
5'-azido-5'-deoxy-4'-fluoro-2',3'-O-isopropylidene-5-azacytidine;
5'-azido-5'-deoxy-4'-fluoro-2',3'-O-isopropylidene-6-azacytidine;
5'-azido-5'-deoxy-4'-fluoro-2',3'-O-isopropylidene-6-aza-5-methylcytidine;
5'-azido-5'-deoxy-4'-fluoro-2',3'-O-isopropylidene-2-thiocytidine;
5'-azido-5'-deoxy-4'-fluoro-2',3'-O-isopropylidene-5-methylaminouridine;
5'-azido-5'-deoxy-4'-fluoro-2',3'-O-isopropylidene-5-methylaminocytidine;
5'-azido-5'-deoxy-4'-fluoro-2',3'-O-isopropylidene-5-dimethylaminouridine;
5'-azido-5'-deoxy-4'-fluoro-2',3'-O-isopropylidene-5-dimethylaminocytidine;
6-mercapto-9-(5-azido-5-deoxy-4-fluoro-2,3-O-isopropylidene-β-D-ribofuranosyl)-purine; and
6-methylmercapto-9-(5-azido-5-deoxy-4-fluoro-2,3-O-isopropylidene-β-D-ribofuranosyl)-purine.

Also in each of the above preparations, where $N^2$-benzoylguanosine starting materials are used, the ammonium hydroxide treatment is conducted at 100°C.

EXAMPLE 30

This example illustrates methods, according to our invention, of preparing the 5'-amino-5'-deoxy-4'- fluoro nucleosides of our invention. In this example, 1 mmole of 5'-azido-5'-deoxy-4'-fluoro-2',3'-O-isopropylidene adenosine, prepared according to Example 29, is dissolved in 10 ml. of 90% aqueous trifluoroacetic acid at 20°C and allowed to stand at this temperature for 30 minutes. The reaction mixture is then evaporated to dryness and the resulting residue is dissolved in 50 ml. of ethyl acetate containing 100 mg. of 5% palladium impregnated barium sulfate catalyst. The reaction mixture is stirred vigorously, at 20°C, and maintained under one atmosphere of hydrogen pressure for 12 hours. The ethyl acetate solvent is then evaporated and the resulting residue purified by chromatography over an ion exchange resin in the $H^+$ form. Elution with aqueous ammonium hydroxide followed by evaporation of the eluate and precipitation of the residue with ether afforded pure 5'-amino-5'-deoxy-4'-fluoroadenosine.

Similarly, by following the same procedure using the corresponding 5'-azido-5'-deoxy-4'-fluoro-nucleoside products of Example 29 as starting materials, the following compounds are respectively prepared:

9-(5-amino-5-deoxy-4-fluoro-β-D-ribofuranosyl)-2-fluoroadenine;
9-(5-amino-5-deoxy-4-fluoro-β-D-ribofuranosyl)-2-chloroadenine;
9-(5-amino-5-deoxy-4-fluoro-β-D-ribofuranosyl)-2-azaadenine;
$N^6$-methyl-9-(5-amino-5-deoxy-4-fluoro-β-D-ribofuranosyl)adenine;
9-(5-amino-5-deoxy-4-fluoro-β-D-ribofuranosyl)-b 8-aza-9-deazaadenine;
9-(5-amino-5-deoxy-4-fluoro-β-D-ribofuranosyl)-7-deazaadenine;
9-(5-amino-5-deoxy-4-fluoro-β-D-ribofuranosyl)-7-deaza-7-cyanoadenine;
9-(5-amino-5-deoxy-4-fluoro-β-D-ribofuranosyl)-8-azaadenine;
9-(5-amino-5-deoxy-4-fluoro-β-D-ribofuranosyl)-hypoxanthine;
9-(5-amino-5-deoxy-4-fluoro-β-D-ribofuranosyl)-xanthine;
9-(5-amino-5-deoxy-4-fluoro-β-D-ribofuranosyl)-guanine;
9-(5-amino-5-deoxy-4-fluoro-β-D-ribofuranosyl)-8-azaguanine;
9-(5-amino-5-deoxy-4-fluoro-β-D-ribofuranosyl)-7-deazaguanine;
9-(5-amino-5-deoxy-4-fluoro-α-L-lyxofuranosyl)-adenine;
9-(5-amino-5-deoxy-4-fluoro-α-L-lyxofuranosyl)-2-fluoroadenine;
9-(5-amino-5-deoxy-4-fluoro-α-L-lyxofuranosyl)-2-chloroadenine;
9-(5-amino-5-deoxy-4-fluoro-α-L-lyxofuranosyl)-2-azaadenine;
$N^6$-methyl-9-(5-amino-5-deoxy-4-fluoro-α-L-lyxofuranosyl)adenine;
9-(5-amino-5-deoxy-4-fluoro-α-L-lyxofuranosyl)-8-aza-9-deazaadenine;
9-(5-amino-5-deoxy-4-fluoro-α-L-lyxofuranosyl)-7-deazaadenine;
9-(5-amino-5-deoxy-4-fluoro-α-L-lyxofuranosyl)-7-deaza-7-cyanoadenine;
9-(5-amino-5-deoxy-4-fluoro-α-L-lyxofuranosyl)-8-azaadenine;
9-(5-amino-5-deoxy-4-fluoro-α-L-lyxofuranosyl)-hypoxanthine;
9-(5-amino-5-deoxy-4-fluoro-α-L-lyxofuranosyl)-xanthine;
9-(5-amino-5-deoxy-4-fluoro-α-L-lyxofuranosyl)-guanine;
9-(5-amino-5-deoxy-4-fluoro-α-L-lyxofuranosyl)-8-azaguanine;
9-(5-amino-5-deoxy-4-fluoro-α-L-lyxofuranosyl)-7-deazaguanine;
5'-amino-5'-deoxy-4'-fluoro-5-fluorouridine;
5'-amino-5'-deoxy-4'-fluoro-5-chlorouridine;
5'-amino-5'-deoxy-4'-fluoro-5-methyluridine;
5'-amino-5'-deoxy-4'-fluoro-5-isopropyluridine;
5'-amino-5'-deoxy-4'-fluoro-5-butyluridine;
5'-amino-5'-deoxy-4'-fluoro-5-trifluoromethyluridine;
5'-amino-5'-deoxy-4'-fluoro-5-azauridine;
5'-amino-5'-deoxy-4'-fluoro-6-azauridine;
5'-amino-5'-deoxy-4'-fluoro-6-aza-5-methyluridine;
5'-amino-5'-deoxy-4'-fluorocytidine;
5'-amino-5'-deoxy-4'-fluoro-5-fluorocytidine;
5'-amino-5'-deoxy-4'-fluoro-5-chlorocytidine;
5'-amino-5'-deoxy-4'-fluoro-6-trifluoromethylcytidine;
5'-amino-5'-deoxy-4'-fluoro-5-ethylcytidine;
5'-amino-5'-deoxy-4'-fluoro-5-isopropylcytidine;
5'-amino-5'-deoxy-4'-fluoro-5-butylcytidine;
5'-amino-5'-deoxy-4'-fluoro-5-azacytidine;
5'-amino-5'-deoxy-4'-fluoro-6-azacytidine;
5'-amino-5'-deoxy-4'-fluoro-6-methylcytidine;
5'-amino-5'-deoxy-4'-fluoro-5-methylaminouridine;
5'-amino-5'-deoxy-4'-fluoro-5-methylaminocytidine;

5'-amino-5'-deoxy-4'-fluoro-5-dimethyluridine;
5'-amino-5'-deoxy-4'-fluoro-5-dimethylcytidine;
5'-amino-5'-deoxy-4'-fluorouridine.

EXAMPLE 31

This example illustrates methods, according to our invention, of preparing the 4'-fluoro nucleosides of our invention from the corresponding 5'-azid-5'-deoxy-4'-fluoronucleosides of our invention. In this example, 1 mmole of 5'-azido-5'-deoxy-4'-fluoro-2',3'-O-isopropylideneadenosine, prepared according to Example 29, is dissolved in 5 ml. of dioxane, then diluted with 300 ml. of benzene at 20°C. The solution is then irradiated in a pyrex apparatus with a high pressure ultraviolet source. The progress of the reaction is periodically monitored by thin-layer chromatography and irradiation is discontinued when the starting material has disappeared. The dioxane and benzene solvents are then removed by evaporation and the resulting residue dissolved in 10 ml. of dioxane. Two ml. of one Normal aqueous hydrochloric acid is then added and the resulting mixture heated for 30 seconds at 100°C. The mixture is then cooled to 20°C and neutralized by the addition of solid sodium bicarbonate. Five mmoles of sodium borohydride are then added and the reaction mixture stirred for 15 minutes at 20°C. Excess sodium borohydride is destroyed by the addition of glacial acetic acid and the solution is then again neutralized to a pH of 7 by the addition of solid sodium bicarbonate. The reaction mixture is then evaporated to dryness and the resulting residue is extracted with hot ethanol. The resulting extracts are then combined, filtered, and evaporated to dryness affording a residue which is further purified by preparative thin-layer chromatography over silica gel, using chloroform-methanol (9:1) yielding pure 4'-fluoro-2',3'-O-isopropylideneadenosine that can be crystallized from ethanol.

Similarly, by following the same procedure as above using the corresponding 5'-azido-5'-deoxy-4'-fluoro-2',3'-O-isopropylidene purine nucleosides of Example 29 as starting materials, the following compounds are respectively prepared:

9-(4-fluoro-2,3-O-isopropylidene-β-D-ribofuranosyl)-2-fluoroadenine;
9-(4-fluoro-2,3-O-isopropylidene-β-D-ribofuranosyl)-2-chloroadenine;
9-(4-fluoro-2,3-O-isopropylidene-β-D-ribofuranosyl)-2-azaadenine;
$N^6$-methyl-9-(4-fluoro-2,3-O-isopropylidene-β-D-ribofuranosyl)adenine;
9-(4-fluoro-2,3-O-isopropylidene-β-D-ribofuranosyl)-8-aza-9-deazaadenine;
9-(4-fluoro-2,3-O-isopropylidene-β-D-ribofuranosyl)-7-deazaadenine;
9-(4-fluoro-2,3-O-isopropylidene-β-D-ribofuranosyl)-7-deaza-7-cyanoadenine;
9-(4-fluoro-2,3-O-isopropylidene-β-D-ribofuranosyl)-8-azaadenine;
9-(4-fluoro-2,3-O-isopropylidene-β-D-ribofuranosyl)-hypoxanthine;
9-(4-fluoro-2,3-O-isopropylidene-β-D-ribofuranosyl)-xanthine;
9-(4-fluoro-2,3-O-isopropylidene-β-D-ribofuranosyl)-guanine;
9-(4-fluoro-2,3-O-isopropylidene-β-D-ribofuranosyl)-8-azaguanine;
9-(4-fluoro-2,3-O-isopropylidene-β-D-ribofuranosyl)-7-deazagunine;
9-(4-fluoro-2,3-O-isopropylidene-α-L-lyxofuranosyl)-adenine;
9-(4-fluoro-2,3-O-isopropylidene-α-L-lyxofuranosyl)-2-fluoroadenine;
9-(4-fluoro-2,3-O-isopropylidene-α-L-lyxofuranosyl)-2-chloroadenine;
9-(4-fluoro-2,3-O-isopropylidene-α-L-lyxofuranosyl)-2-azaadenine;
$N^6$-methyl-9-(4-fluoro-2,3-O-isopropylidene-α-L-lyxofuranosyl)adenine;
9-(4-fluoro-2,3-O-isopropylidene-α-L-lyxofuranosyl)-8-aza-9-deazaadenine;
9-(4-fluoro-2,3-O-isopropylidene-α-L-lyxofuranosyl)-7-deazaadenine;
9-(4-fluoro-2,3-O-isopropylidene-α-L-lyxofuranosyl)-7-deaza-7-cyanoadenine;
9-(4-fluoro-2,3-O-isopropylidene-α-L-lyxofuranosyl)-8-azaadenine;
9-(4-fluoro-2,3-O-isopropylidene-α-L-lyxofuranosyl)-hypoxanthine;
9-(4-fluoro-2,3-O-isopropylidene-α-L-lyxofuranosyl)-xanthine;
9-(4-fluoro-2,3-O-isopropylidene-α-L-lyxofuranosyl-guanine;
9-(4-fluoro-2,3-O-isopropylidene-α-L-lyxofuranosyl)-8-azaguinine and
9-(4-fluoro-2,3-O-isopropylidene-α-L-lyxofuranosyl)-7-deazaguanine.

Similarly, by following the same procedure as above, the corresponding 4'-fluoro-2',3'-O-isopropylidene pyrimidine nucleosides for each of the 5'-azido-5'-deoxy-4'-fluoro-2',3'-O-isopropylidene uridine or uridine derivative nucleoside or cytidine or cytidine derivatives of Example 29, with the exception of the 4-thiouracil and 2,4-thiouracil derivatives are also respectively prepared.

EXAMPLE 31a

This example illustrates methods of removing 2',3'-O-alkylidene protecting groups from the corresponding 2',3'-O-alkylidene protected 4'-fluoro compounds of our invention. In this example, 1 mmole of 4'-fluoro-2',3'-O-isopropylidene adenosine is dissolved in 80% aqueous formic acid and allowed to stand for 24 hours at 20°C. The reaction mixture is then evaporated to dryness and the resulting residue is then coevaporated with toluene and methanol to remove residual traces of formic acid. This residue is then further purified by preparative thin-layer chromatography on silicic acid using mixtures of methanol and ethyl acetate, affording 4'-fluoroadenosine. Similarly, by following the same procedure as above but using the corresponding 4'-fluoro-2',3'-O-isopropylidene protected purine nucleosides of Example 31, the following compounds are respectively prepared:

4'-fluoro-2-fluoroadenosine;
4'-fluoro-2-chloroadenosine;
4'-fluoro-2-azaadenosine;
$N^6$-methyl-4'-fluoroadenosine;
4'-fluoro-8-aza-9-deazaadenosine;
4'-fluoro-7-deazaadenosine;
4'-fluoro-7-deaza-7-cyanoadenosine;
4'-fluoro-8-azaadenosine;
4'-fluoroinosine;
4'-fluoroxanthosine;
4'-fluoroguanosine;
4'-fluoro-8-azaguanosine;
4'-fluoro-7-deazaguanosine;
9-(4-fluoro-α-L-lyxofuranosyl)adenine;
9-(4-fluoro-α-L-lyxofuranosyl)-2-fluoroadenine;
9-(4-fluoro-α-L-lyxofuranosyl)-2-chloroadenine;
9-(4-fluoro-α-L-lyxofuranosyl)-2-azaadenine;
$N^6$-methyl-9-(4-fluoro-α-L-lyxofuranosyl)-adenine;
9-(4-fluoro-α-L-lyxofuranosyl)8-aza-9-deazaadenine;
9-(4-fluoro-α-L-lyxofuranosyl)-7-deazaadenine;
9-(4-fluoro-α-L-lyxofuranosyl)-7-deaza-7-cyanoadenine;
9-(4-fluoro-α-L-lyxofuranosyl)-8-azaadenine;
9-(4-fluoro-α-L-lyxofuranosyl)-hypoxanthine;
9-(4-fluoro-α-L-lyxofuranosyl)-xanthine;
9-(4-fluoro-α-L-lyxofuranosyl)-guanine;
9-(4-fluoro-α-L-lyxofuranosyl)-8-azaguanine; and
9-(4-fluoro-α-L-lyxofuranosyl)-7-deazaguanine.

EXAMPLE 32

This example illustrates methods according to our invention of preparing the 4'-fluoro-5'-O-sulfamoyl nucleosides of our invention. In this example, 5 mmoles of 4'-fluoro-2',3'-O-isopropylideneuridine, prepared according to Examples 17, 17a, or 31 is dissolved in 50 ml. of pyridine, at 0°C. Ten mmoles of sulfamoyl chloride is then slowly added to the reaction mixture and the reaction is allowed to stand at 20°C for 1 hour. The reaction mixture is then evaporated to dryness and the resulting residue is dissolved in 50 ml. of 80% aqueous formic acid and allowed to stand for 24 hours at 20°C. This reaction mixture is in turn evaporated to dryness and the residue is coevaporated with toluene and methanol. This residue is then further purified by thin-layer chromatography using mixtures of chloroform and methanol. The appropriate band is eluted with methanol, concentrated by evaporation and then precipitated with ethyl ether affording a precipitate of pure 4'-fluoro-5'-O-sulfamoyluridine. By following the same procedure as above using the corresponding 4'-fluoro-2',3'-O-isopropylideneuridine, products of Examples 17, 17a, 31 as starting materials, the following compounds are respectively prepared:

4'-fluoro-5'-O-sulfamoyl-5-fluorouridine;
4'-fluoro-5'-O-sulfamoyl-5-chlorouridine;
4'-fluoro-5'-O-sulfamoyl-5-bromouridine;
4'-fluoro-5'-O-sulfamoyl-5-iodouridine;
4'-fluoro-5'-O-sulfamoyl-5-trifluoromethyluridine;
4'-fluoro-5'-O-sulfamoyl-5-hydroxymethyluridine;
4'-fluoro-5'-O-sulfamoyl-5-aminouridine;
4'-fluoro-5'-O-sulfamoyl-5-nitrouridine;
4'-fluoro-5'-O-sulfamoylcytidine;
4'-fluoro-5'-O-sulfamoyl-5-fluorocytidine;
4'-fluoro-5'-O-sulfamoyl-5-chlorocytidine;
4'-fluoro-5'-O-sulfamoyl-5-bromocytidine;
4'-fluoro-5'-O-sulfamoyl-5-iodocytidine;
4'-fluoro-5'-O-sulfamoyl-5-trifluoromethylcytidine;
4'-fluoro-5'-O-sulfamoyl-5-hydroxymethylcytidine;
4'-fluoro-5'-O-sulfamoyl-5-nitrocytidine;
4'-fluoro-5 -O-sulfamoyl-5-aminocytidine;
4'-fluoro-5'-O-sulfamoyl-$N^4$-hydroxycytidine;
6-mercapto-9-(4 -fluoro-5 -O-sulfamoyl-$\beta$-D-ribofuranosyl)purine; and
2-amino-6-mercapto-9-(4 -fluoro-5 -O-sulfamoyl-$\beta$-D-ribofuranosyl)purine.

EXAMPLE 32a

This example illustrates methods of preparing 4'-fluoro-5'-O-(N-lower alkylsulfamoyl)nucleosides and further methods of preparing 4'-fluoro-5'-O-sulfamoyl nucleosides. In this example 1 mmole of 4'-fluoro-2',3'-O-isopropylideneadenosine is dissolved in 25 ml. of benzene and 2 mmole of dibutyltinoxide is added. The reaction mixture is refluxed for two hours (with azeotropic removal of water). The reaction is cooled to +5°C and 4 mmole of sulfamoylchloride in 5 ml. of dioxane is added dropwise. The solution is stirred in 10 minutes at 20°C then evaporated to dryness. The residue is extracted with hot hexane to remove soluble tine compounds and the solution is evaporated to dryness and the residue purified by chromatography over silica gel. The produce is eluted with 10% methanol in chloroform. The fraction containing the desired nucleoside is pooled and evaporated to dryness. The residue is treated with 10 ml. of 90% trifluoroacetic acid for 1 hour then evaporated to dryness. The residue is dissolved in 10 ml. of a mixture of methanol and ammonium hydroxide (1:1 vol/vol) and then evaporated to dryness. The residue is then purified by preparative thin-layer chromatography using a mixture of $CHCl_3$ and MeOH as elutant. The U.V. band corresponding to the mucleoside is extracted and crystallized from water affording 4'-fluoro-5'-O-sulfamoyladenosine.

By following the above procedure, using the corresponding 4'-fluoro-2',3'-O-isopropylidene nucleosides as starting materials the 4'-fluoro-5'-O-sulfamoyl nucleosides prepared in Example 32 & 32b are also respectively prepared.

Similarly, by following the same procedure as above but using N-methylsulfamoylchloride in place of sulfamoylchloride, the corresponding 4'-fluoro-5'-(N-methylsulfamoyl)nucleoside derivative of the above products are also respectively prepared.

Similarly, by following the same procedure as above, but using N,N -dimethylsulfamoylchloride in place of sulfamoylchloride, the corresponding 5'-(N,N-dimethylsulfamoyl) derivatives of each of the above 4'-fluoro nucleoside products are also respectively prepared.

Similarly, by following the same procedure as above but respectively using the products enumerated in Example 25b as starting materials, the corresponding 5'-O-sulfamoyl; 5'-O-(N-methylsulfamoyl); and 5'-O-(N,N -dimethylsulfamoyl) derivatives of each product of Example 25b is respectively prepared, e.g., 1-(4-fluoro-5 -O-sulfamoyl-$\beta$-D-ribofuranosyl)-4-hydroxyaminopyrimidine-2-one; 1-[4-fluoro-5 -O-(N-methylsulfamoyl)-$\beta$-D-ribofuranosyl]-4-hydroxyaminopyrimidin-2-one; and 1-[4-fluoro-5-O-(N,N'-dimethylsulfamoyl)-$\beta$-D-ribofuranosyl]-4-hydroxylaminopyrimidin-2-one.

EXAMPLE 32b

This example illustrates further methods, according to our invention, of preparing 4'-fluoro-5'-O-sulfamoyl nucleosides of our invention. In this example, 30 mmoles of sodium hydride is added to the suspension containing 15 mmoles of 4'-fluoro-2',3'-O-isopropylidene adenosine in 150 ml. of 1,2-dimethoxyloxyethane at 20°C. The suspension is then stirred for 2 hours at 20°C and then cooled to 0°C and 30 ml. of 1,2-dimethoxyethane containing 30 mmoles of sulfamoyl chloride is added dropwise over a period of 15 minutes with constant stirring. The resulting suspension mixture is then stirred at 5°C for 20 hours and 10 ml. of absolute ethanol is then added. The solvents are removed by vacuum evaporation and 250 ml. of ethanol is then added to the residue resulting in a suspension which is then filtered. The filtrate is evaporated to dryness and the resulting residue is purified by thin-layer chromatography over a silica gel eluting with methanol-chloroform (1:9) affording an eluate fraction containing 4'-fluoro-2',3'-O-isopropylidene-5'-O-sulfamoyladenosine, which is then evaporated to dryness. The resulting residue, a clear syrup, is then dissolved in 100 ml. of 80% aqueous formic acid and allowed to stand for 24 hours at 20°C. This mixture is the evaporated to dryness and the resulting residue triturated with ethyl ether affording a power of pure 4'-fluoro-5'-O-sulfamoyladenosine.

Similarly, by following the same procedure as above but using the corresponding 4'-fluoro-2',3'-O-isopropylidene nucleoside products of Examples 17, 17a, 25b and 31 as starting materials, the following compounds are respectively prepared:

4'-fluoro-5'-O-sulfamoyluridine;
4'-fluoro-5'-O-sulfamoyl-5-methyluridine;
4'-fluoro-5'-O-sulfamoyl-5-isopropyluridine;
4'-fluoro-5'-O-sulfamoyl-5-butyluridine;
4'-fluoro-5'-O-sulfamoyl-5-azauridine;
4'-fluoro-5'-O-sulfamoyl-6-aza-5-methyluridine;
4'-fluoro-5'-O-sulfamoyl-2-thiouridine;
4'-fluoro-5'-O-sulfamoyl-4-thiouridine;
4'-fluoro-5'-sulfamoyl-2,4-dithiouridine;
4'-fluoro-5'-O-sulfamoyl-5-methylaminouridine;
4'-fluoro-5'-O-sulfamoyl-5-dimethylaminouridine;
4'-fluoro-5'-O-sulfamoylcytidine;

4'-fluoro-5'-O-sulfamoyl-5-ethylcytidine;
4'-fluoro-5'-O-sulfamoyl-5-isopropylcytidine;
4'-fluoro-5'-O-sulfamoyl-5-butylcytidine;
4'-fluoro-5'-O-sulfamoyl-5-azacytidine;
4'-fluoro-5'-O-sulfamoyl-6-azacytidine;
4'-fluoro-5'-O-sulfamoyl-6-aza5-methylcytidine;
4'-fluoro-5'-O-sulfamoyl-2-thiocytidine;
4'-fluoro-5'-O-sulfamoyl-5-methylaminocytidine;
4'-fluoro-5'-O-sulfamoyl-5-dimethylaminocytidine;
1-(4-fluoro-5-O-sulfamoyl-$\beta$-D-ribofuranosyl)-4-hydroxylamino-pyrimidin-2-one;
1-(4-fluoro-5-O-sulfamoyl-$\beta$-D-ribofuranosyl)-4-hydroxylamino-5-fluoropyrimidin-2-one;
1-(4-fluoro-5-O-sulfamoyl-$\beta$-D-ribofuranosyl)-4hydroxylamino-5-ethylpyrimidin-2-one;
1-(4-fluoro-5-O-sulfamoyl-$\beta$-D-ribofuranosyl)-4-hydroxylamino-5-trifluoromethylpyrimidin-2-one;
4'-fluoro-5'-O-sulfamoyl-2-fluoroadenosine;
4'-fluoro-5'-O-sulfamoyl-2-azaadenosine;
4'-fluoro-5'-O-sulfamoyl-8-aza-9-deazaadenosine;
4'-fluoro-5'-O-sulfamoyl-7-deazaadenosine;
4'-fluoro-5'-O-sulfamoyl-7-deaza-7-cyanoadenosine;

4'-fluoro-5'-O-sulfamoyl-8-azaadenosine;
4'-fluoro-5'-O-sulfamoylinosine;
4'-fluoro-5'-O-sulfamoylxanthosine;
4'-fluoro-5'-O-sulfamoylguanosine;
4'-fluoro-5'-O-sulfamoyl-8-azaguanosine;
4'-fluoro-5'-O-sulfamoyl-7-deazaguanosine;
6-methylmercapto-9-(4-fluoro-5-O-sulfamoyl-$\beta$-D-ribofuranosyl)-purine;
2-amino-6-methylmercapto-9-(4-fluoro-5-O-sulfamoyl-$\beta$-D-ribofuranosyl)-purine;
6-methylamino-9-(4-fluoro-5-O-sulfamoyl-$\beta$-D-ribofuranosyl)-purine;
6-dimethylamino-9-(4-fluoro-5-P-sulfamoyl-$\beta$-D-ribofuranosyl)-purine;
6-neopentylamino-9-(4-fluoro-5-O-sulfamoyl-$\beta$-D-ribofuranosyl)-purine;
6-($\gamma,\gamma$-dimethylamino)-9-(4-fluoro-5-O-sulfamoyl-$\beta$-D-ribofuranosyl)-purine;
6-(1-adamantylamino)-9-(4-fluoro-5-O-sulfamoyl-$\beta$-D-ribofuranosyl)-purine; and
2-chloro-6-amino-9-(4-fluoro-5-O-sulfamoyl-$\beta$-D-ribofuranosyl)-purine.

Similary, by following the same procedure as above using the corresponding $\alpha$-L-lyxofuranosyl starting materials, the corresponding 4'-fluoro-5'-O-sulfamoyl-$\alpha$-L-lyxofuranosyl nucleosides are respectively prepared.

EXAMPLE 33

This example illustrates methods according to our invention of preparing 4'-fluoronucleoside-5'-phosphates of our invention. In this example, 36 mmoles of barium cyanoethylphosphates is suspended in 100 ml. of water containing 36 ml. of pyridinium form ion exchange resin and is stirred at 20°C until the barium cyanoethylphosphate has dissolved. The entire mixture is then passed through an ion exchange column contaging 36 ml. of the same ion exchange type resin. The column is then washed with 200 ml. of water and this washing is combined with the original effluent and is evaporated to dryness under vacuum. The resulting residue is rendered anhydrous by three successive evaporations with 50 ml. portions of anhydrous pyridine. The anhydrous residue is then dissolved in 150 ml. of pyridine, and 18 mmoles of 4'-fluoro-2',3'-O-isopropylideneuridine, prepared according to Example 24, and 72 mmoles of dicyclohexylcarbodiimide are added. The resulting mixture is maintained in the absence of the light, at 20°C for 24 hours, and 10 ml. of water is then added. After one hour, 100 ml. of water is added and the reaction mixture is filtered. The resulting filtrate is then evaporated affording a syrup which is coevaporated three times with ethanol and the resulting residue then partitioned between 150 ml. of water and 150 ml. of ethyl ether. 100 Mmoles of lithium hydroxide is added to the water layer and the resulting solution is then heated at 100°C for 1 hour. This solution is then cooled to 0°C resulting in a precipitate which is removed by filtration. The precipitate is washed with 0.01 Normal lithium hydroxide to wash off the nucleotide but keep the unsoluble lithium phosphate on the filter. The filtrate is then adjusted to pH 7 by the slow addition of ion exchange resin in the hydrogen cation form. The ion exchange resin is then removed by filtration and the resulting filtrate is concentrated to 50 ml. by vacuum evaporation and then passed through a column containing 150 ml. of ion exchange resin in the hydrogen cation form. The column is then washed with water until most of the U.V. absorbing nucleoside material is recovered. The washings and original effluent are combined and the resulting acidic solution (about pH 2) is heated for one hour at 100°C and then adjusted to pH 8 by the addition of aqueous ammonium hydroxide. The mixture is then further purified by ion exchange chromatography on a column of diethylaminoethyl cellulose in the $HCO_3^-$ anion form by elution with a gradient of triethylammonium bicarbonate (0.01 to 0.15 M). The fractions corresponding to the U.V. absorbing peak are then combined and evaporated to dryness giving a residue which is then coevaporated several times with methanol and then dissolved in the minimum amount of methanol required for dissolution (about 4 ml.). The solution is then made slightly alkaline with triethylamine and a small molar excess of a 1 M solution of sodium iodide in acetone is added. 3 Volumes of acetone are added resulting in a precipitate which is collected by filtration and washed several times with acetone giving the disodium salt of 4'-fluorouridine-5'-phosphate as a chromatographically homogeneous white powder.

Similarly, by following the same procedure as above but using 4'-fluoro-2',3'-isopropylidenenucleoside products of Examples 26 and 32 as starting materials the disodium salts of the following compounds are respectively prepared:
4'-fluoro-5-fluorouridine 5'-phosphate;
4'-fluoro-5-chlorouridine 5'-phosphate;
4'-fluoro-5-bromouridine 5'-phosphate;
4'-fluoro-5-iodouridine 5'-phosphate;
4'-fluoro-5-methyluridine 5'-phosphate;
4'-fluoro-5isopropyluridine 5'-phosphate;
4'-fluoro-5-butyluridine 5'-phosphate;
4'-fluoro-5trifluoromethyluridine 5'-phosphate;
4'-fluoro-5-nitrouridine 5'-phosphate;
4'-fluoro-5azauridine 5'-phosphate;
4'-fluoro-6aza-5methyluridine 5'-phosphate;
4'-fluoro-2-thiouridine 5'-phosphate;
4'-fluoro-4-thiouridine 5'-phosphate;
4'-fluoro-2,4-dithiouridine 5'-phosphate;
4'-fluorocytidine 5'-phosphate;
4'-fluoro-5-fluorocytidine 5'-phosphate;

4'-fluoro-5-chlorocytidine 5'-phosphate;
4'-fluoro-5-bromocytidine 5'-phosphate;
4'-fluoro-5-iodocytidine 5'-phosphate;
4'-fluoro-5-trifluoromethylcytidine 5'-phosphate;
4'-fluoro-5-ethylcytidine 5'-phosphate;
4'-fluoro-5-isopropylcytidine 5'-phosphate;
4'-fluoro-5'-butylcytidine 5'-phosphate;
4'-fluoro-5-nitrocytidine 5'-phosphate;
4'-fluoro-5-azacytidine 5'-phosphate;
4'-fluoro-6-azacytidine 5'-phosphate;
4'-fluoro-6-aza-5-methylcytidine 5'-phosphate;
4'-fluoro-2-thiocytidine 5'-phosphate;
4'-fluoro-5-methylaminouridine 5'-phosphate;
6-mercapto-9-(4-fluoro-β-D-ribofuranosyl)-purine 5'-phosphate;
6-methylmercapto-9-(4-fluoro-β-D-ribofuranosly)-purine 5'-phosphate;
2-amino-6-methylmercapto-9-(4-fluoro-β-D-ribofuranosyl)-purine 5'-phosphate;
6-methylamino-9-(4-fluoro-β-D-ribofuranosyl)-purine 5'-phosphate;
6-dimethylamino-9-(4-fluoro-β-D-ribofuranosyl)-purine 5'-phosphate;
6-neopentylamino-9-(4-fluoro-β-D-ribofuranosyl)-purine 5'-phosphate;
6-(γ, γ-dimethylallylamino)-9-(4-fluoro-β-D-ribofuranosyl)-purine 5'-phosphate;
6-(1-adamantylamino)-9-(4-fluoro-β-D-ribofuranosyl)-purine 5'-phosphate;
2-chloro-6-amino-9-(4-fluoro-β-D-ribofuranosyl)-purine 5'-phosphate;
4'-fluoroadenosine 5'-phosphate;
4'-fluoro-2-chloroadenosine 5'-phosphate;
4'-fluoro-2-azaadenosine 5'-phosphate;
$N^6$-methyl-4'-fluoroadenosine 5'-phosphate;
4'-fluoro-8-aza-7-deazaadenosine 5'-phosphate;
4'-fluoro-7-deazaadenosine 5'-phosphate;
4'-fluoro-7-deaza-7-cyanoadenosine 5'-phosphate;
4'-fluoro-8-azaadenosine 5'-phosphate;
4'-fluoroinosine 5'-phosphate;
4'-fluoroxanthosine 5'-phosphate;
4'-fluoroguanosine 5'-phosphate;
4'-fluoro-8-azaguanosine 5'-phosphate;
4'-fluoro-7-deazaguanosine 5'-phosphate;
9-(4-fluoro-α-L-lyxofuranosyl)adenine 5'-phosphate;
9-(4-fluoro-α-L-lyxofuranosyl)-2-fluoroadenine 5'-phosphate;
9-(4-fluoro-α-L-lyxofuranosyl)-2-chloroadenine 5'-phosphate;
9-(4-fluoro-α-L-lyxofuranosyl)-2-azaadenine 5'-phosphate;
$N^6$-methyl-9-(4-fluoro-α-L-lyxofuranosyl)adenine 5'-phosphate;
9-(4-fluoroα-L-lyxofuranosyl)-8-aza-7-deazaadenine 5'-phosphate;
9-(4-fluoro-α-L-lyxofuranosyl)-7-deazaadenine 5'-phosphate;
9-(4-fluoro-α-L-lyxofuranosyl)7-deaza-7-cyanoadenine 5'-phosphate;
9-(4-fluoro-α-L-lyxofuranosyl)-8-azaadenine 5'-phosphate;
9-(4-fluoro-α-L-lyxofuranosyl)-hypoxanthine 5'-phosphate;
9-(4-fluoro-α-L-lyxofuranosyl)-xanthine 5'-phosphate;
9-(4-fluoro-α-L-lyxofuranosyl)-guanine 5'-phosphate;
9-(4-fluoro-α-L-lyxofuranosyl)-8-azaguanine 5'-phosphate; and
9-(4-fluoro-α-L-lyxofuranosyl)-7-deazaguanine 50'-phosphate.

EXAMPLE 33a

This example illustrates further procedures for preparing the 4'-fluoro-nucleoside 5'-phosphates. In this example, 1 mmole of 4'-fluoro-2',3'-O-isopropylideneadenosine is suspended at −5°C in 2 mmole of freshly distilled phosphoroxychloride (POCl$_3$) and 10 mmole of trimethylphosphate is added. After 2 hours the reaction is poured in ether and the precipitate was separated by centrifugation. The precipitate was dissolved carefully in ice-water and the aqueous solution was adjusted to pH 1.5 with a 1 N sodium hydroxide solution and warmed at 70°C for 30 minutes. The product is then isolated by chromatography on diethylaminoethyl cellulose in the (HCO$_3^-$) anion form and eluted with a gradient of triethylammonium bicarbonate. The fraction containing the 4'-fluoroadenosine 5'-phosphate is pooled and evaporated to dryness. The residue is evaporated several times with methanol taken in 0.5 ml. of methanol and precipitated with ether giving the bis (triethylammonium) salt of 4'-fluoroadenosine 5'-phosphate.

Similarly, by following the same procedure but using the corresponding 4'-fluoro-2',3'-isopropylidenenucleoside products of Examples 26 and 32 as starting materials the bis (triethylammonium) salts corresponding to the disodium salts products of Example 33 are respectively prepared.

The disodium salts of Example 33, are then in turn prepared from the above corresponding bis (triethylammonium) sales by treatment with sodium iodide according to the procedure of Example 33.

Obviously many modifications and variations of the invention, described hereinabove and in the appended claims, can be made without departing from the essence and scope thereof.

What is claimed is:

1. A compound selected from the group having the formulas:

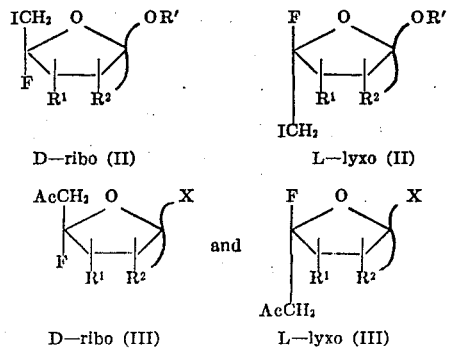

D—ribo (II)　　L—lyxo (II)

D—ribo (III)　　L—lyxo (III)

wherein $R^1$ and $R^2$ are independently hydroxy or acyloxy having from two through 12 carbon atoms, or $R^1$ $R^2$ together form the group

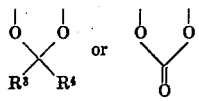

wherein R³ and R⁴ are independently hydrogen, lower alkyl having from one through six carbon atoms, or aryl having six through 12 carbon atoms, or R³ and R⁴ together with the carbon atom to which they are joined form a cycloalkyl group having from five through seven ring carbon atoms; R' is alkyl having from two through six carbon atoms or 2-halo lower alkyl having from one through six carbon atoms wherein halo is fluoro, chloro or bromo; Ac is acyloxy having two through 12 carbon atoms; X is chloro, bromo or acyloxy having from two through 12 carbon atoms; and the wavy line at the 1-position indicates two alternative orientations with respect to formulas II (ribo) and III (ribo) the α-D-ribo and β-D-ribo configurations and with respect to formulas II (lyxo) and III (lyxo) the α-L-lyxo and β-L-lyxo.

2. The compound of claim 1 wherein R¹ and R² are each benzoyloxy or together form a carbonate and R' is 2-haloethyl.

3. The compound of claim 2 wherein R' is 2,2,2-trichloroethyl.

4. The compound of claim 1 of formula II.

5. The compound of claim 4 wherein R¹ and R² are each benzoyloxy or together form a carbonate and R' is 2-haloethyl.

6. The compound of claim 5 wherein R' is 2,2,2-trichloroethyl.

7. The compound of claim 1 of formula III wherein R¹, R² and Ac are each benzoyloxy and X is chloro, bromo, or acetyloxy.

8. A compound selected from the group having the formulas

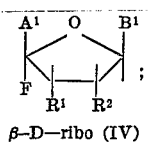 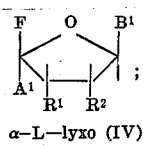

β–D—ribo (IV)    α–L—lyxo (IV)

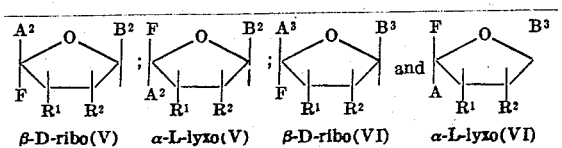

β-D-ribo(V)   α-L-lyxo(V)   β-D-ribo(VI)   α-L-lyxo(VI)

wherein R¹ and R² are independently hydroxy or acyloxy having from two through 12 carbon atoms, or R¹ and R² together form the group

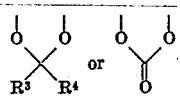

wherein R³ and R⁴ are independently hydrogen, lower alkyl, aryl having six through 12 carbon atoms or together with the carbon atom to which they are joined form a cycloalkyl group having from five through seven ring carbon atoms;
A¹ is selected from the group having the formulas: —CH₂OH, —CH₂I or —CH₂OPO(OH)₂; and B¹ is a purine base selected from the group consisting of 6-chloropurine; 2-acetamido-6-chloropurine; 2,6-dichloropurine; 6-hydrazinopurine; N⁶-methyladenine; N-methyl-N-(1-hydroxyl-1-phenyl-2-propyl)aminopurine; and 6-(1-methyl-4-nitro-5-imidazoyl)thiopurine A² is selected from the group having the formulas: —CH₃ and —CH₂NH₂; and B² is a purine base selected from the group consisting of 6-chloropurine; 2-acetamido-6-chloropurine; 2,6-dichloropurine; 6-hydrazinopurine; N⁶-methyladenine; and 6[N-methyl-N-(1-hydroxy-1-phenyl-2-propyl)]-aminopurine; A³ is selected from the group having the formula

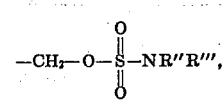

wherein R'' and R''' are independently hydrogen or lower alkyl having from one through six carbon atoms; and B³ is a purine base selected from the group consisting of 6-chloropurine; 2-acetamido-6-chloropurine; 2,6-dichloropurine; N⁶-methyladenine; N-methyl-N-(1-hydroxy-1-phenyl-2-propyl)aminopurine; and 6-(1methyl-4-nitro-5-imidazoyl) thiopurine.

9. The compound of claim 8 of formula IV, and pharmaceutically acceptable salts thereof.

10. The compound of claim 9 wherein R¹ and R² are independently hydroxy or benzoyloxy or together form an isopropylidene group, and B¹ is selected from the group of purine bases consisting of 6-chloropurine; and 2,6-dichloropurine.

11. The compound of claim 9 wherein said compound is a β-D-ribo isomer.

12. The compound of claim 10 wherein said compound is a β-D-ribo isomer.

13. The compound of claim 9 wherein A¹ has the formula —CH₂OH.

14. The compound of claim 10 wherein A¹ has the formula —CH₂OH.

15. The compound of claim 9 wherein A¹ has the formula —CH₂I.

16. The compound of claim 10 wherein A¹ has the formula —CH₂I.

17. The compound of claim 9 wherein A¹ has the formula —CH₂OPO(OH)₂.

18. The compound of claim 10 wherein A¹ has the formula —CH₂OPO(OH)₂.

19. The compound of claim 8 of formula V and pharmaceutically acceptable salts thereof.

20. The compound of claim 19 wherein R¹ and R² are independently hydroxy or benzoyloxy or together form an isopropylidene group, and B² is selected from the group of purine bases consisting of 6-chloropurine; and 2,6-dichloropurine.

21. The compound of claim 19 wherein said compound is a β-D-ribo isomer.

22. The compound of claim 20 wherein said compound is a β-D-ribo isomer.

23. The compound of claim 19 wherein A² has the formula —CH₃.

24. The compound of claim 20 wherein A² has the formula —CH₃.

25. The compound of claim 19 wherein A² has the formula —CH₂NH₂.

26. The compound of claim 20 wherein A² has the formula —CH₂NH₂.

27. The compound of claim 8 of formula VI and pharmaceutically acceptable salts thereof.

28. The compound of claim 27 wherein R¹ and R² are independently hydroxy or benzoyloxy or together form an isopropylidene group, and B¹ is selected from the group of purine bases consisting of 6-chloropurine; and 2,6-dichloropurine.

29. The compound of claim 27 wherein said compound is a β-D-ribo isomer.

30. The compound of claim 28 wherein said compound is β-D-ribo isomer.

31. A process for preparing a compound selected from the group having the formulas

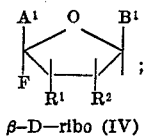 ; 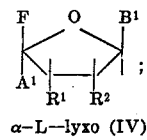 ;

β-D—ribo (IV)    α-L—lyxo (IV)

wherein R¹ and R² are independently hydroxy or acyloxy having from two through 12 carbon atoms, or R¹ and R² together form the group

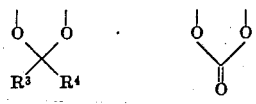

wherein R³ and R⁴ are independently hydrogen, lower alkyl, aryl having six through 12 carbon atoms or together with the carbon atom to which they are joined form a cycloalkyl group having from five through seven ring carbon atoms; A¹ is the group having the formula —CH₂OH, and B¹ is a pyrimidine base selected from the group consisting of cytosine, 5-fluorocytosine, 5-chlorocytosine, 5-bromocytosine, 5-iodocytosine, 5-lower alkyl cytosine, 5-trifluoromethylcytosine, 5-hydroxymethylcytosine, 5-nitrocytosine, 5-azacytosine, 6-azacytosine, 5-methyl-6-azacytosine, 2-thiocytosine, uracil, 5-fluorouracil, 5-chlorouracil, 5-bromouracil, 5-iodouracil, 5-lower alkyluracil, 5-trifluoromethyluracil, 5-hydroxymethyluracil, 5-nitrouracil, 5-azauracil, 6-azauracil, 5-methyl-6-azauracil, 2-thiouracil, 4-thiouracil, 2,4-dithiouracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one; 4-hydroxylamino-5-bromo-pyrimidin-2-one; 4-hydroxylamino-5-chloro-pyrimidin-2-one; 4-hydroxylamino-5-iodo-pyrimidin-2-one; 4-hydroxylamino-5-lower alkylpyrimidin-2-one; 4-hydroxylamino-5-trifluoromethyl-pyrimidin-2-one; 4-hydroxylamino-5-hydroxymethyl-pyrimidin-2-one; 4-hydroxylamino-5-nitro-pyrimidin-2-one; 4-hydroxylamino-5-aza-pyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; and 4-hydroxylaminopyrimidin-2-thione;

which comprises treating a compound having the formula

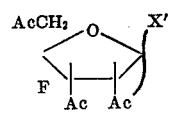

wherein Ac is an acyloxy group having from two through 12 carbon atoms; X' is chloro or bromo; and the wavy lines indicate alternative isomer orientations;

with a bis or tris(trimethylsilyl)pyrimidine, corresponding to the desired pyrimidine of B¹, and mercuric bromide and mercuric oxide, under reactive conditions in an inert organic solvent.

32. A process for preparing a compound selected from the group having the formulas

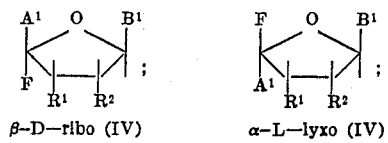

β-D—ribo (IV)    α-L—lyxo (IV)

wherein R¹ and R² are independently hydroxy or acyloxy having from two through 12 carbon atoms, or R¹ and R² together form the group

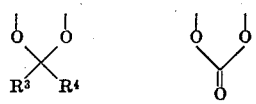

wherein R³ and R⁴ are independently hydrogen, lower alkyl, aryl having six through 12 carbon atoms or together with the carbon atom to which they are joined form a cycloalkyl group having from five through seven ring carbon atoms; A¹ is the group having the formula —CH₂OH, and B¹ is a pyrimidine base selected from the group consisting of cytosine, 5-fluorocytosine, 5-chlorocytosine, 5-bromocytosine, 5-iodocytosine, 5-lower alkyl cytosine, 5-trifluoromethylcytosine, 5-hydroxymethylcytosine, 5-nitrocytosine, 5-azacytosine, 6-azacytosine, 5-methyl-6-azacytosine, 2-thiocytosine, uracil, 5-fluorouracil, 5-chlorouracil, 5-bromouracil, 5-iodouracil, 5-lower alkyluracil, 5-trifluoromethyluracil, 5-hydroxymethyluracil, 5-nitrouracil, 5-azauracil, 6-azauracil, 5-methyl-6-azauracil, 2-thiouracil, 4-thiouracil, 2,4-dithiouracil, 5-aminouracil, 5-methylaminouracil, 5-dimethylaminouracil, 5-methylaminocytosine, 5-dimethylaminocytosine, 5-aminocytosine, 4-hydroxylamino-5-fluoro-pyrimidin-2-one; 4-hydroxylamino-5-bromo-pyrimidin-2-one; 4-hydroxylamino-5-chloro-pyrimidin-2-one; 4-hydroxylamino-5-iodo-pyrimidin2-one; 4-hydroxylamino-5-lower alkylpyrimidin-2-one; 4- hydroxylamino-5-trifluoromethyl-pyrimidin-2-one; 4-hydroxylamino-5-hydroxymethyl-pyrimidin-2-one; 4-hydroxylamino-5-nitro-pyrimidin-2-one; 4-hydroxylamino-5-aza-pyrimidin-2-one; 4-hydroxylamino-6-aza-pyrimidin-2-one; 4-hydroxylamino-5-methyl-6-aza-pyrimidin-2-one; 4-hydroxylamino-pyrimidin-2-one; and 4-hydroxylaminopyrimidin-2-thione, which comprises treating a compound having the formula

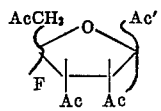

wherein Ac and Ac' are independently selected from acyloxy groups having from two through 12 carbon atoms and the wavy line indicates alternative isomer orientations;

with a bis or tris(trimethylsilyl)pyrimidine, corresponding to the desired pyrimidine of $B^1$, and tin tetrachloride under reactive conditions in an inert organic solvent.

33. The process of claim 31 wherein said treatment is conducted at temperatures in the range of about from 60° to 100°C for about from 3 to 8 hours.

34. The process of claim 31 wherein Ac is benzoyloxy.

35. The process of claim 32 wherein said inert solvent is 1,2-dichloroethane and wherein said treatment is conducted at temperatures in the range of about from 20° to 80°C for about from two to 18 hours.

36. The process of claim 32 wherein Ac is benzoyloxy and Ac' is acetyloxy.

* * * * *